United States Patent
Iwashita et al.

(10) Patent No.: US 9,410,086 B2
(45) Date of Patent: Aug. 9, 2016

(54) LIQUID CRYSTAL-POLYMER COMPOSITE MATERIAL

(71) Applicant: DIC CORPORATION, Tokyo (JP)

(72) Inventors: Yoshinori Iwashita, Kita-adachi-gun (JP); Hidenari Akiyama, Kita-adachi-gun (JP); Isa Nishiyama, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/403,436

(22) PCT Filed: Jun. 20, 2013

(86) PCT No.: PCT/JP2013/066938
§ 371 (c)(1),
(2) Date: Feb. 23, 2015

(87) PCT Pub. No.: WO2014/002865
PCT Pub. Date: Jan. 3, 2014

(65) Prior Publication Data
US 2015/0166893 A1 Jun. 18, 2015

(30) Foreign Application Priority Data
Jun. 25, 2012 (JP) .................................. 2012-142378

(51) Int. Cl.
| | |
|---|---|
| *C09K 19/46* | (2006.01) |
| *C09K 19/38* | (2006.01) |
| *C09K 19/54* | (2006.01) |
| *C09K 19/52* | (2006.01) |
| *C09K 19/04* | (2006.01) |
| *C09K 19/20* | (2006.01) |

(52) U.S. Cl.
CPC .................. *C09K 19/46* (2013.01); *C09K 19/38* (2013.01); *C09K 19/52* (2013.01); *C09K 19/54* (2013.01); *C09K 2019/0448* (2013.01); *C09K 2019/2078* (2013.01)

(58) Field of Classification Search
None
See application file for complete search history.

(56) References Cited

U.S. PATENT DOCUMENTS

| | | | | |
|---|---|---|---|---|
| 2008/0280071 | A1* | 11/2008 | Kikuchi et al. ................. | 428/1.1 |
| 2011/0261311 | A1* | 10/2011 | Jansen et al. ................... | 349/182 |
| 2013/0193376 | A1 | 8/2013 | Schott et al. | |

FOREIGN PATENT DOCUMENTS

| | | |
|---|---|---|
| EP | 2 098 583 A2 | 9/2009 |
| JP | 2005-336477 A | 12/2005 |
| JP | 2006-89622 A | 4/2006 |
| JP | 2006-225655 A | 8/2006 |
| JP | 2008-524347 A | 7/2008 |
| JP | 2008-266633 A | 11/2008 |
| JP | 2008-303381 A | 12/2008 |
| JP | 2009-57459 A | 3/2009 |
| JP | 2009057459 A * | 3/2009 |
| JP | 2009-74050 A | 4/2009 |
| JP | 2009-144135 A | 7/2009 |
| JP | 2010-195921 A | 9/2010 |
| JP | 2011-232753 A | 11/2011 |

OTHER PUBLICATIONS

Kiyoshi Shibayama et al., "Kobunshi Anteika Blue-so III no Sosei to sono Denki Kogaku Oto", Japanese Liquid Crystal Society Toronkai Koen Yokoshu (Aug. 27, 2010). PB23.*
Stegemeyer, H. et al., "Thermodynamic, structural and morphological studies on liquid-crystalline blue phases", Liquid Crystals, 1986, vol. 1, pp. 3-28.
Wright D. C. et al., "Crystalline liquids: the blue phases", Review of Modern Physics, Apr. 1989, vol. 61, No. 2, pp. 385-432.
Kikuchi H. et al., "Polyer-stabilized liquid crystal blue phases", Nature Materials, Sep. 2002, Vo. 1, pp. 64-68.
Kikuchi, H. "Liquid Crystalline Blue Phases", Structure and Bonding, Dec. 2007, 128, pp. 99-117.
Yan, J. et al., "Polyer-stabilized optically isotropic liquid crystals for next-generation display and photonics applications", Journal of Materials Chemistry, 2011, vol. 21, pp. 7870-7877.
Yoshizawa, A. "Electro-optical Switching in a Blue Phase III Stabilized by a LC Oligomer", Proceedings of the 14th International Display Workshops 2, 2007, pp. 379-382.
Yoshizawa, A., "Liquid Crystal Oligomers Exhibiting a Blue Phase", Molecular Crystals and Liquid Crystals, 2010, vol. 516, pp. 99-106.
Taushanoff, S. et al., "Stable amorphous blue phase of bent-core nematic liquid crystals doped with a chiral material", Journal of Materials Chemistry, 2010, vol. 20, pp. 5893-5898.
International Search Report dated Aug. 20, 2013 issued in corresponding application No. PCT/JP2013/066938.
Shibayama et al., "Development of polymer-stabilized blue phase III and its electro-optical response", Aug. 27, 2010, PB23.

* cited by examiner

*Primary Examiner* — Chanceity Robinson
(74) *Attorney, Agent, or Firm* — Westterman, Hattori, Daniels & Adrian, LLP

(57) ABSTRACT

There are provided a liquid crystal-polymer composite material including a nematic liquid crystal composition containing at least two types of achiral liquid crystal compounds, at least one type of chiral compound, and a polymer formed by polymerization of at least one type of polymerizable compound; a method for manufacturing a liquid crystal-polymer composite material in which polymerization of a polymerizable compound-containing liquid crystal composition including a nematic liquid crystal composition containing at least two types of achiral liquid crystal compounds, at least one type of chiral compound, and at least one type of polymerizable compound is started for curing in a temperature range in which the polymerizable compound-containing liquid crystal composition exhibits a blue phase III; and a liquid crystal optical element which uses the liquid crystal-polymer composite material.

15 Claims, No Drawings

LIQUID CRYSTAL-POLYMER COMPOSITE MATERIAL

TECHNICAL FIELD

The present invention relates to a liquid crystal-polymer composite material preferably used as a liquid crystal capable of performing high speed response and a method for manufacturing the same.

BACKGROUND ART

At the present time, in view of 3D compatibility or reduction in load on peripheral devices/apparatuses, an increase in speed of liquid crystal has been an important development subject. Heretofore, although an increase in speed has been studied by improvement in physical properties of nematic liquid crystals and/or improvement of panels, development of a high-speed liquid crystal other than a nematic liquid crystal has also been actively carried out. As liquid crystals which are not nematic liquid crystals and which can perform high speed response, for example, a ferroelectric liquid crystal (FLC), a liquid crystal which exhibits an optically isotropic liquid crystal phase (optically isotropic phase), such as a blue phase (for example, see Non-Patent Literature 1), and a biaxial liquid crystal have been currently known.

A blue phase is classified into blue phases I and II, each of which is an ordered phase having a cubic structure, and a blue phase III which is an amorphous (disordered) phase. Since those blue phases each have optically isotropy when no electric field is applied, the rubbing alignment is not required; since clear black is obtained without any light leakage, the contrast is excellent; and in addition, since the electric field is horizontally applied as in the case of an IPS method, the viewing angle is also excellent. Furthermore, since switching is performed based on the exhibition of birefringence using a Kerr effect, high speed response can be obtained in principle.

In a liquid crystal optical element using a blue phase liquid crystal, a very narrow exhibition temperature range (approximately 1°) of a blue phase has been a problem (for example, see Non-Patent Literature 2). However, in recent years, it was found that the temperature range exhibiting a blue phase can be increased by polymerization. For example, Non-Patent Literatures 3 to 5 have reported that in a low molecular weight liquid crystal material exhibiting a blue phase, when a small amount of a polymerizable compound is polymerized to form a polymer while the blue phase is maintained, the blue-phase exhibition temperature range is increased to several tens of centigrade degrees (polymer-stabilized blue phase). In addition, Patent Literatures 1 and 2 have disclosed that when polymerization of a mixture containing a polymerizable compound and a liquid crystal material having chirality is started at a temperature at which the mixture exhibits an isotropic phase or a blue phase and is then finished in an optically isotropic state substantially without scattering of light having a wavelength equal to or more than that of visible light, a highly transparent and an isotropic liquid crystal-polymer composite material having a large and stable Kerr coefficient in a wide temperature range can be obtained. In addition, Patent Literatures 3 and 4 each have disclosed that as a liquid crystal material having chirality which is used to form a polymer-stabilized blue phase, a liquid crystal composition containing a compound having a $CF_2O$ group or a chlorobenzene ring in a mesogenic portion is preferable. Furthermore, Patent Literatures 5 to 7 each have disclosed that as a polymer used to form a polymer-stabilized blue phase, a polymer obtained from one reactive mesogenic polymerizable compound, a polymer formed by copolymerization between methacrylic skeletons and acrylate skeletons, or a polymer obtained from a polymerizable compound having an asymmetric structure is preferable. In addition, Patent Literature 8 has reported that by blending a soluble liquid crystal polymer having chirality with a liquid crystal composition, the exhibition temperature range of a blue phase of this liquid crystal composition is increased.

A blue phase which is generally used is a blue phase I or II, and a blue phase which is polymer-stabilized by the method described above is also a blue phase I or II. In contrast, the number of liquid crystals each exhibiting a blue phase III is very small, and the stabilization thereof is also difficult. Although the number of reports on exhibition of a blue phase III and stabilization thereof is small, for example, Non-Patent Literatures 6 and 7 have disclosed that when a T-type chiral liquid crystal oligomer having an intramolecular twisted order is blended with a nematic liquid crystal composition, a blue phase III can be exhibited, and that the exhibition temperature range thereof can also be increased. In addition, Non-Patent Literature 8 has proposed that the order of a blue phase is disturbed by a cybotactic layer structure, and a blue phase III is exhibited. Furthermore, Non-Patent Literature 9 has reported that as in the case of blue phases I and II, in the case of a blue phase III, when a polymer is formed in a nematic liquid crystal composition by polymerization of a small amount of a polymerizable compound, the exhibition temperature range of a blue phase III can be increased.

CITATION LIST

Patent Literature

Patent Literature 1: Japanese Unexamined Patent Application Publication No. 2005-336477
Patent Literature 2: Japanese Unexamined Patent Application Publication No. 2006-089622
Patent Literature 3: Japanese Unexamined Patent Application Publication No. 2009-074050
Patent Literature 4: Japanese Unexamined Patent Application Publication No. 2009-144135
Patent Literature 5: Japanese Unexamined Patent Application Publication No. 2008-524347
Patent Literature 6: Japanese Unexamined Patent Application Publication No. 2008-266633
Patent Literature 7: Japanese Unexamined Patent Application Publication No. 2010-195921
Patent Literature 8: Japanese Unexamined Patent Application Publication No. 2006-225655

Non-Patent Literature

Non-Patent Literature 1: H. Stegemeyer, et al., Liquid Crystals, 1986, vol. 1, p. 3 to 28.
Non-Patent Literature 2: D. C. Wright, N. D. Mermin, Reviews of Modern Physics, 1989, vol. 61(2), p. 385 to 432.
Non-Patent Literature 3: H. Kikuchi, et al., Nature Materials, 2002, vol. 1(1), p. 64 to 68.
Non-Patent Literature 4: H. Kikuchi, Structure and Bonding, 2007, vol. 128, p. 99 to 117.
Non-Patent Literature 5: J. Yan, eta al., Journal of Materials Chemistry, 2011, vol. 21(22), p. 7870 to 7877.
Non-Patent Literature 6: A. Yoshizawa, Proceedings of the 14th International Display Workshops 2, 2007, p. 379 to 382.

Non-Patent Literature 7: A. Yoshizawa, Molecular Crystals and Liquid Crystals, 2010, vol. 516, p. 99 to 106.

Non-Patent Literature 8: S. Taushanoff, et al., Journal of Materials Chemistry, 2010, vol. 20(28), p. 5893 to 5898.

Non-Patent Literature 9: S. Shibayama and two others, Japanese Liquid Crystal Conference, 2010, "Creation of Polymer-Stabilized Blue Phase III and its Electrooptic Response" (PB2).

SUMMARY OF INVENTION

Technical Problem

In a liquid crystal using a blue phase I or II which is an order layer, there has been a problem in that hysteresis is generated in an electrooptic response curve (VT curve). It is believed that by the use of a blue phase III which is an amorphous phase, the hysteresis is reduced. However, the number of materials exhibiting a blue phase III is limited, and furthermore, the stability thereof is also insufficient. For example, by the polymer stabilization performed in Non-Patent Literature 9, a stabilized blue phase III coexists with one of blue phases I and II and a liquid phase in most of its exhibition temperature range, and in the entire liquid crystal, a temperature range which only exhibits a blue phase III is just 1.5° C. from 50.6° C. to 52.1° C.

Accordingly, development of a more effective method for stabilizing a blue phase III and increasing the exhibition temperature range thereof has been desired.

An object of the present invention is to provide a liquid crystal-polymer composite material having a sufficiently wide temperature range which exhibits an optically isotropic phase, such as a blue phase, in particular a blue phase III, and to provide a method for manufacturing the same.

Solution to Problem

The present invention provides a liquid crystal-polymer composite material comprising a nematic liquid crystal composition containing at least two types of achiral liquid crystal compounds, at least one type of chiral compound, and a polymer formed by polymerization of at least one type of polymerizable compound.

In addition, the present invention provides a method for manufacturing a liquid crystal-polymer composite material, the method comprising starting polymerization of a polymerizable compound-containing liquid crystal composition for curing thereof in a temperature range in which the polymerizable compound-containing liquid crystal composition exhibits a blue phase III, the polymerizable compound-containing liquid crystal composition including a nematic liquid crystal composition containing at least two types of achiral liquid crystal compounds, at least one type of chiral compound, and at least one type of polymerizable compound.

Advantageous Effects of Invention

The liquid crystal-polymer composite material of the present invention has a very wide exhibition temperature range unlike that in the past and can exhibit a stable blue phase, in particular a blue phase III. Hence, the liquid crystal-polymer composite material of the present invention is particularly preferably used as a material for a liquid crystal optical element which is required to have high speed response.

In addition, by the method for manufacturing a liquid crystal-polymer composite material of the present invention, a highly stable liquid crystal-polymer composite material having a very wide exhibition temperature range of a blue phase can be manufactured.

DESCRIPTION OF EMBODIMENTS

In the present invention, unless otherwise particularly stated, an "alkylene group" represents a divalent group "—$(CH_2)_n$—" (where n represents an integer of 1 or more) obtained by removing one hydrogen atom from the carbon atom located at each of the two ends of an aliphatic linear hydrocarbon, and when a hydrogen atom thereof is substituted by a halogen atom or an alkyl group, or when a methylene group (—$CH_2$—) is substituted by an oxygen atom (—O—), a sulfur atom (—S—), —CO—, —COO—, or —OCO—, this substitution will be particularly described. In addition, the "number of carbon atoms of an alkylene group" is represented by n of the general formula "—$(CH_2)_n$—" which represents an "alkylene group".

A liquid crystal-polymer composite material of the present invention includes a nematic liquid crystal composition containing at least two types of achiral liquid crystal compounds, at least one type of chiral compound, and a polymer formed by polymerization of at least one type of polymerizable compound. When a liquid crystal material which contains a nematic liquid crystal composition and a chiral compound and which exhibits an optically isotropic phase, such as a blue phase, in particular a blue phase III, is stabilized by a polymer, a liquid crystal-polymer composite material which stably exhibits a blue phase III or the like in a very wide temperature range can be obtained.

[Nematic Liquid Crystal Composition]

A nematic liquid crystal composition used for the liquid crystal-polymer composite material of the present invention contains at least two types of achiral liquid crystal compounds. Those liquid crystal compounds each are not particularly limited as along as being achiral and having a mesogenic portion (mesogenic group) exhibiting liquid crystallinity, and any known liquid crystal compounds and compounds obtained by appropriate modification thereof may be used.

<Compound Represented by General Formula (I)>

As the nematic liquid crystal composition used for the liquid crystal-polymer composite material of the present invention, a compound represented by the following general formula (I) is preferably contained. The compound represented by the general formula (I) is a liquid crystal compound having a relatively small absolute value of $\Delta\varepsilon$.

[Chem. 1]

$$R^{11}\text{-}A^{11}\text{-}L^{11}\text{-}A^{12}\text{-}(\text{-}L^{12}\text{-}A^{13}\text{-})_{a11}R^{12} \qquad (I)$$

(In the general formula (I), although $R^{11}$ and $R^{12}$ each independently represent an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group in $R^{11}$ or $R^{12}$ or at least two methylene groups therein which are not adjacent to each other each may be independently substituted by —O—, —S—, —CO—, —COO—, or —OCO— so that oxygen atoms or sulfur atoms are not directly bonded to each other, and at least one hydrogen atom in $R^{11}$ or $R^{12}$ may be substituted by a fluorine atom;

$A^{11}$, $A^{12}$, and $A^{13}$ each independently represent (a) a trans-1,4-cyclohexylene group (one methylene group present in this group or at least two methylene groups therein which are not adjacent to each other each may be independently substituted by an oxygen atom or a sulfur atom, and at least one hydrogen atom present in this group each may be independently substituted by a cyano group, a fluorine atom, or a chlorine atom), (b) a 1,4-phenylene group (one —CH═ present in this group or at least two —CH═'s therein which are not adjacent to each other may be substituted by at least one nitrogen atom, and at least one hydrogen atom present in this group each may be independently substituted by a cyano group, a fluorine atom, or a chlorine atom), or (c) a group selected from the group consisting of a 1,4-cyclohexenylene group, a 1,4-bicyclo(2,2,2)octylene group, a naphthalene-2,6-diyl group, a decahydronaphthalene-2,6-diyl group, and a 1,2,3,4-tetrahydronaphthalene-2,6-diyl group (one —CH═ present in each of those groups or at least two —CH═'s therein which are not adjacent to each other may be substituted by at least one nitrogen atom, and at least one hydrogen atom present in each of those groups each may be independently substituted by a cyano group, a fluorine atom, or a chlorine atom);

$a^{11}$ represents 0, 1, or 2; and $L^{11}$ and $L^{12}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH═N—N═CH—, —CH═CH—, —CF═CF—, —C≡C—, —N═N—, —CH═N—, —SCH$_2$—, —CH$_2$S—, —CSO—, —OCS—, —CF$_2$S—, or —SCF$_2$—.)

In the general formula (I), $R^{11}$ and $R^{12}$ each independently represent an alkyl group having 1 to 16 carbon atoms, an alkoxy group having 1 to 16 carbon atoms, an alkenyl group having 2 to 16 carbon atoms, or an alkenyloxy group having 2 to 16 carbon atoms. In the alkyl group, the alkoxy group, the alkenyl group, or the alkenyloxy group described above, one methylene group or at least two methylene groups which are not adjacent to each other each may be independently substituted by —O—, —S—, —CO—, —COO—, or —OCO— so that oxygen atoms or sulfur atoms are not directly bonded to each other, and at least one hydrogen atom in each of those groups may be substituted by a fluorine atom. Although $R^{11}$ and $R^{12}$ may be the same or different from each other, $R^{11}$ and $R^{12}$ in the same molecule are more preferably different from each other.

As the compound represented by the general formula (I), $R^{11}$ and $R^{12}$ each independently represent preferably an alkyl group having 1 to 15 carbon atoms, an alkoxy group having 1 to 15 carbon atoms, an alkenyl group having 2 to 15 carbon atoms, or an alkenyloxy group having 2 to 15 carbon atoms; more preferably an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; further preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms; and even further preferably an alkyl group having 1 to 8 carbon atoms, an alkoxy group having 1 to 5 carbon atoms, or an alkenyl group having 2 to 6 carbon atoms. Although $R^{11}$ and $R^{12}$ each may represent either a branched chain group or a linear chain group, $R^{11}$ and $R^{12}$ each preferably represent a linear chain group.

When $R^{11}$ and $R^{12}$ each represent an alkenyl group, any one of the following groups is particularly preferable. It is to be understood that in the following groups, the right ends thereof are each bonded to the ring structure. Among those groups shown below, a vinyl group or a 3-butenyl group is more preferable, and a vinyl group is particularly preferable.

[Chem. 2]

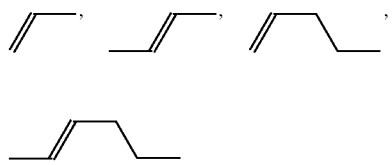

In the general formula (I), $a^{11}$ represents 0, 1, or 2. As the compound represented by the general formula (I), $a^{11}$ preferably represents 0 or 1.

In the general formula (I), $A^{11}$, $A^{12}$, and $A^{13}$ each independently represent the following (a) group, (b) group, or (c) group. When $a^{11}$ represents 2, and two $A^{13}$'s are present, they may be the same or different from each other.

(a) A trans-1,4-cyclohexylene group (one methylene group present in this group or at least two methylene groups therein which are not adjacent to each other each may be independently substituted by an oxygen atom or a sulfur atom, and at least one hydrogen atom present in this group each may be independently substituted by a cyano group, a fluorine atom, or a chlorine atom.)

(b) A 1,4-phenylene group (one —CH═ present in this group or at least two —CH═'s therein which are not adjacent to each other may be substituted by at least one nitrogen atom, and at least one hydrogen atom present in this group each may be independently substituted by a cyano group, a fluorine atom, or a chlorine atom.)

(c) A group selected from the group consisting of a 1,4-cyclohexenylene group, a 1,4-bicyclo(2,2,2)octylene group, a naphthalene-2,6-diyl group, a decahydronaphthalene-2,6-diyl group, and a 1,2,3,4-tetrahydronaphthalene-2,6-diyl group (one —CH═ present in each of those groups or at least two —CH═'s therein which are not adjacent to each other may be substituted by at least one nitrogen atom, and at least one hydrogen atom present in each of those groups each may be independently substituted by a cyano group, a fluorine atom, or a chlorine atom.)

As the above (a) group, a trans-1,4-cyclohexylene group unsubstituted or substituted such that at least one hydrogen atom is each independently substituted by a cyano group, a fluorine atom, or a chlorine atom is preferable, a trans-1,4-cyclohexylene group unsubstituted or substituted such that at least one hydrogen atom is each independently substituted by a fluorine atom or a chlorine atom is more preferable, and an unsubstituted trans-1,4-cyclohexylene group is further preferable.

As the above (b) group, any one of groups represented by the following general formulas (b)-1 to (b)-7 is preferable. In those groups, at least one hydrogen atom each may be independently substituted by a cyano group, a fluorine atom, or a chlorine atom. In particular, an unsubstituted 1,4-phenylene group [formula (b)-1], a 1,4-phenylene group in which at least one hydrogen atom is each independently substituted by a fluorine atom or a chlorine atom, or an unsubstituted pyrimidine-2,5-diyl group [formula (b)-3] is preferable, and an unsubstituted 1,4-phenylene group or a 1,4-phenylene group in which at least one hydrogen atom is each independently substituted by a fluorine atom or a chlorine atom is more preferable.

[Chem. 3]

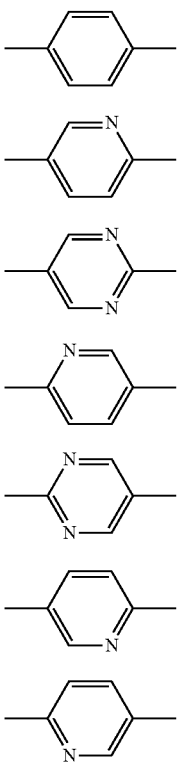

(b)-1
(b)-2
(b)-3
(b)-4
(b)-5
(b)-6
(b)-7

As the above (c) group, a 1,4-cyclohexenylene group, a 1,4-bicyclo(2,2,2)octylene group, a pyperidine-1,4-diyl group, a naphthalene-2,6-diyl group, a decahydronaphthalene-2,6-diyl group, and a 1,2,3,4-tetrahydronaphthalene-2,6-diyl group are preferable. In those groups, at least one hydrogen atom each may be independently substituted by a cyano group, a fluorine atom, or a chlorine atom. In particular, an unsubstituted naphthalene-2,6-diyl group, a naphthalene-2,6-diyl group in which at least one hydrogen atom is each independently substituted by a fluorine atom or a chlorine atom, an unsubstituted decahydronaphthalene-2,6-diyl group, an unsubstituted 1,2,3,4-tetrahydronaphthalene-2,6-diyl group, or a 1,2,3,4-tetrahydronaphthalene-2,6-diyl group in which at least one hydrogen atom is independently substituted by a fluorine atom or a chlorine atom is preferable.

As the compound represented by the general formula (I), $A^{11}$, $A^{12}$, and $A^{13}$ each independently represent preferably the (a) group or the (b) group, more preferably a trans-1,4-cyclohexylene group, a 1,4-phenylene group, a 2-fluoro-1,4-phenylene group, a 3-fluoro-1,4-phenylene group, or a 3,5-difluoro-1,4-phenylene group, and further preferably a trans-1,4-cyclohexylene group or a 1,4-phenylene group. In addition, at least one of $A^{11}$, $A^{12}$, and $A^{13}$ in one molecule preferably represents a trans-1,4-cyclohexylene group or a 1,4-phenylene group.

In the general formula (I), $L^{11}$ and $L^{12}$ each independently represent a single bond, —$CH_2CH_2$—, —$(CH_2)_4$—, —$OCH_2$—, —$CH_2O$—, —COO—, —OCO—, —$CF_2CF_2$—, —$OCF_2$—, —$CF_2O$—, —CH=N—N=CH—, —CH=CH—, —CF=CF—, —C≡C—, —N=N—, —CH=N—, —$SCH_2$—, —$CH_2S$—, —CSO—, —OCS—, —$CF_2S$—, or —$SCF_2$—. When $a^{11}$ represents 2, and two $L^{12}$'s are present, they may be the same or different from each other. As the compound represented by the general formula (I), $L^{11}$ and $L^{12}$ each independently represent preferably a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, more preferably a single bond, —$CH_2CH_2$—, —$(CH_2)_4$—, —COO—, —OCO—, —$OCF_2$—, —$CF_2O$—, —CH=CH—, or —C≡C—, further preferably a single bond, —$CH_2CH_2$—, —CH=CH—, —$OCF_2$—, —$CF_2O$—, or —C≡C—; and even further preferably a single bond or —C≡C—. In addition, at least one of $L^{11}$ and $L^{12}$ in one molecule preferably represents a single bond.

As the compound represented by the general formula (I), for example, compounds represented by the following general formulas (Ia) to (Ih) are preferable.

[Chem. 4]

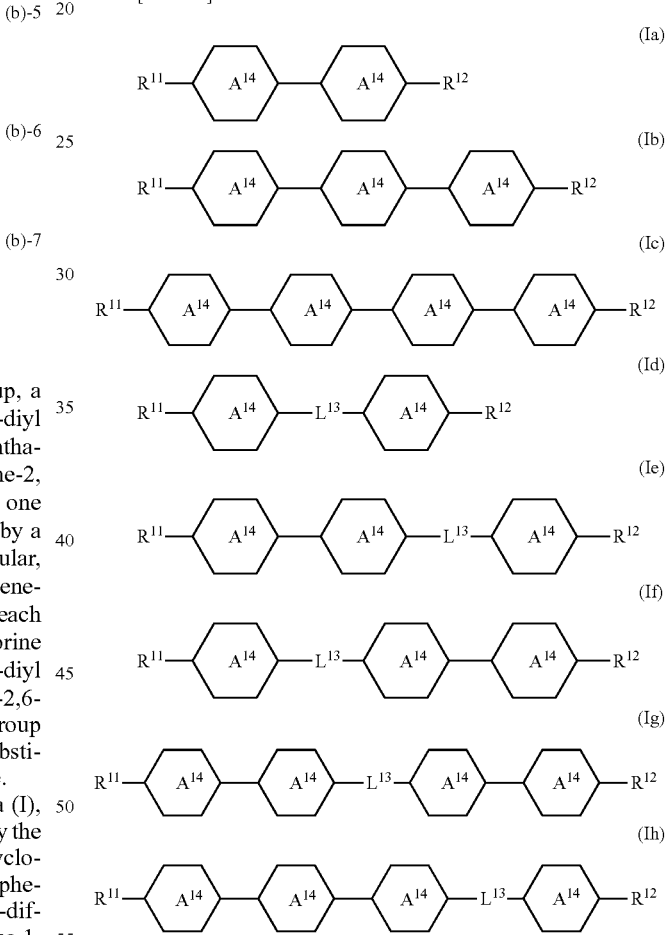

In the general formulas (Ia) to (Ih), $R^{11}$ and $R^{12}$ are similar to those of the general formula (I), respectively. Although $R^{11}$ and $R^{12}$ may be the same or different from each other, $R^{11}$ and $R^{12}$ in the same molecule are preferably different from each other. As the compounds represented by the general formulas (Ia) to (Ih), $R^{11}$ and $R^{12}$ each represent preferably an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, and more preferably an alkyl group having 1 to 8 carbon atoms, an alkoxy group having 1 to 5 carbon atoms, or an alkenyl group having 2 to 6 carbon atoms. Although $R^{11}$ and $R^{12}$ each may be either a branched chain group or a linear chain group, $R^{11}$ and $R^{12}$ are each preferably a linear chain group. In addition, when $R^{11}$ and $R^{12}$ each represent an alkenyl group, a vinyl group or a 3-butenyl group is more preferable, and a vinyl group is particularly preferable.

In the general formulas (Ia) to (Ih), $A^{14}$'s each may independently represent a 1,4-phenylene group in which at least one hydrogen atom may be substituted by a fluorine atom or a trans-1,4-cyclohexylene group in which at least one hydrogen atom may be substituted by a fluorine atom. A plurality of $A^{14}$'s present in one molecule may be the same or different from each other. As the compounds represented by each of the general formulas (Ia) to (Ih), a trans-1,4-cyclohexylene group, a 1,4-phenylene group, a 2-fluoro-1,4-phenylene group, a 3-fluoro-1,4-phenylene group, or a 3,5-difluoro-1,4-phenylene group is preferable, and a trans-1,4-cyclohexylene group or a 1,4-phenylene group is more preferable.

In the general formulas (Ia) to (Ih), $L^{13}$ represents —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—. As the compounds represented by the general formulas (Ia) to (Ih), $L^{13}$ represents preferably —CH$_2$CH$_2$—, —(CH$_2$)$_4$—, —COO—, —OCO—, —CH=CH—, or —C≡C— and more preferably —CH$_2$CH$_2$—, —CH=CH—, or —C≡C—.

As the compound represented by the general formula (Ia), compounds represented by the following general formulas (Ia-1) to (Ia-3) are preferable. As the compound represented by the general formula (Id), compounds represented by the following general formulas (Id-1) to (Id-3) are preferable. As the compound represented by the general formula (Ib), compounds represented by the following general formulas (Ib-1) to (Ib-6) are preferable. As the compound represented by the general formula (Ie), a compound represented by the following general formula (Ie-1) is preferable, and as the compound represented by the general formula (If), compounds represented by the following general formulas (If-1) and (If-2) are preferable. In the general formulas (Ia-1) to (Ia-3), (Id-1) to (Id-3), (Ib-1) to (Ib-6), (Ie-1), (If-1), and (If-2), $R^{11}$ and $R^{12}$ are similar to those of the general formula (I), respectively, and each independently represent preferably an alkyl group having 1 to 8 carbon atoms, an alkoxy group having 1 to 8 carbon atoms, an alkenyl group having 2 to 8 carbon atoms, or an alkenyloxy group having 3 to 16 carbon atoms and more preferably an alkyl group having 1 to 8 carbon atoms, an alkoxy group having 1 to 5 carbon atoms, or an alkenyl group having 2 to 6 carbon atoms.

[Chem. 5]

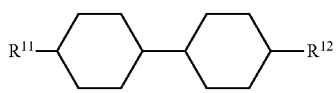
(Ia-1)

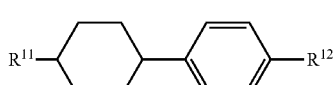
(Ia-2)

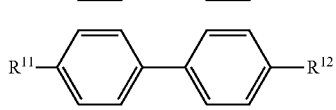
(Ia-3)

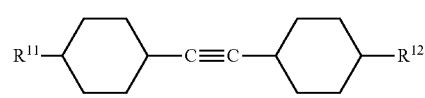
(Id-1)

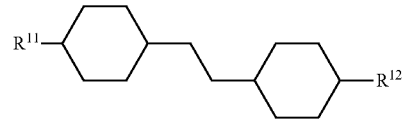
(Id-2)

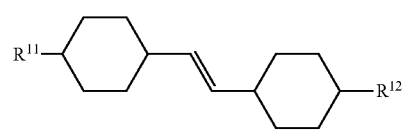
(Id-3)

[Chem. 6]

(Ib-1)

(Ib-2)

(Ib-3)

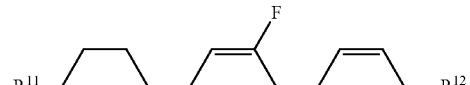
(Ib-4)

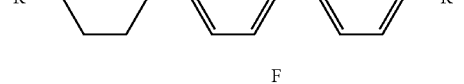
(Ib-5)

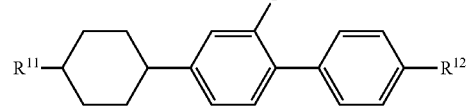
(Ib-6)

[Chem. 7]

(Ie-1)

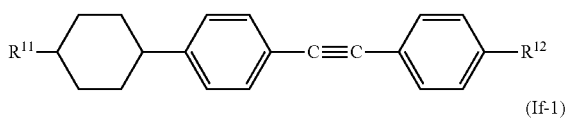
(If-1)

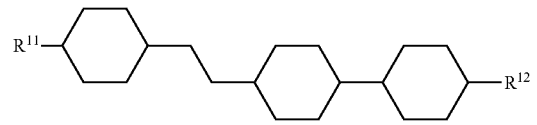
(If-2)

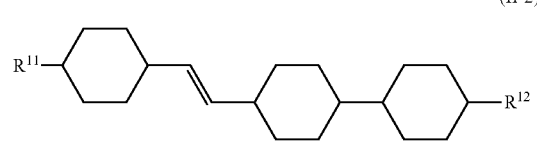

When the nematic liquid crystal composition used for the present invention contains the compound represented by the general formula (I), one type may only be contained, or at least two types may be contained in combination. As the nematic liquid crystal composition used for the present invention, the eight types of compounds represented by the general formulas (Ia) to (Ih) are all preferably contained, one to six types of compounds represented by the general formulas (Ia) to (Ih) are more preferably contained, and one to four types of compounds represented by the general formulas (Ia) to (Ih) are further preferably contained. In particular, at least one type of compound represented by the general formula (Ia), at least one type of compound represented by the general formula (Ib), at least one type of compound represented by the general formula (Id), at least one type of compound represented by the general formula (Ie), and at least one type of compound represented by the general formula (If) are preferably contained, and at least one type of compound represented by the general formula (Ia), at least one type of compound represented by the general formula (Id), at least one type of compound represented by the general formula (Ie), and at least one type of compound represented by the general formula (If) are more preferably contained.

When the nematic liquid crystal composition used for the present invention contains the compound represented by the general formula (I), although the content of the compound represented by the general formula (I) in the nematic liquid crystal composition is preferably in a range of 5 to 95 percent by mass and more preferably in a range of 10 to 90 percent by mass, in order to stably exhibit a blue phase, the content is further preferably in a range of 15 to 60 percent by mass, and when the response speed is emphasized, the content is further preferably in a range of 40 to 85 percent by mass.

<Compound Represented by General Formula (II)>

As the nematic liquid crystal composition used for the liquid crystal-polymer composite material of the present invention, at least one type of compound represented by the following general formula (II) is preferably contained. The compound represented by the general formula (II) is a liquid crystal compound having a relatively large $\Delta\varepsilon$.

[Chem. 8]

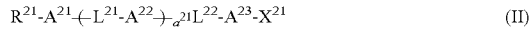

$$R^{21}\text{-}A^{21}\text{-}(L^{21}\text{-}A^{22})_{a^{21}}L^{22}\text{-}A^{23}\text{-}X^{21} \qquad (II)$$

(In the general formula (II), $A^{21}$, $A^{22}$, $A^{23}$ and $a^{21}$ represent the same meanings as those of $A^{11}$, $A^{12}$, $A^{13}$, and $a^{11}$ in the general formula (I), respectively, $R^{21}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group present in the above $R^{21}$ or at least two methylene groups therein which are not adjacent to each other each may be independently substituted by —O—, —S—, —CO—, —COO—, or —OCO—, and at least one hydrogen atom present in the above $R^{21}$ each may be independently substituted by a fluorine atom or a chlorine atom; $L^{21}$ and $L^{22}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$— (when two $L^{21}$'s are present, they may be the same or different from each other); and $X^{11}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

$R^{21}$ in the general formula (II) represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms. One methylene group present in each of those groups or at least two methylene groups therein which are not adjacent to each other each may be independently substituted by —O—, —S—, —CO—, —COO—, or —OCO—. In addition, at least one hydrogen atom present in each of those groups each may be independently substituted by a fluorine atom or a chlorine atom.

As the compound represented by the general formula (II), $R^{21}$ preferably represents a group in which neither methylene groups nor hydrogen atoms are substituted. In particular, $R^{21}$ represents preferably an alkyl group having 1 to 15 carbon atoms, an alkoxy group having 1 to 15 carbon atoms, an alkenyl group having 2 to 15 carbon atoms, or an alkenyloxy group having 2 to 15 carbon atoms, more preferably an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, further preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, and even further preferably an alkyl group having 1 to 8 carbon atoms. Although $R^{21}$ may represent either a branched chain group or a linear chain group, $R^{21}$ preferably represents a linear chain group.

In the general formula (II), $a^{21}$ represents 0, 1, or 2. As the compound represented by the general formula (II), $a^{21}$ preferably represents 0 or 1.

$A^{11}$, $A^{22}$, and $A^{23}$ in the general formula (II) are similar to $A^{11}$, $A^{12}$ and $A^{13}$ in the general formula (I), respectively. That is, $A^{21}$, $A^{22}$, and $A^{23}$ each independently represent the above (a) group, (b) group, or (c) group. When $a^{21}$ represents 2, and two $A^{22}$'s are present, they may be the same or different from each other.

When $A^{21}$, $A^{22}$, and $A^{23}$ in the general formula (II) each represent the above (a) group, a trans-1,4-cyclohexylene group unsubstituted or substituted such that at least one hydrogen atom is each independently substituted by a cyano group, a fluorine atom, or a chlorine atom is preferable, a 1,4-cyclohexylene group unsubstituted or substituted such that at least one hydrogen atom is each independently substituted by a fluorine atom or a chlorine atom is more preferable, and an unsubstituted trans-1,4-cyclohexylene group is further preferable.

When $A^{21}$, $A^{22}$, and $A^{23}$ in the general formula (II) each represent the above (b) group, any one of the groups represented by the formulas (b)-1 to 7 is preferable. At least one hydrogen atom of each of the groups each may be independently substituted by a cyano group, a fluorine atom, or a chlorine atom. In particular, an unsubstituted 1,4-phenylene group, a substituted 1,4-phenylene group in which at least one hydrogen atom is each independently substituted by a fluorine atom or a chlorine atom, or an unsubstituted pyrimidine-2,5-diyl group is preferable.

When $A^{21}$, $A^{22}$, and $A^{23}$ in the general formula (II) each represent the above (c) group, a decahydronaphthalene-2,6-diyl group, a naphthalene-2,6-diyl group, or a 1,2,3,4-tetrahydronaphthalene-2,6-diyl group is preferable. At least one hydrogen atom present in each of those groups each may be independently substituted by a cyano group, a fluorine atom, or a chlorine atom. In particular, an unsubstituted decahydronaphthalene-2,6-diyl group, an unsubstituted naphthalene-2,6-diyl group, a substituted naphthalene-2,6-diyl group in which at least one hydrogen atom is each independently substituted by a fluorine atom or a chlorine atom, an unsubstituted 1,2,3,4-tetrahydronaphthalene-2,6-diyl group, or a substituted 1,2,3,4-tetrahydronaphthalene-2,6-diyl group in which at least one hydrogen atom is each independently substituted by a fluorine atom or a chlorine atom is preferable.

As the compound represented by the general formula (II), $A^{11}$, $A^{22}$, and $A^{23}$ each preferably independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a decahydronaphthalene-2,6-diyl group, a naphthalene-2,6-diyl group, a 5-fluoro-naphthalene-2,6-diyl group, a 5,7-difluoro-naphthalene-2,6-diyl group, a 4,5-difluoro-naphthalene-2,6-diyl group, a 4,5,7-trifluoro-naphthalene-2,6-diyl group, a 1,2,3,4-tetrahydronaphthalene-2,6-diyl group, a 5-fluoro-1,2,3,4-tetrahydronaphthalene-2,6-diyl group, a 5,7-difluoro-1,2,3,4-tetrahydronaphthalene-2,6-diyl group, or a pyrimidine-2,5-diyl group.

In the general formula (II), $L^{21}$ and $L^{22}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—, —N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—. When $a^{21}$ represents 2, and two $L^{21}$'s are present, they may be the same or different from each other. As the compound represented by the general formula (II), $L^{21}$ and $L^{22}$ each independently represent preferably a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—, more preferably a single bond, —CH$_2$CH$_2$—, —(CH$_2$)$_4$—, —COO—, —OCO—, —OCF$_2$—, —CF$_2$O—, or —C≡C—, further preferably a single bond, —CH$_2$CH$_2$—, —COO—, —OCF$_2$—, —CF$_2$O—, or —C≡C—, and even further preferably a single bond or —COO—. In addition, at least one of $L^{21}$ and $L^{22}$ in one molecule preferably represents a single bond.

In the general formula (II), $X^{21}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. As the compound represented by the general formula (II), $X^{21}$ represents preferably a fluorine atom, a cyano group, a trifluoromethyl group, a fluoromethoxy group, a difluoromethoxy group, or a trifluoromethoxy group, and more preferably a fluorine atom or a cyano group.

As the compound represented by the general formula (II), for example, compounds represented by the following general formulas (IIa) to (IIc) are preferable. Among the general formulas (IIa) to (IIc), $R^{21}$, $A^{11}$, $A^{22}$, $a^{11}$, $L^{21}$, $L^{22}$, and $X^{21}$ are similar to those of the general formula (II), respectively, and $X^{22}$, $X^{23}$, $X^{24}$, $X^{25}$, $X^{26}$, $X^{27}$, and $X^{28}$ each independently represent a hydrogen atom or a fluorine atom.

[Chem. 9]

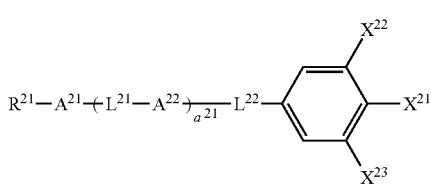

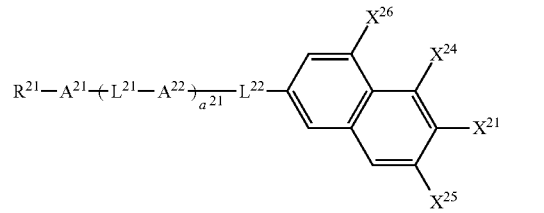

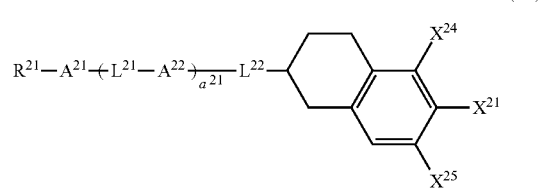

As the compound represented by the general formula (IIa), a compound represented by the following general formula (IIa-1) is preferable. In the general formula (IIa-1), $R^{21}$, $X^{21}$, $X^{22}$, and $X^{23}$ are similar to those of the general formula (IIa), respectively, $A^{24}$ represents a trans-1,4-cyclohexylene group or a 1,4-phenylene group (at least one hydrogen atom present in the group each may be independently substituted by a fluorine atom or a chlorine atom), $A^{25}$ represents a trans-1,4-cyclohexylene group, a 1,4-phenylene group, a decahydronaphthalene-2,6-diyl group, a naphthalene-2,6-diyl group, a 1,2,3,4-tetrahydronaphthalene-2,6-diyl group, or a pyrimidine-2,5-diyl group (at least one hydrogen atom present in each of those groups each may be independently substituted by a fluorine atom or a chlorine atom), $L^{23}$ and $L^{24}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—, and $a^{22}$ represents 0, 1, or 2. When $a^{22}$ represents 2, and a plurality of $L^{23}$'s and a plurality of $A^{24}$'s are present, they may be the same or different from each other.

[Chem. 10]

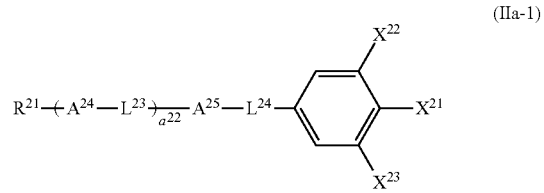

As the compound represented by the general formula (IIa-1), the following compounds are preferable.

(1) The compound in which in the general formula (IIa-1), $a^{22}$ represents 0, $A^{25}$ represents a trans-1,4-cyclohexylene group, a 1,4-phenylene group, a 2-fluoro-1,4-phenylene group, a 3-fluoro-1,4-phenylene group, or a 3,5-difluoro-1,4-phenylene group, and $L^{24}$ represents a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—.

(2) The compound in which in the general formula (IIa-1), $a^{22}$ represents 0, $A^{25}$ represents a decahydronaphthalene-2,6-diyl group, a naphthalene-2,6-diyl group, a 1,2,3,4-tetrahydronaphthalene-2,6-diyl group, or a pyrimidine-2,5-diyl group (at least one hydrogen atom present in each of those groups each may be independently substituted by a fluorine atom or a chlorine atom), and $L^{24}$ represents a single bond.

(3) The compound in which in the general formula (IIa-1), $a^{22}$ represents 1, $A^{24}$ and $A^{25}$ each independently represent a trans-1,4-cyclohexylene group, a 1,4-phenylene group, a 2-fluoro-1,4-phenylene group, a 3-fluoro-1,4-phenylene group, or a 3,5-difluoro-1,4-phenylene group, and $L^{23}$ and $L^{24}$ each independently represent a single bond, —CH$_2$CH$_2$—, —OCH$_2$—, —CH$_2$O—, —COO—, —OCO—, —OCF$_2$—, —CF$_2$O—, —CH=CH—, or —C≡C—.

(4) The compound in which in the general formula (IIa-1), $a^{22}$ represents 1, $A^{24}$ represents a trans-1,4-cyclohexylene group, a 1,4-phenylene group, a 2-fluoro-1,4-phenylene group, a 3-fluoro-1,4-phenylene group, or a 3,5-difluoro-1,4-phenylene group, $A^{25}$ represents a decahydronaphthalene-2,6-diyl group, a naphthalene-2,6-diyl group, a 1,2,3,4-tetrahydronaphthalene-2,6-diyl group, or a pyrimidine-2,5-diyl group (at least one hydrogen atom present in each of those groups each may be independently substituted by a fluorine atom or a chlorine atom), and $L^{23}$ and $L^{24}$ each represent a single bond.

(5) The compound in which in the general formula (IIa-1), $a^{22}$ represents 2, two $A^{24}$'s and one $A^{25}$ each independently represent a trans-1,4-cyclohexylene group, a 1,4-phenylene group, a 2-fluoro-1,4-phenylene group, a 3-fluoro-1,4-phenylene group, or a 3,5-difluoro-1,4-phenylene group, $L^{23}$ represents a single bond, and $L^{24}$ represents a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—.

In more particular, as the compound represented by the general formula (IIa-1), compounds represented by the following general formulas (IIa-2a) to (IIa-2v), general formulas (IIa-3a) to (IIa-3x), general formulas (IIa-3'a) to (IIa-3'z), and general formulas (IIa-4a) to (IIa-4s) may be mentioned. In the general formulas (IIa-2a) to (IIa-4s), $R^{21}$ is similar to that of the general formula (IIa) and represents preferably an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms, and further preferably an alkyl group having 1 to 8 carbon atoms. In addition, in the general formulas (IIa-2a) to (IIa-4s), $X^{21}$ is similar to that of the general formula (IIa) and represents preferably a fluorine atom, a cyano group, a trifluoromethyl group, a fluoromethoxy group, a difluoromethoxy group, or a trifluoromethoxy group, more preferably a fluorine atom or a cyano group, and further preferably a cyano group. In the general formulas (IIa-2a) to (IIa-4s), $X^{22}$ and $X^{23}$ each independently represent a hydrogen atom or a fluorine atom.

[Chem. 11]

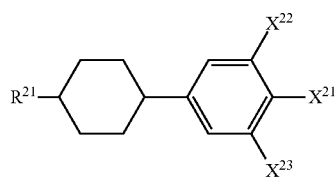

(IIa-2a)

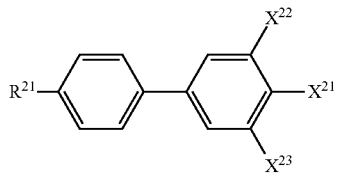

(IIa-2b)

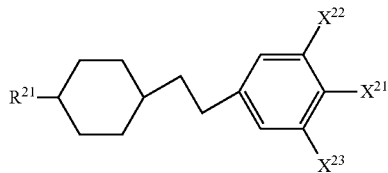

(IIa-2c)

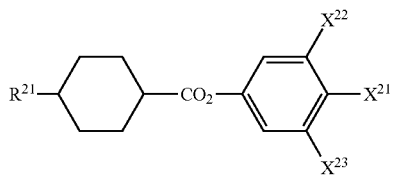

(IIa-2d)

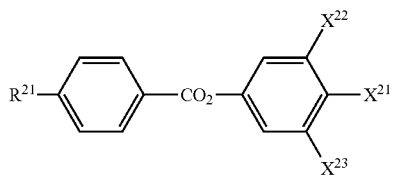

(IIa-2e)

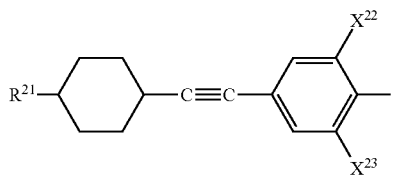

(IIa-2f)

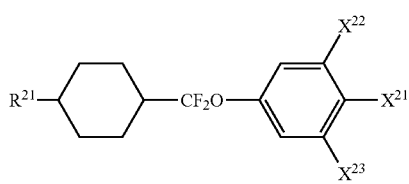

(IIa-2g)

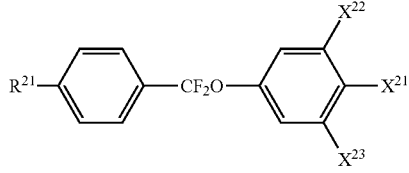

(IIa-2h)

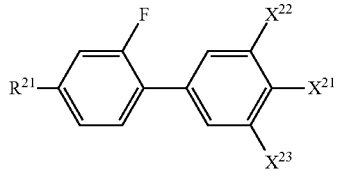

(IIa-2i)

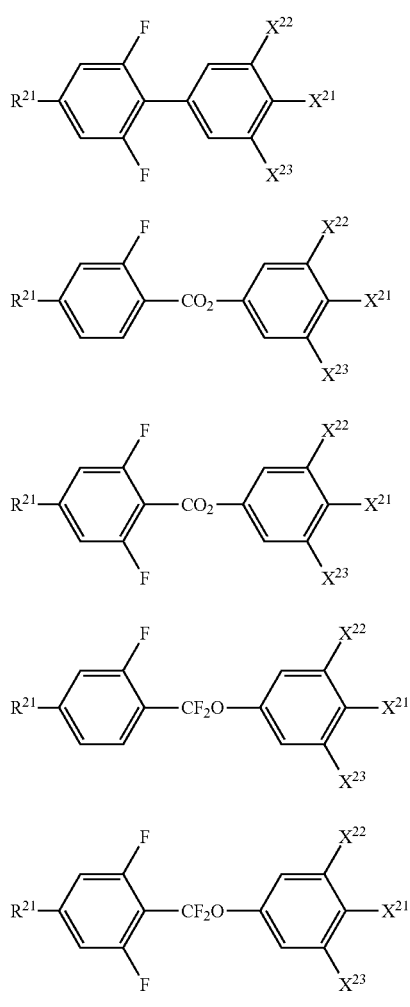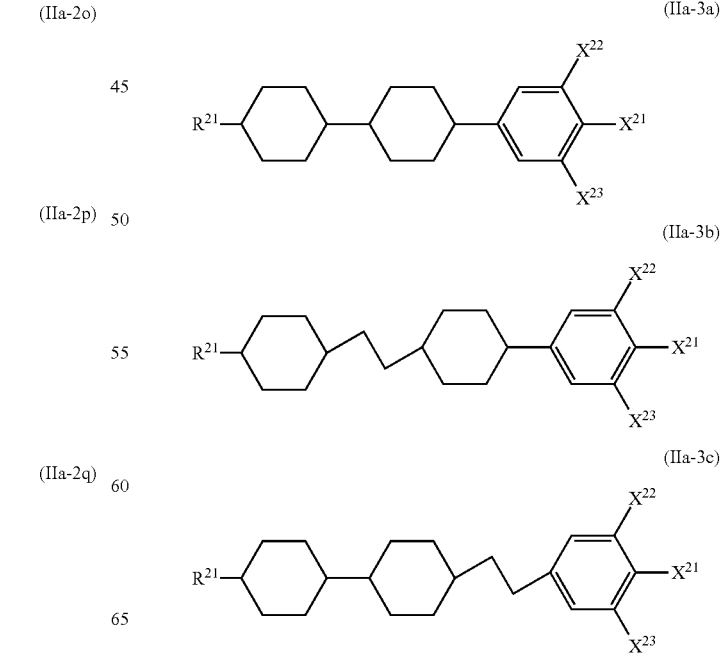

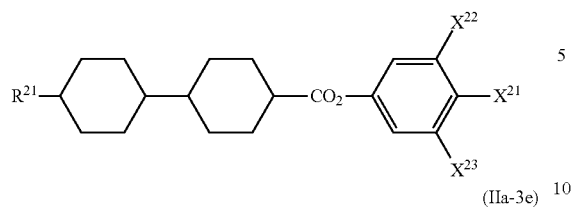
(IIa-3d)
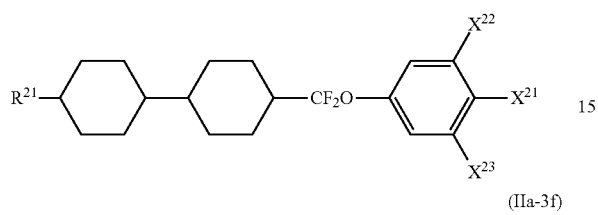
(IIa-3e)
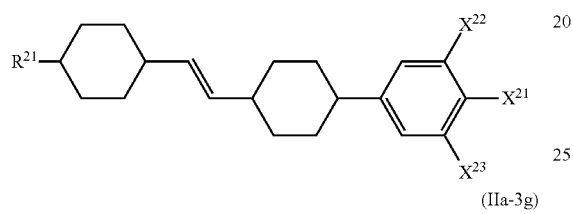
(IIa-3f)
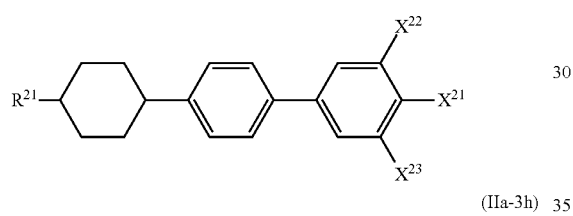
(IIa-3g)
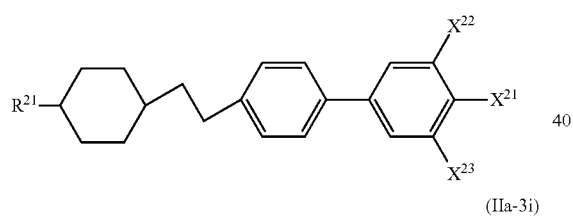
(IIa-3h)
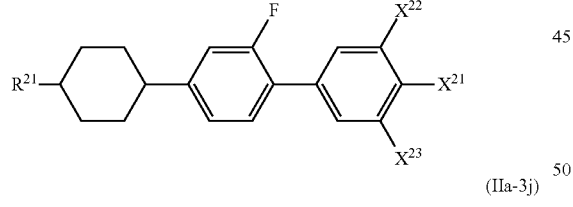
(IIa-3i)
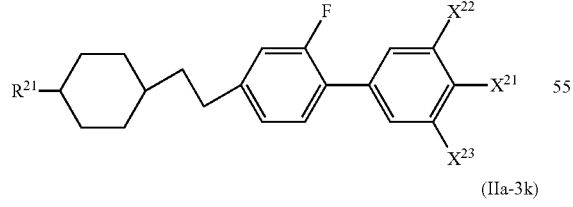
(IIa-3j)
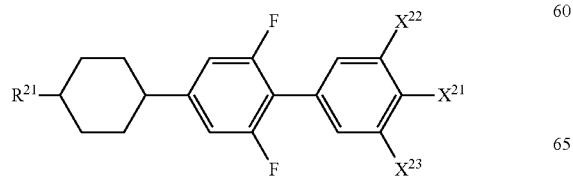
(IIa-3k)
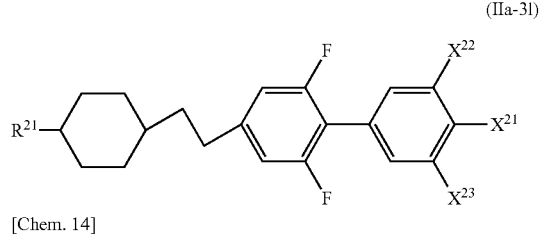
(IIa-3l)
[Chem. 14]
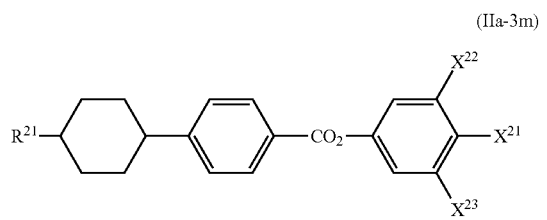
(IIa-3m)
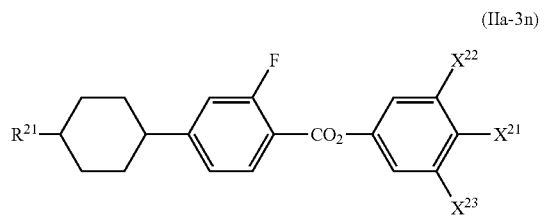
(IIa-3n)
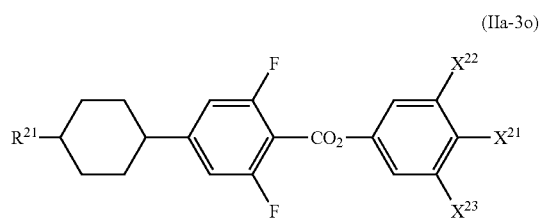
(IIa-3o)
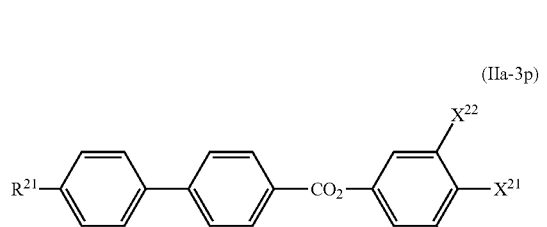
(IIa-3p)
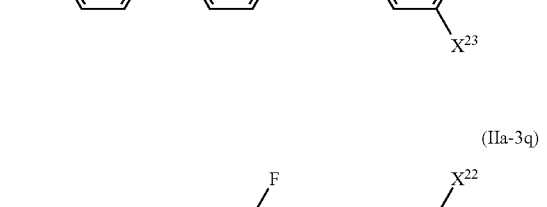
(IIa-3q)
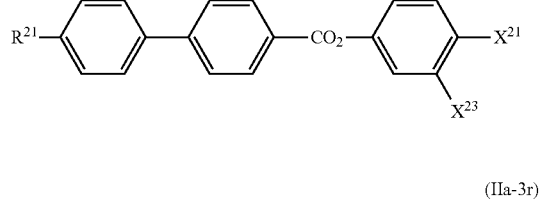
(IIa-3r)
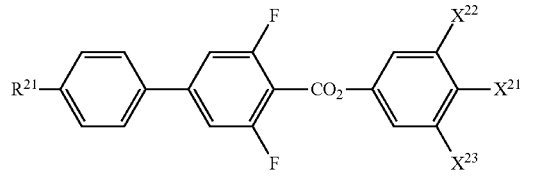

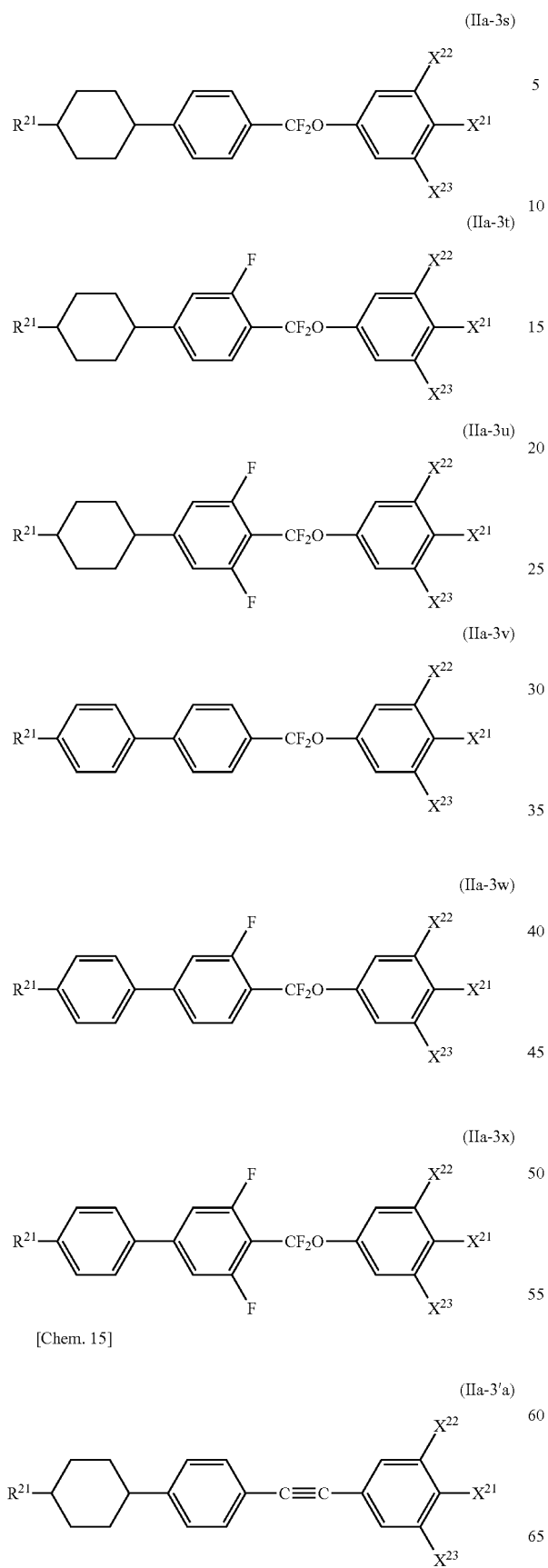
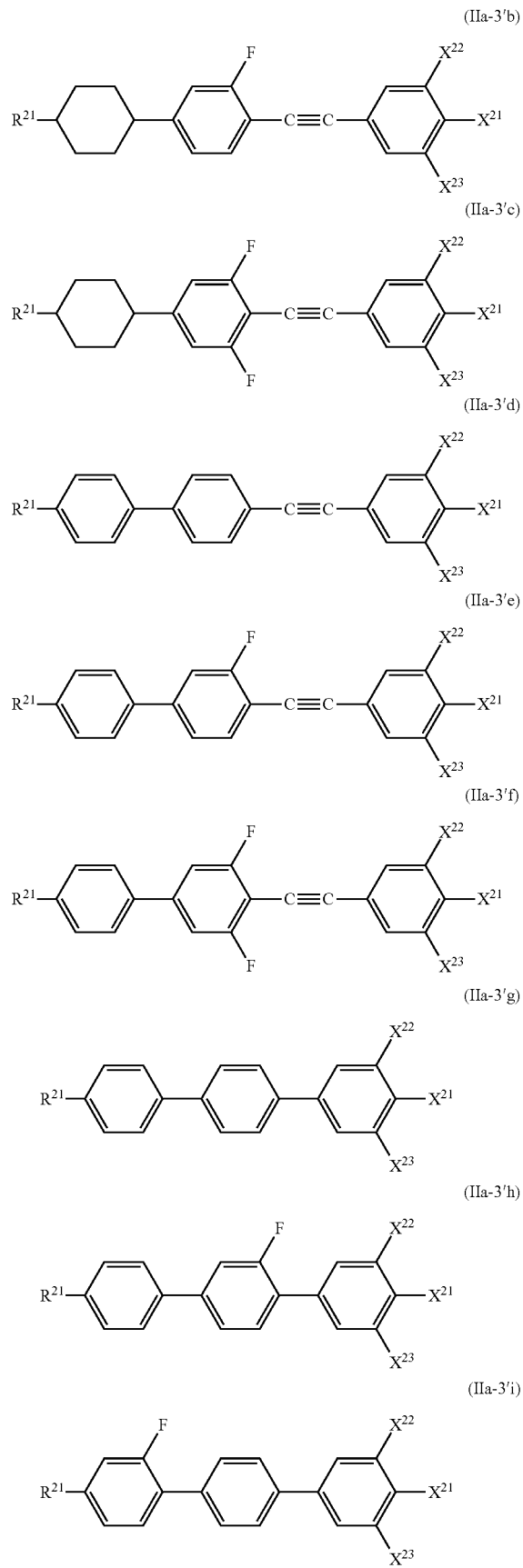

(IIa-3′j)
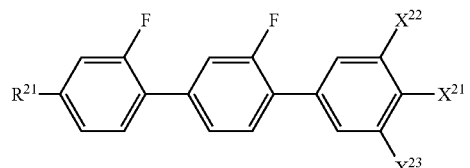
(IIa-3′k)
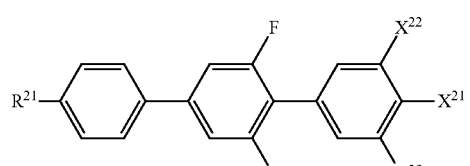
(IIa-3′l)
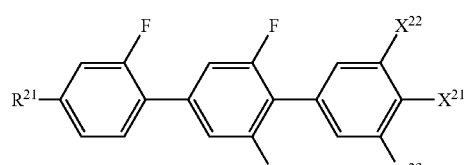
(IIa-3′m)
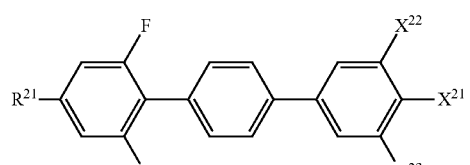
(IIa-3′n)
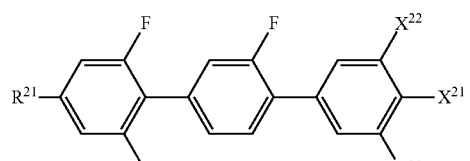
(IIa-3′o)
(IIa-3′p)
[Chem. 16]
(IIa-3′q)
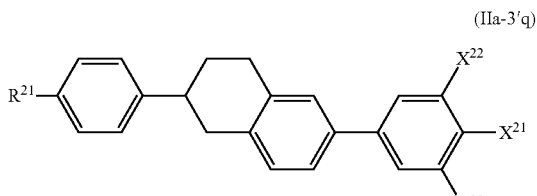
(IIa-3′r)
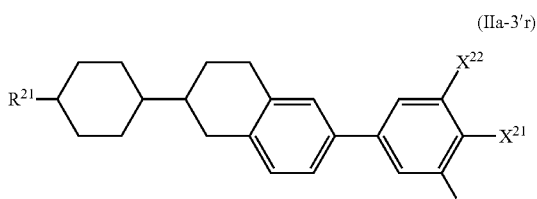
(IIa-3′s)
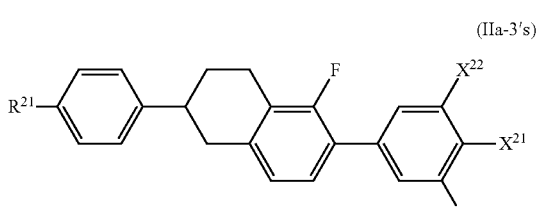
(IIa-3′t)
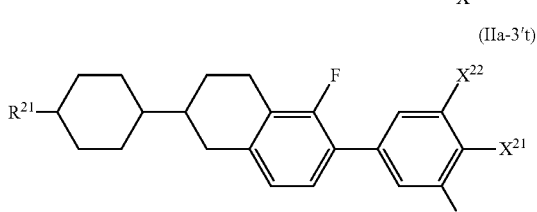
(IIa-3′u)
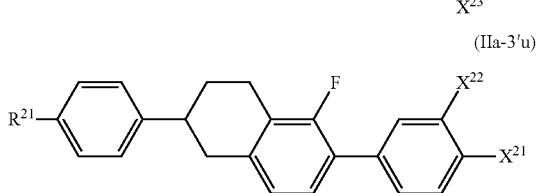
(IIa-3′v)
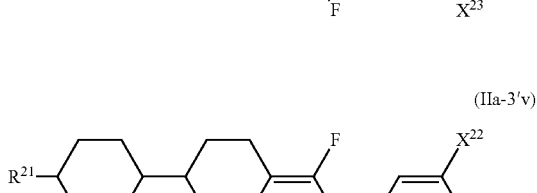
(IIa-3′w)
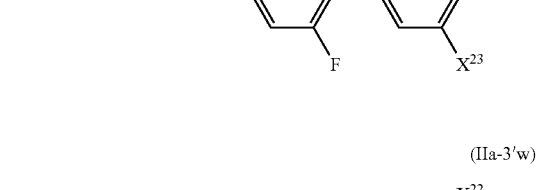

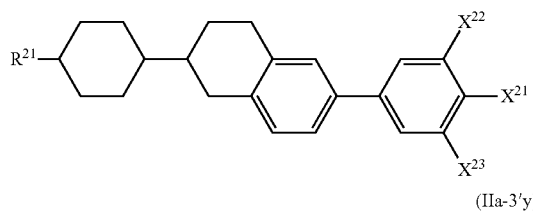
(IIa-3'x)
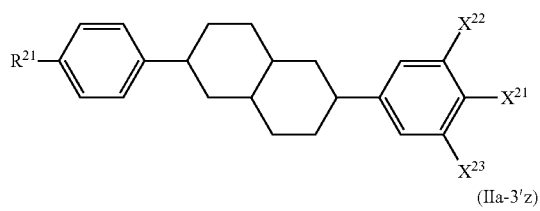
(IIa-3'y)
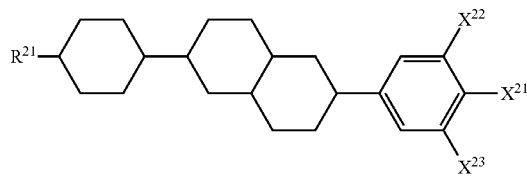
(IIa-3'z)
[Chem. 17]
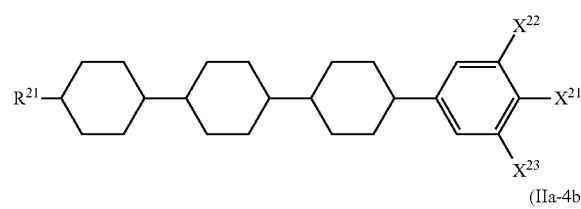
(IIa-4a)
(IIa-4f)
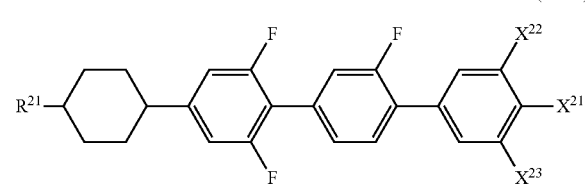
(IIa-4g)
(IIa-4b)
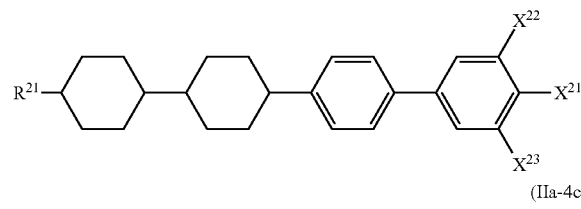
(IIa-4c)
(IIa-4h)
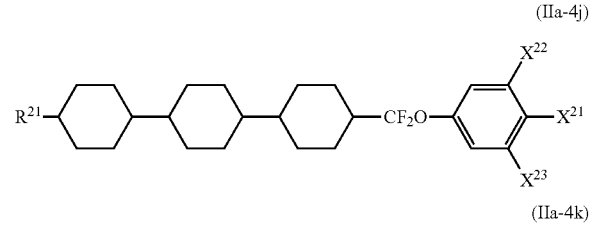
(IIa-4d)
(IIa-4i)
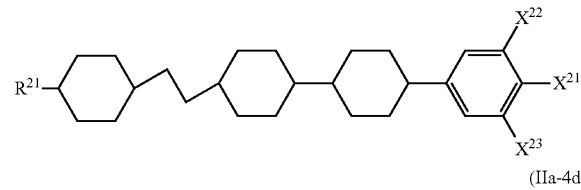
(IIa-4e)
[Chem. 18]
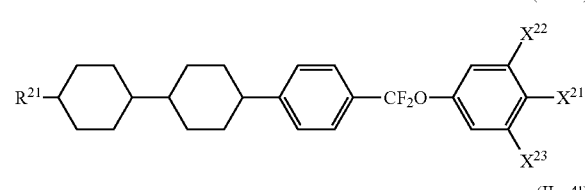
(IIa-4j)
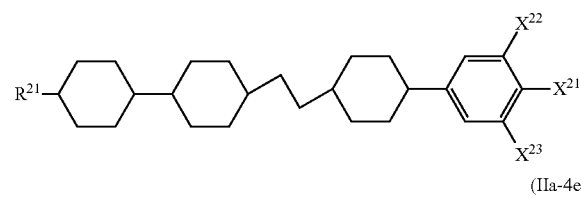
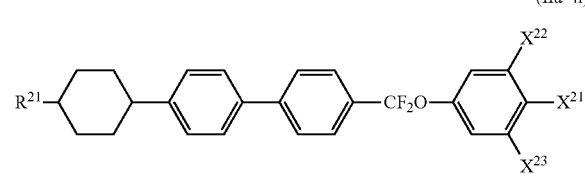
(IIa-4k)
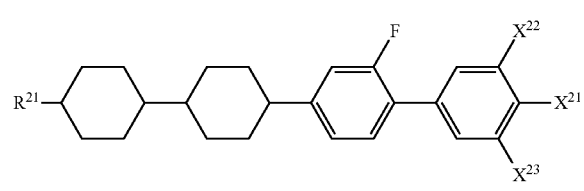
(IIa-4l)
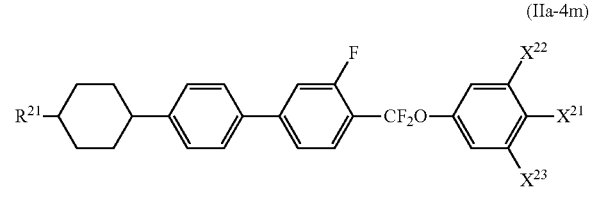
(IIa-4m)

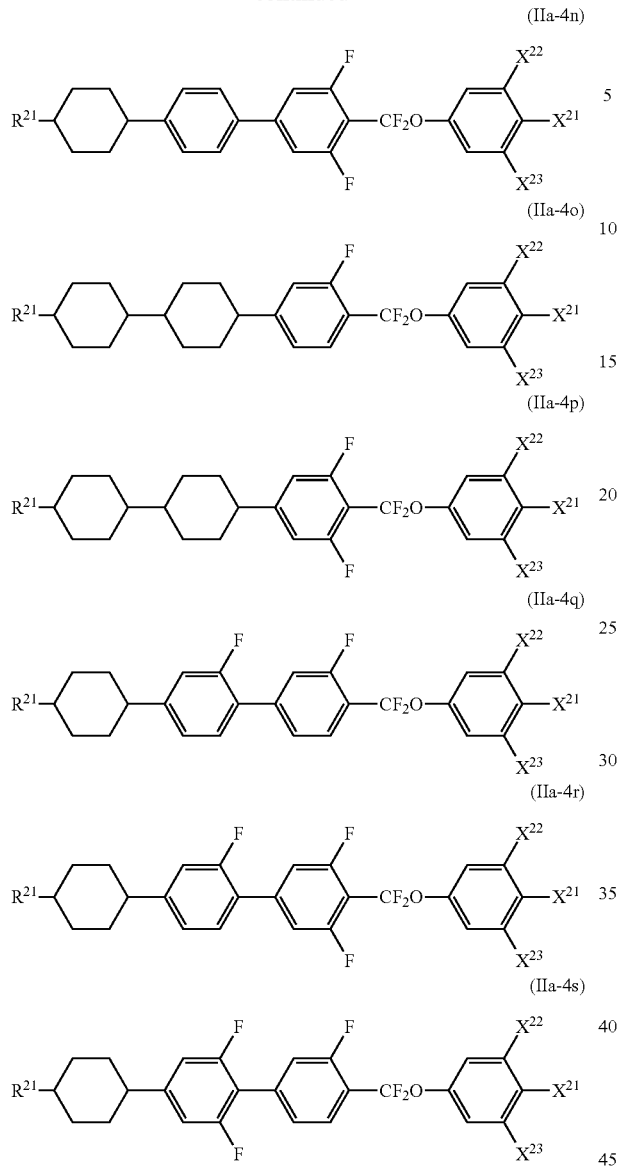

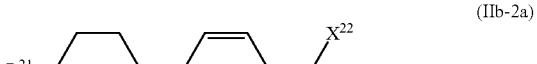

As the compound represented by the general formula (IIb), in particular, compounds represented by the following general formulas (IIb-2a) to (IIb-2c) and general formulas (IIb-3a) to (IIb-3e) may be mentioned. In addition, as the compound represented by the general formula (IIc), in particular, compounds represented by the following general formulas (IIc-2a) to (IIc-2c) and general formulas (IIc-3a) to (IIc-3e) may be mentioned. In the general formulas (IIb-2a) to (IIc-3e), $R^{21}$ is similar to that of each of the general formulas (IIb) and (IIc) and represents preferably an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms, and further preferably an alkyl group having 1 to 8 carbon atoms. In addition, in the general formulas (IIb-2a) to (IIc-3e), $X^{21}$ is similar to that of each of the general formulas (IIb) and (IIc) and represents preferably a fluorine atom, a cyano group, a trifluoromethyl group, a fluoromethoxy group, a difluoromethoxy group, or a trifluoromethoxy group, more preferably a fluorine atom or a cyano group, and further preferably a cyano group. In the general formulas (IIb-2a) to (IIc-3e), $X^{22}$ and $X^{23}$ each independently represent a hydrogen atom or a fluorine atom.

[Chem. 19]

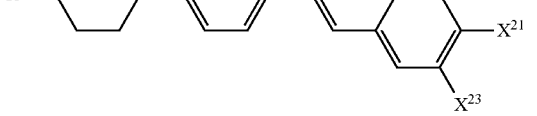
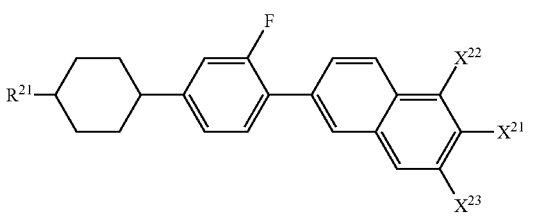

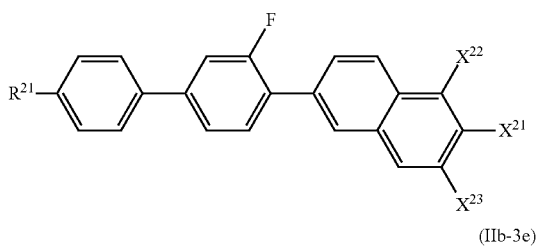
(IIb-3d)

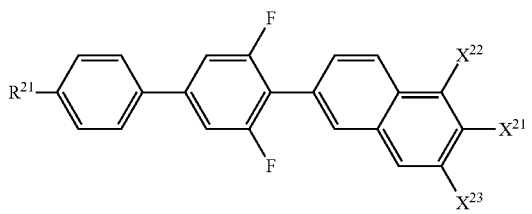
(IIb-3e)

[Chem. 20]

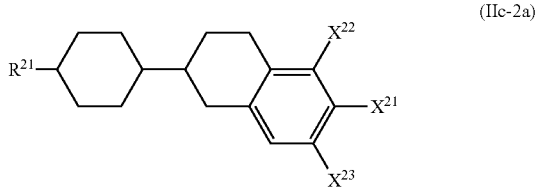
(IIc-2a)

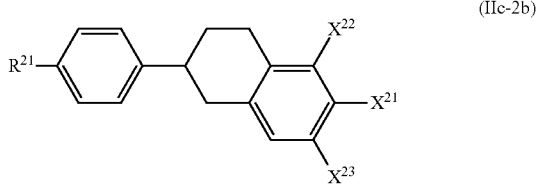
(IIc-2b)

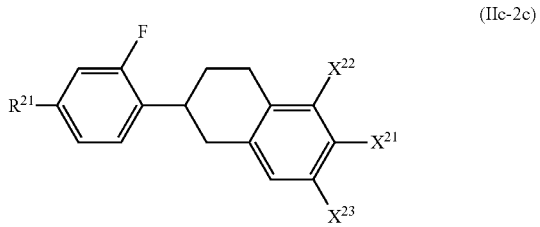
(IIc-2c)

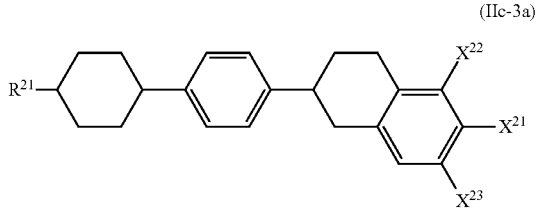
(IIc-3a)

(IIc-3b)

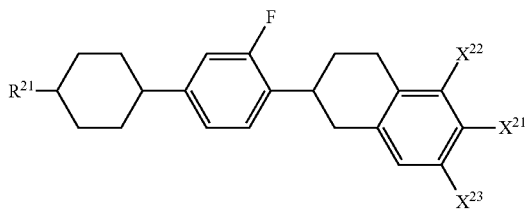

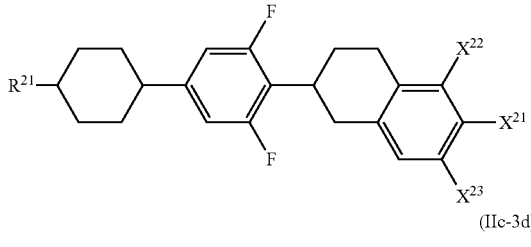
(IIc-3c)

(IIc-3d)

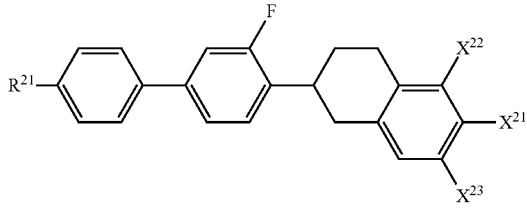
(IIc-3e)

When the nematic liquid crystal composition used for the present invention contains the compound represented by the general formula (II), one type may only be contained, or at least two types may be contained in combination. As the nematic liquid crystal composition used for the present invention, at least one type of compound selected from the group consisting of the compounds represented by the general formulas (IIa) to (IIc) is preferably contained, at least one type of compound represented by the general formula (IIa) is more preferably contained, at least one type of compound represented by the general formula (IIa-1) is further preferably contained, and at least one type of compound selected from the group consisting of the compounds represented by the general formulas (IIa-2a) to (IIa-2v), the general formulas (IIa-3a) to (IIa-3x), the general formulas (IIa-3'a) to (IIa-3'z), and the general formulas (IIa-4a) to (IIa-4s) is even further preferably contained. Among those mentioned above, at least one type of compound selected from the group consisting of the compounds represented by the general formulas (IIa-2a) to (IIa-2v) and at least one type of compound selected from the group consisting of the compounds represented by the general formulas (IIa-3a) to (IIa-3x) and the general formulas (IIa-3'a) to (IIa-3'p) are preferably contained.

When the nematic liquid crystal composition used for the present invention contains the compound represented by the general formula (II), although the content of the compound represented by the general formula (II) in the nematic liquid crystal composition is preferably in a range of 5 to 95 percent by mass and more preferably in a range of 10 to 90 percent by mass, in order to stably exhibit a blue phase, the content described above is further preferably in a range of 60 to 85 percent by mass, and when the response speed is emphasized, the content is further preferably in a range of 15 to 60 percent by mass.

As the nematic liquid crystal composition used for the present invention, a composition containing at least one of the compound represented by the general formula (I) and the compound represented by the general formula (II) is preferable, and a composition containing the above two compounds is more preferable. In the latter composition, when the stability of blue phase exhibition is emphasized, a composition containing 15 to 60 percent by mass of the compound represented by the general formula (I) and 60 to 85 percent by mass of the compound represented by the general formula (II) is preferable, and when the response speed is emphasized, a composition containing 40 to 85 percent by mass of the compound represented by the general formula (I) and 15 to 60 percent by mass of the compound represented by the general formula (II) is preferable.

Furthermore, as the nematic liquid crystal composition used for the present invention, the content of a liquid crystal compound having a larger number of benzene skeletons than that of cyclohexane skeletons in its molecule is preferably 50 percent by mass or more of the total liquid crystal compounds in the nematic liquid crystal composition and more preferably 60 percent by mass or more. When the content rate of a liquid crystal compound having a larger number of benzene skeletons than that of cyclohexane skeletons is increased, a liquid crystal composition exhibiting an optically isotropic phase, in particular a blue phase, may be easily obtained by addition of a chiral compound. In particular, a nematic liquid crystal composition is preferable in which with respect to total liquid crystal compounds in the nematic liquid crystal composition, the content of a liquid crystal compound having a larger number of benzene skeletons than that of cyclohexane skeletons in its molecule is 50 percent by mass or more, and the content of a liquid crystal compound having a larger number of cyclohexane skeletons present in its molecule than that of benzene skeletons is 1 to 50 percent by mass.

In this case, the "benzene skeleton" includes not only a ring structure (a phenyl group or a 1,4-phenylene group) formed only from carbon atoms and hydrogen atoms but also a ring structure in which at least one hydrogen atom in the ring structure is each independently substituted by another group (such as a halogen atom, an alkyl group, or an alkoxy group).

In addition, the "cyclohexane skeleton" includes not only a ring structure (a cyclohexyl group or a trans-1,4-cyclohexylene group) formed only from carbon atoms and hydrogen atoms but also a ring structure (such as a 4-tetrahydropyranyl group, a 1,4-dioxanyl group, a 1,3-dioxanyl group, a tetrahydropyrane-2,5-diyl group, or a 1,3-dioxane-2,5-diyl group) in which one methylene group present in the ring structure or at least two methylene groups therein which are not adjacent to each other are substituted by at least one oxygen atom and a ring structure in which at least one hydrogen atom in each of the ring structures mentioned above is each independently substituted by another group (such as a halogen atom, an alkyl group, or an alkoxy group).

As the nematic liquid crystal composition used for the present invention, a composition which exhibits a nematic liquid crystal phase at least in a temperature range of −10° C. to 50° C. is preferable. By the use of a nematic liquid crystal composition which exhibits a nematic liquid crystal phase in a relatively low and sufficiently wide temperature range, a liquid crystal-polymer composite material exhibiting a blue phase in a lower and wider temperature range can be obtained. In addition, as described later, when the liquid crystal-polymer composite material of the present invention is manufactured by preparing a composition in which a nematic liquid crystal composition, a chiral compound, and at least one type of polymerizable compound are mixed in advance and polymerizing the compound having a polymerizable group contained in the composition, polymerization can be performed at a low temperature at which unintended thermal polymerization is not induced, and in addition, handling properties are also excellent.

In addition, as the nematic liquid crystal composition used for the present invention, the dielectric constant (E) thereof is preferably positive. Although the dielectric anisotropy ($\Delta\in$) of the nematic liquid crystal composition used for the present invention may be either positive or negative, the positive dielectric anisotropy is preferable. In addition, a higher absolute value of the dielectric anisotropy is preferable. When a nematic liquid crystal composition having a positive dielectric anisotropy is used, a liquid crystal-polymer composite material having a positive dielectric anisotropy can be obtained. As in the case described above, when a nematic liquid crystal composition having a large absolute value of the dielectric anisotropy is used, a liquid crystal-polymer composite material having a large absolute value of the dielectric anisotropy can be obtained.

[Chiral Compound]

The liquid crystal-polymer composite material of the present invention contains at least one type of chiral compound. Since a chiral compound is contained, twisted alignment is induced in a nematic liquid crystal composition, and as a result, a liquid crystal composition which exhibits a blue phase and/or a cholesteric phase having a desired pitch can be obtained.

Incidentally, the pitch represents the length of one cycle of a helical structure of liquid crystal molecules. As the addition amount (percent by mass) of a chiral compound to a nematic liquid crystal composition is increased, the pitch (μm) is decreased. In particular, when the concentration of a chiral compound is low, such as an addition amount of approximately one to several percent by mass, it has been known that the relationship in which the product of the addition amount of a chiral compound and the pitch is constant is well satisfied, and a helical twisting power (HTP) (1/μm) obtained by inversion thereof is used as an evaluation parameter of a power inducing the characteristic twisted alignment of an optically active compound. In the following equation, "P" represents the pitch (μm), and "C" represents the addition amount (percent by mass) of a chiral compound.

$$HTP=1/(P\times 0.01C) \quad [\text{Eq. 1}]$$

As this chiral compound, any one of a compound having an asymmetric atom, a compound having axial asymmetry, and a compound having plane asymmetry may by used. In addition, the chiral compound may have or may have not a polymerizable group.

As a chiral compound contained in the liquid crystal-polymer composite material of the present invention, a compound having an asymmetric atom or a compound having axial asymmetry is preferable, and a compound having an asymmetric atom is particularly preferable. As the compound having an asymmetric atom, a compound having an asymmetric atom in a side chain portion, a compound having an asymmetric atom in a ring structural portion, and a compound having asymmetric atoms in the two portions described above may be mentioned. In the compound having an asymmetric atom, when the asymmetric atom is an asymmetric carbon atom, although a compound which is not likely to perform stereoinversion is preferable, a hetero atom may also function as the asymmetric atom. The asymmetric atom may be incorporated either in a part of a chain structure or in a part of a ring structure. When a strong helical twisting power is particularly required, as the chiral compound contained in the liquid crystal-polymer composite material of the present invention, a compound having axial asymmetry is preferable.

<Compound Having Asymmetric Atom>

As the compound having an asymmetric atom, in particular, a compound represented by the following general formula (Ch-I) is preferable.

[Chem. 21]

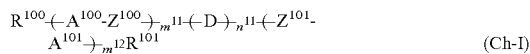

(Ch-I)

(In the general formula (Ch-I), $R^{100}$ and $R^{101}$ each independently represent a hydrogen atom, a cyano group, —$NO_2$, a halogen atom, —OCN, —SCN, —$SF_5$, a chiral or an achiral alkyl group having 1 to 30 carbon atoms (one methylene group in the alkyl group or at least two methylene groups therein which are not adjacent to each other each may be independently substituted by —O—, —S—, —NH—, —N($CH_3$)—, —CO—, —COO—, —OCO—, —OCO—O—, —S—CO—, —CO—S—, —CH=CH—, —$CF_2$—, —CF=CH—, —CH=CF—, —CF=CF—, or —C≡C— so that oxygen atoms or sulfur atoms are not directly bonded to each other, and at least one hydrogen atom present in the alkyl group each may be independently substituted by a halogen atom or a cyano group.), a polymerizable group, or a chiral group including a ring structure, and when $n^{11}$ represents 0, at least one of $R^{100}$ and $R^{101}$ represents a chiral alkyl group;

$Z^{100}$ and $Z^{101}$ each independently represent —O—, —S—, —CO—, —COO—, —OCO—, —O—OCO—, —CO—N($R^{105}$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—COO—, —OCO—CH=CH—, or a single bond;

$A^{100}$ and $A^{101}$ each independently represent (a') a trans-1,4-cyclohexylene group (one methylene group present in the group or at least two methylene groups therein which are not adjacent to each other each may be independently substituted by an oxygen atom or a sulfur atom);

(b') a 1,4-phenylene group (one —CH= present in this group or at least two —CH='s therein which are not adjacent to each other may be substituted by at least one nitrogen atom), or (c') a 1,4-cyclohexenylene group, a 1,4-bicyclo[2,2,2]octylene group, indane-2,5-diyl, a naphthalene-2,6-diyl group, a decahydronaphthalene-2,6-diyl group, and a 1,2,3,4-tetrahydronaphthalene-2,6-diyl group (one methylene group present in each of those groups or at least two methylene groups therein which are not adjacent to each other each may be independently substituted by an oxygen atom or a sulfur atom, and one —CH= present in each of those groups or at least two —CH='s therein which are not adjacent to each other may be substituted by at least one nitrogen atom);

when the number of $A^{100}$ or $A^{101}$ is more than two, they may be the same or different from each other;

although $n^{11}$ represents 0 or 1, when $n^{11}$ represents 0, $m^{12}$ represents 0, and $m^{11}$ represents 0, 1, 2, 3, 4, or 5, and when $n^{11}$ represents 1, $m^{11}$ and $m^{12}$ each independently represent 0, 1, 2, 3, 4, or 5; and D represents a divalent group represented by one of the following formulas (D1) to (D4) (in the formulas (D1) to (D4), the asterisk (*) represents a chiral carbon atom, and portions provided with black circles are each bonded to $Z^{100}$ (or $R^{100}$) or $Z^{101}$ (or $R^{101}$).)

[Chem. 22]

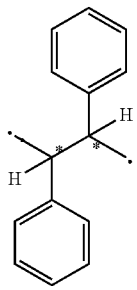

(D1)

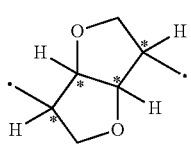

(D2)

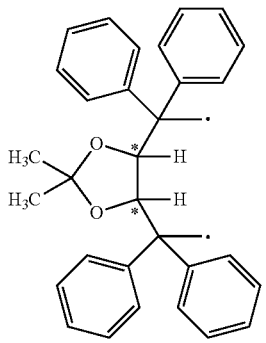

(D3)

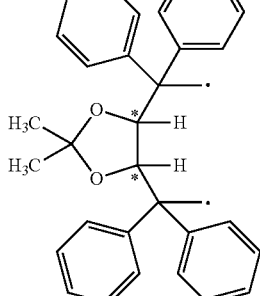

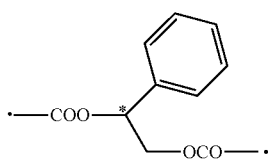

(D4)

In the general formula (Ch-I), $R^{100}$ and $R^{101}$ each independently represent a hydrogen atom, a cyano group, —$NO_2$, a halogen atom, —OCN, —SCN, —$SF_5$, a chiral or an achiral alkyl group having 1 to 30 carbon atoms, a polymerizable group, or a chiral group having a ring structure. When $n^{11}$ represents 0, at least one of $R^{100}$ and $R^{101}$ represents a chiral alkyl group.

When $R^{100}$ or $R^{101}$ in the general formula (Ch-I) represents a chiral or an achiral alkyl group having 1 to 30 carbon atoms, one methylene group (—$CH_2$—) present in the alkyl group or at least two methylene groups therein which are not adjacent to each other each may be independently substituted by —O—, —S—, —NH—, —N($CH_3$)—, —CO—, —COO—, —OCO—, —OCO—O—, —S—CO—, —CO—S—, —CH=CH—, —$CF_2$—, —CF=CH—, —CH=CF—, —CF=CF—, or —C≡C—, and at least one hydrogen atom in the alkyl group each may be independently substituted by a halogen atom or a cyano group. In addition, the alkyl group described above may be any one of a linear chain group, a branched chain group, and a group including a ring structure.

As the chiral alkyl group, groups represented by the following general formulas (Ra) to (Rk) are preferable. In the general formulas (Ra) to (Rk), the asterisk (*) represents a chiral carbon atom. When $R^{100}$ or $R^{101}$ represents one of those groups, the left ends thereof are each bonded to $A^{100}$ (or D or $Z^{101}$) or $A^{101}$ (or D or $Z^{100}$).

[Chem. 23]

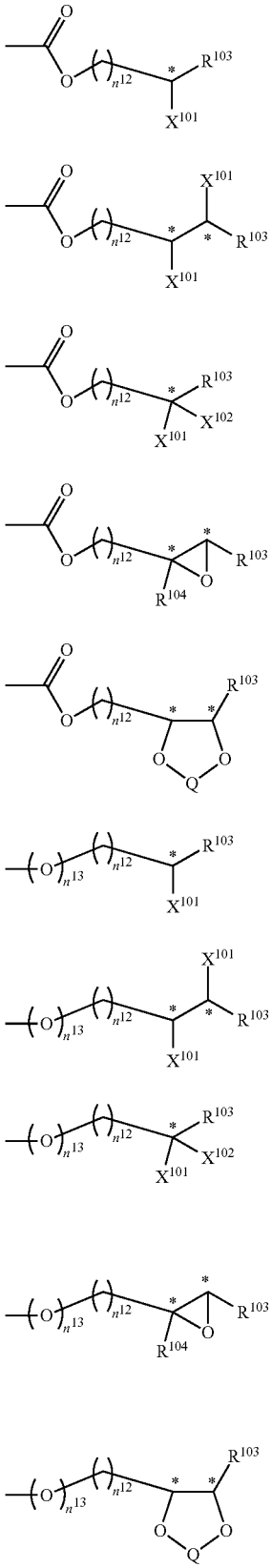

(Ra)
(Rb)
(Rc)
(Rd)
(Re)
(Rf)
(Rg)
(Rh)
(Ri)
(Rj)

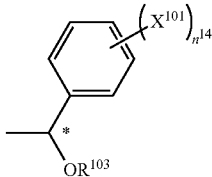

(Rk)

In the general formulas (Ra) to (Rk), $R^{103}$ and $R^{104}$ each independently represent a linear or a branched alkyl group having 1 to 12 carbon atoms or a hydrogen atom. However, in the general formulas (Ra), (Rb), (Rd), (Re), (Rf), (Rg), (Ri), and (Rj), $R^{103}$ represents a linear or a branched alkyl group having 1 to 10 carbon atoms so that the carbon atom (at a position provided with *) to which $R^{103}$ is bonded is an asymmetric atom. At least one methyl group in the alkyl group each may be independently substituted by —O—, —S—, —NH—, —N(CH$_3$)—, —CO—, —CO—O—, —O—CO—, —O—CO—O—, —S—CO—, —CO—S—, —O—SO$_2$—, —SO$_2$—O—, —CH=CH—, —C≡C—, a cyclopropyl group, or —Si(CH$_3$)$_2$— so that oxygen atoms or sulfur atoms are not directly bonded to each other, and furthermore, at least one hydrogen atom in the alkyl group each may be independently substituted by a halogen atom (such as a fluorine atom, a chlorine atom, or a bromine atom) or a cyano group. In addition, the above alkyl group may have a polymerizable group. As this polymerizable group, for example, a vinyl group, an allyl group, or a (meth)acryloyl group may be mentioned.

As $R^{103}$ in the general formulas (Ra) to (Rj), a linear or a branched alkyl group having 1 to 12 carbon atoms in which neither methylene group nor hydrogen atom are substituted by other groups and the like (that is, being unsubstituted) is preferable, an unsubstituted linear or branched alkyl group having 1 to 8 carbon atoms is more preferable, and an unsubstituted linear alkyl group having 1 to 6 carbon atoms is further preferable.

As $R^{104}$ in the general formulas (Rd) or (Ri), a hydrogen atom or an unsubstituted linear or branched alkyl group having 1 to 5 carbon atoms is preferable, a hydrogen atom or an unsubstituted linear alkyl group having 1 to 3 carbon atoms is more preferable, and a hydrogen atom or a methyl group is further preferable.

In the general formulas (Ra) to (Rk), $n^{12}$ represents an integer of 0 to 20, preferably an integer of 0 to 10, more preferably an integer of 0 to 5, and further preferably 0.

In the general formulas (Ra) to (Rk), $n^{13}$ represents 0 or 1.

In addition, in the general formula (Rk), $n^{14}$ represents an integer of 0 to 5.

In the general formulas (Ra) to (Rk), $X^{101}$ and $X^{102}$ each independently represent a halogen atom (a fluorine atom, a chlorine atom, a bromine atom, or an iodine atom), a cyano group, a phenyl group (at least one arbitrary hydrogen atom of the phenyl group each may be independently substituted by a halogen atom, a methyl group, a methoxy group, a trifluoromethyl group (—CF$_3$), or a trifluoromethoxy group (—OCF$_3$)), an alkyl group having 1 to 6 carbon atoms, an alkoxy group having 1 to 6 carbon atoms, a trifluoromethyl group, or a trifluoromethoxy group. However, in the general formulas (Ra), (Rb), (Rf), and (Rg), $X^{101}$ and $R^{103}$ represent groups different from each other so that the carbon atom (at a position provided with *) to which $X^{101}$ is bonded is an asymmetric atom. In addition, in the general formulas (Rc) and (Rh), $X^{101}$, $X^{102}$, and $R^{103}$ represent groups different from each other so that the carbon atom (at a position provided with *) to which $X^{101}$ is bonded is an asymmetric atom.

In the general formulas (Ra), (Rb), (Rc), (Rf), (Rg), (Rh), and (Rk), $X^{101}$ and $X^{102}$ each preferably independently represent a halogen atom, a phenyl group (at least one arbitrary hydrogen atom of the phenyl group each may be independently substituted by a halogen atom, a methyl group, a methoxy group, a trifluoromethyl group, or a trifluoromethoxy group), a methyl group, a methoxy group, a trifluoromethyl group, or a trifluoromethoxy group. Among those mentioned above, in the general formulas (Ra), (Rb), (Rc), (Rf), (Rg), and (Rh), $X^{101}$ and $X^{102}$ each independently represent more preferably a phenyl group (at least one arbitrary hydrogen atom of the phenyl group each may be independently substituted by a halogen atom, a methyl group, a methoxy group, a trifluoromethyl group, or a trifluoromethoxy group), and further preferably an unsubstituted phenyl group. In addition, as $X^{101}$ in the general formula (Rk), a halogen atom, a cyano group, an alkyl group, an alkoxy group, a trifluoromethyl group, or a trifluoromethoxy group is more preferable, and a halogen atom, a methyl group, a trifluoromethyl group, or a trifluoromethoxy group is further preferable.

In the general formulas (Re) and (Rj), Q represents a divalent hydrocarbon group. As the divalent hydrocarbon group, a group having a linear chain, a branched chain, or a ring structure may be used. In addition, the number of carbon atoms of the divalent hydrocarbon group is preferably 1 to 16, more preferably 1 to 10, and further preferably 1 to 6. As the divalent hydrocarbon group, a group is preferable which forms a simple bond with each of the two oxygen atoms in each of the general formulas (Re) and (Rj). In this case, in the general formulas (Re) and (Rj), the two carbon atoms provided with asterisks, the two oxygen atoms respectively bonded thereto, and one carbon atom of Q form a five-membered ring. In particular, for example, a methylene group, a cyclopropylidene group, a cyclobutylidene group, a cyclopentylidene group, and a cyclohexylidene group, each of which is unsubstituted or substituted such that at least one hydrogen atom is substituted by a hydrocarbon group, may be mentioned, and a methylene group, an isopropylidene group, and a cyclohexylidene group are more preferable.

As the groups represented by the general formulas (Ra) to (Rk), the group represented by the general formula (Ra) or the general formula (Rf) is preferable. As the group represented by the general formula (Ra), a group is preferable in which in the general formula (Ra), $n^{12}$ represents an integer of 0 to 5, $X^{101}$ represents a phenyl group (at least one arbitrary hydrogen atom of the phenyl group each may be independently substituted by a halogen atom, a methyl group, a methoxy group, a trifluoromethyl group, or a trifluoromethoxy group), and $R^{103}$ represents an unsubstituted linear or branched alkyl group having 1 to 6 carbon atoms, and a group is more preferable in which $n^{12}$ represents an integer of 0 to 5, $X^{101}$ represents an unsubstituted phenyl group, and $R^{103}$ represents an unsubstituted linear or branched alkyl group having 1 to 6 carbon atoms.

As the group represented by the general formula (Rf), a group is preferable in which in the general formula (Rf), $n^{12}$ represents an integer of 0 to 5, $n^{13}$ represents 0 to 1, $X^{103}$ represents a halogen atom, a methyl group, or a trifluoromethyl group, and $R^{103}$ represents an unsubstituted linear alkyl group having 2 to 12 carbon atoms.

As $R^{100}$ or $R^{101}$ of the compound represented by the general formula (Ch-I), in particular, groups represented by the following formulas (Ra-1) to (Ra-3) or the following general formulas (Rf-1) to (Rf-3) are preferable. When $R^{100}$ or $R^{101}$ represents one of the groups mentioned above, the left end is bonded to $A^{100}$ (or D or $Z^{101}$) or $A^{101}$ (or D or $Z^{1m}$). In addition, the asterisk represents a chiral carbon atom.

[Chem. 24]

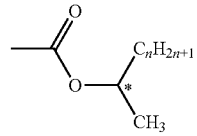

(Ra-1)

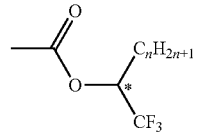

(Ra-2)

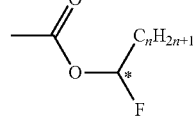

(Ra-3)

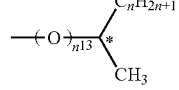

(Rf-1)

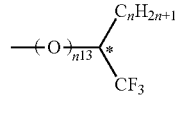

(Rf-2)

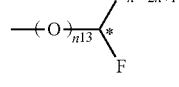

(Rf-3)

In the general formulas (Rf-1) to (Rf-3), $n^{13}$ represents 0 or 1. In addition, in the general formulas (Ra-1) to (Ra-3) and (Rf-1) to (Rf-3), n represents an integer of 2 to 12. In the general formulas (Ra-1) to (Ra-3) and (Rf-1) to (Rf-3), n represents preferably an integer of 3 to 8 and more preferably an integer of 4, 5, or 6.

When $R^{100}$ or $R^{101}$ in the general formula (Ch-I) represents a polymerizable group, as the polymerizable group, a group having the structure represented by one of the following formulas (R-1) to (R-16) is preferable. The right end of the group represented by each of the formulas (R-1) to (R-14) and (R-16) and the left end of the group represented by the formula (R-15) are each bonded to $A^{100}$ (or D or $Z^{101}$) or $A^{101}$ (or D or $Z^{100}$).

[Chem. 25]

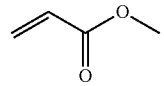

(R-1)

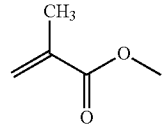

(R-2)

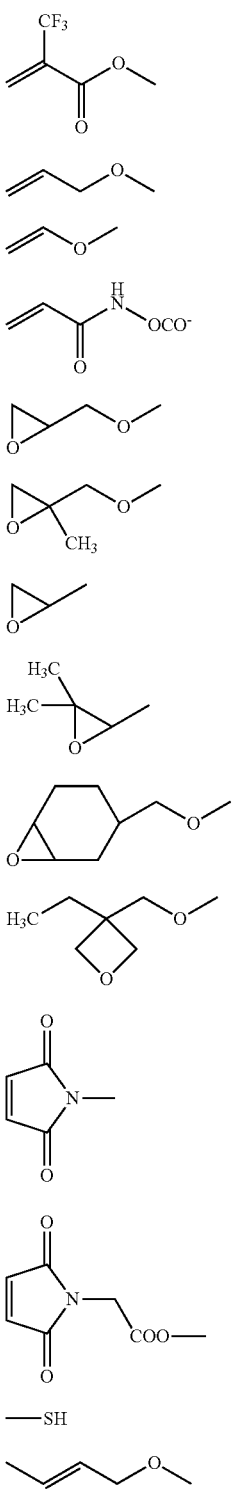

Those polymerizable groups are each cured by radical polymerization, radical addition polymerization, cationic polymerization, or anionic polymerization. In particular, when ultraviolet polymerization is used as a polymerization method, the group represented by the general formula (R-1), (R-2), (R-4), (R-5), (R-7), (R-11), (R-13), (R-15), or (R-16) is preferable, the group represented by the general formula (R-1), (R-2), (R-7), (R-11), (R-13), or (R-16) is more preferable, and the group represented by the general formula (R-1), (R-2), or (R-16) is further preferable.

When $R^{100}$ or $R^{101}$ in the general formula (Ch-I) represents a chiral group having a ring structure, the ring structure of the group may be either an aromatic or an aliphatic structure. As a ring structure that an alkyl group can form, a single ring structure, a condensed ring structure, or a spirocyclic ring structure may be mentioned, and in addition, at least one hetero atom may be contained.

In the general formula (Ch-I), $Z^{100}$ or $Z^{101}$ each independently represent —O—, —S—, —CO—, —COO—, —OCO—, —O—COO—, —CO—N($R^{105}$)—, —N($R^{105}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH—, or a single bond. In addition, $R^{105}$ in —CO—N($R^{105}$)— or —N($R^{105}$)—CO— represents a linear or a branched alkyl group having 1 to 12 carbon atoms, preferably a linear or a branched alkyl group having 1 to 6 carbon atoms, and more preferably a linear alkyl group having 1 to 4 carbon atoms. When $m^{11}$ represents an integer of 2 or more, and a plurality of $Z^{100}$'s are present in one molecule, they may be the same or different from each other. As in the case described above, when $m^{12}$ represents an integer of 2 or more, and a plurality of $Z^{101}$'s are present in one molecule, they may be the same or different from each other. As the compound represented by the general formula (Ch-I), $Z^{100}$ and $Z^{101}$ each preferably independently represent —CF$_2$O—, —OCF$_2$—, —CF$_2$CF$_2$—, —CF=CF—, —COO—, —OCO—, —CH$_2$—CH$_2$—, —C≡C—, or a single bond.

In the general formula (Ch-I), $A^{100}$ or $A^{101}$ each independently represent the following (a') group, (b') group, or (c') group. When $m^{11}$ represents an integer of 2 or more, and a plurality of $A^{100}$'s are present in one molecule, they may be the same or different from each other. As in the case described above, when $m^{12}$ represents an integer of 2 or more, and a plurality of $A^{101}$'s are present in one molecule, they may be the same or different from each other.

(a') a trans-1,4-cyclohexylene group (one methylene group present in the group or at least two methylene groups therein which are not adjacent to each other each may be independently substituted by an oxygen atom or a sulfur atom.)

(b') a 1,4-phenylene group (one —CH= present in this group or at least two —CH='s therein which are not adjacent to each other may be substituted by at least one nitrogen atom.)

(c') a 1,4-cyclohexenylene group, a 1,4-bicyclo(2,2,2)octylene group, indane-2,5-diyl, a naphthalene-2,6-diyl group, a decahydronaphthalene-2,6-diyl group, and a 1,2,3,4-tetrahydronaphthalene-2,6-diyl group (one methylene group present in each of those groups or at least two methylene groups therein which are not adjacent to each other each may be independently substituted by an oxygen atom or a sulfur atom, and one —CH= present in this group or at least two —CH='s therein which are not adjacent to each other may be substituted by at least one nitrogen atom.)

The above (a') group, (b') group, and (c') group each may be unsubstituted or substituted such that at least one hydrogen atom in the group each may be independently substituted by a halogen atom, a cyano group, a nitro group, an alkyl group having 1 to 7 carbon atoms (at least one hydrogen atom in the alkyl group each may be independently substituted by a fluorine atom or a chlorine atom), an alkoxy group having 1 to 7 carbon atoms (at least one hydrogen atom in the alkoxy group each may be independently substituted by a fluorine atom or a chlorine atom), an alkylcarbonyl group having 1 to 7 carbon atoms (at least one hydrogen atom in the alkylcarbonyl group each may be independently substituted by a fluorine atom or a chlorine atom), or an alkoxycarbonyl group having 1 to 7 carbon atoms (at least one hydrogen atom in the alkoxycarbonyl group each may be independently substituted by a fluorine atom or a chlorine atom).

As $A^{100}$ and $A^{101}$ of the compound represented by the general formula (Ch-I), the above (a') group or the (b') group are preferable; an unsubstituted trans-1,4-cyclohexylene group, an unsubstituted 1,4-phenylene group, a trans-1,4-cyclohexylene group in which at least one hydrogen atom is each independently substituted by a fluorine atom, a chlorine atom, a cyano group, an alkyl group having 1 to 4 carbon atoms, an alkoxy group having 1 to 4 carbon atoms, an alkylcarbonyl group having 1 to 4 carbon atoms, or an alkoxycarbonyl group having 1 to 4 carbon atoms, or a 1,4-phenylene group in which at least one hydrogen atom is each independently substituted by a fluorine atom, a chlorine atom, a cyano group, an alkyl group having 1 to 4 carbon atoms, an alkoxy group having 1 to 4 carbon atoms, an alkylcarbonyl group having 1 to 4 carbon atoms, or an alkoxycarbonyl group having 1 to 4 carbon atoms are more preferable; an unsubstituted trans-1,4-cyclohexylene group or an unsubstituted 1,4-phenylene group is further preferable; and an unsubstituted 1,4-phenylene group is even further preferable.

In the general formula (Ch-I), $n^{11}$ represents 0 or 1.

When $n^{11}$ represents 0, $m^{12}$ represents 0, and $m^{12}$ represents 0, 1, 2, 3, 4, or 5. When $n^{11}$ and $m^{12}$ each represent 0, $m^{11}$ represents preferably 0, 1, 2, 3, or 4 and more preferably 1, 2, or 3.

When $n^{11}$ represents 1, $m^{11}$ and $m^{12}$ each independently represent 0, 1, 2, 3, 4, or 5, preferably 1, 2, 3, or 4, and more preferably 1, 2, or 3.

When $n^{11}$ represents 1, although $m^{11}$ and $m^{12}$ may be different from each other, they are preferably the same.

In the general formula (Ch-I), D represents a divalent group represented by one of the above formulas (D1) to (D4).

In each of the formulas (D1) to (D4), the portions provided with black circles are each bonded to $Z^{100}$ (or $R^{100}$) or $Z^{101}$ (or $R^{101}$).

In the group represented by the general formula (D1), (D3), or (D4), at least one arbitrary hydrogen atom of the benzene ring each may be independently substituted by a halogen atom (F, Cl, Br, or I), an alkyl group having 1 to 20 carbon atoms, or an alkoxy group having 1 to 20 carbon atoms. In the alkyl having 1 to 20 carbon atoms or the alkoxy group having 1 to 20 carbon atoms, each of which is used as a substituent of a hydrogen atom in the benzene ring, at least one hydrogen atom in the group may be substituted by a fluorine atom, and at least one methylene group in the group each may be independently substituted by —O—, —S—, —COO—, —OCO—, —CF$_2$—, —CF=CH—, —CH=CF—, —CF=CF—, or —C≡C— so that oxygen atoms or sulfur atoms are not directly bonded to each other.

Among the compounds represented by the general formula (Ch-I), as a compound in which $n^{11}$ represents 0, the rest of the structure of the compound other than the two ends represented by $R^{100}$ and $R^{101}$ preferably has the structure represented by one of the following general formulas (b1) to (b13). The structure represented by one of the general formulas (b1) to (b13) is bonded to $R^{100}$ at one end and is bonded to $R^{101}$ at the other end. However, in the compound having one of those structures, at least one of $R^{100}$ and 8101 represents a chiral alkyl group.

[Chem. 26]

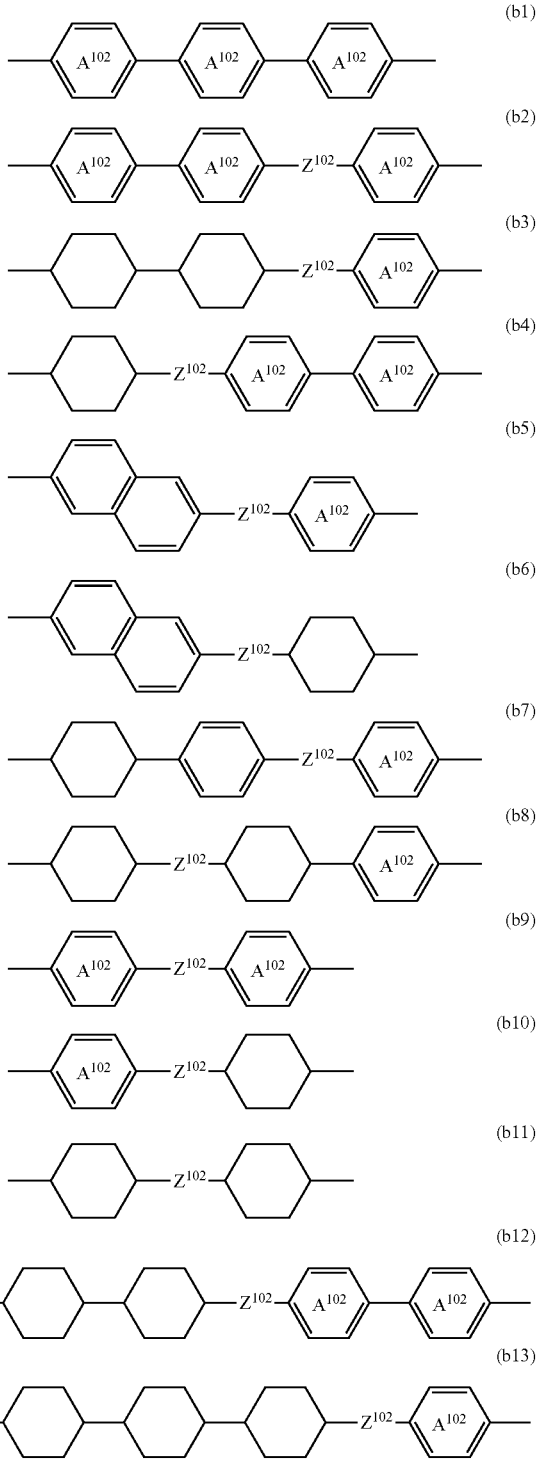

In the general formulas (b1) to (b13), $Z^{102}$ is similar to one of $Z^{100}$ and $Z^{101}$ in the general formula (Ch-I).

In addition, in the general formulas (b1) to (b13), $A^{102}$ represents a 1,4-phenylene group (one —CH= present in the group or at least two —CH='s therein which are not adjacent to each other may be substituted by at least one nitrogen atom, and at least one arbitrary hydrogen atom present in the group each may be independently substituted by a halogen atom, a methyl group, a methoxy group, a trifluoromethyl group, or a trifluoromethoxy group). When —CH= and/or a hydrogen atom in the 1,4-phenylene group is substituted, as for a liquid crystal composition containing this compound, the degradation in crystallinity and the direction and intensity of the dielectric anisotropy can be controlled.

In view of the reliability, a compound having as the ring structure in $A^{102}$, a benzene ring (that is, a compound having a 1,4-phenylene group in which no —CH= is substituted by a nitrogen atom) is more preferable than a compound having a heterocyclic ring, such as a pyridine ring or pyrimidine ring, (that is, a compound having a 1,4-phenylene group in which one —CH= or at least two —CH='s which are not adjacent to each other are substituted by at least one nitrogen atom). On the other hand, in order to increase the dielectric anisotropy, a compound having as the ring structure in $A^{102}$, a heterocyclic ring, such as a pyridine ring or a pyrimidine ring, is more preferable than a compound having a benzene ring. Although a compound having a hydrocarbon ring, such as a benzene ring or a cyclohexane ring, has a relatively low polarization characteristic, a compound having a heterocyclic ring, such as a pyridine ring or a pyrimidine ring, has a relatively high polarization characteristic and is preferable to stabilize the liquid crystallinity by the decrease in crystallinity.

Among the compounds represented by the general formula (Ch-I), as the compound in which $n^{11}$ and $m^{12}$ each represent 0, the following general formulas (Ch-I-1) to (Ch-I-30) are preferable. In the general formulas (Ch-I-1) to (Ch-I-30), $R^{100}$, $R^{101}$, and $Z^{100}$ represent the same meanings as those of $R^{100}$, $R^{101}$, and $Z^{100}$ in the general formula (Ch-I), at least one of $R^{100}$ and $R^{101}$ represents a chiral alkyl group, and $L^{100}$ to $L^{105}$ each independently represent a hydrogen atom or a fluorine atom.

[Chem. 27]

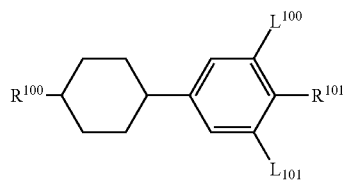
(Ch-I-1)

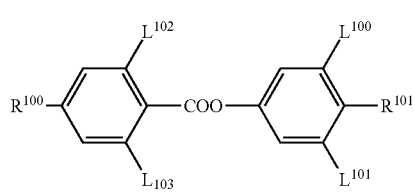
(Ch-I-2)

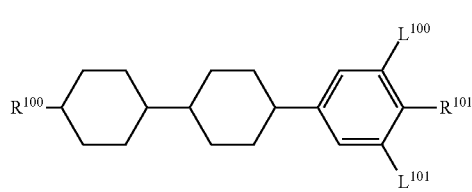
(Ch-I-3)

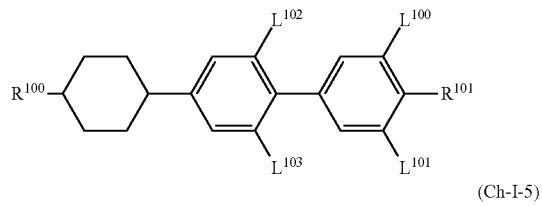
(Ch-I-4)

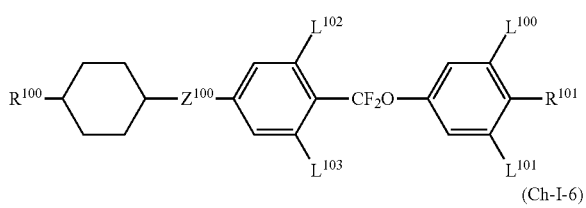
(Ch-I-5)

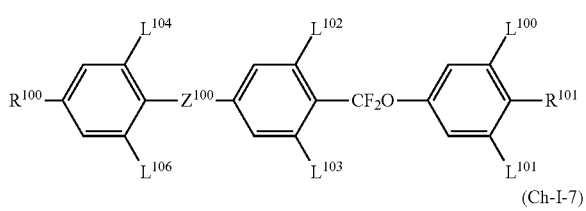
(Ch-I-6)

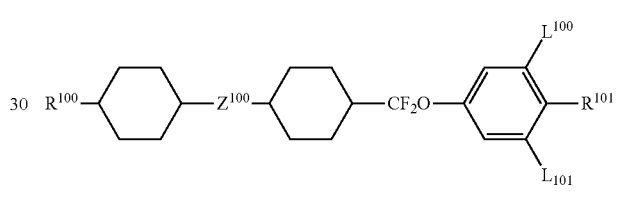
(Ch-I-7)

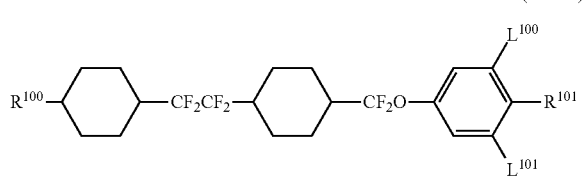
(Ch-I-8)

[Chem. 28]

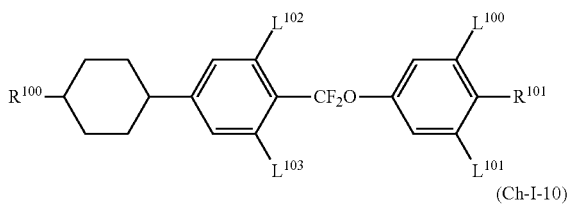
(Ch-I-9)

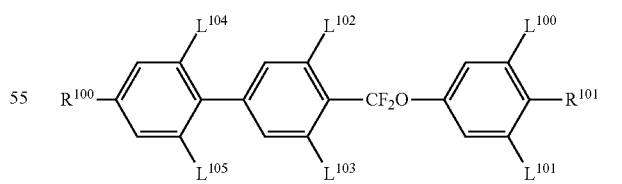
(Ch-I-10)

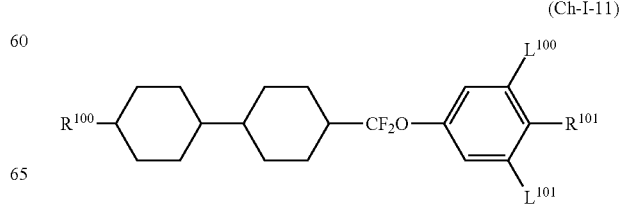
(Ch-I-11)

(Ch-I-12)
(Ch-I-13)
(Ch-I-14)

[Chem. 29]

(Ch-I-15)
(Ch-I-16)
(Ch-I-17)
(Ch-I-18)
(Ch-I-19)

(Ch-I-20)
(Ch-I-21)

[Chem. 30]

(Ch-I-22)
(Ch-I-23)
(Ch-I-24)

[Chem. 31]

(Ch-I-25)
(Ch-I-26)
(Ch-I-27)

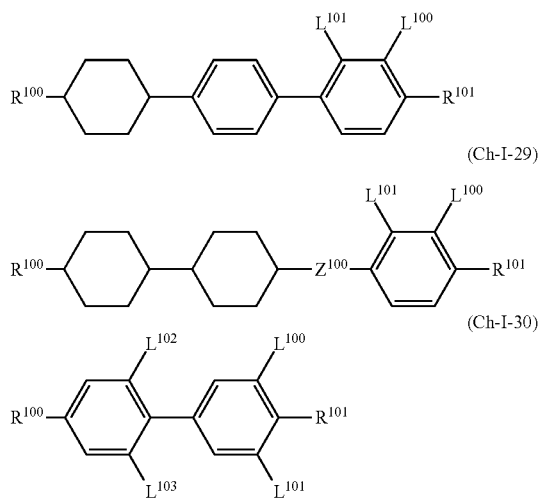

(Ch-I-28)
(Ch-I-29)
(Ch-I-30)

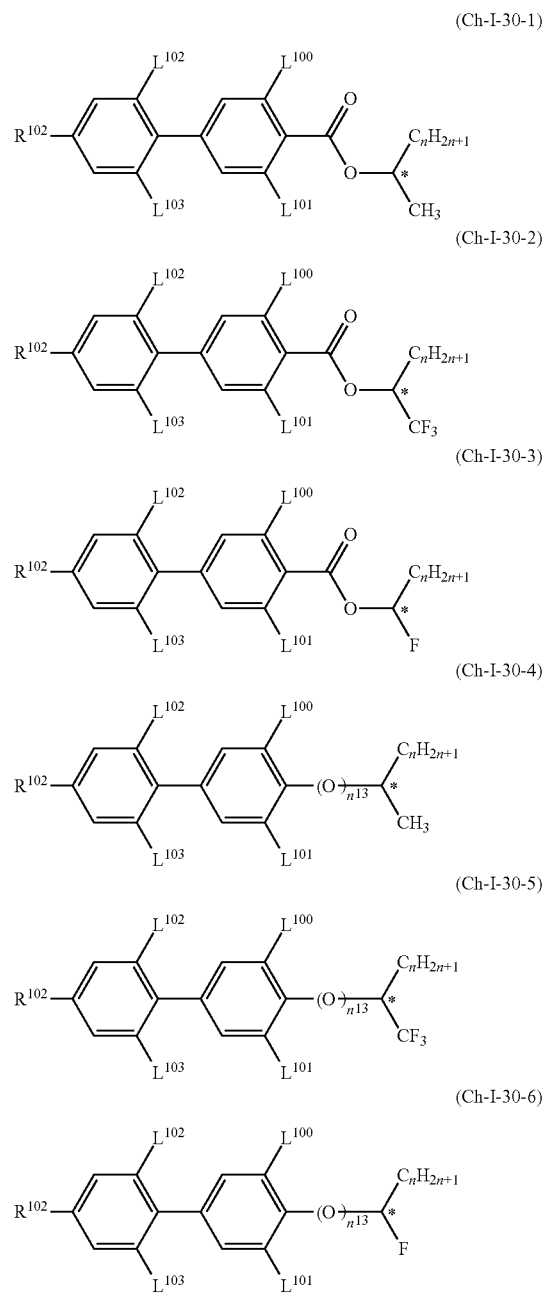

(Ch-I-30-1)
(Ch-I-30-2)
(Ch-I-30-3)
(Ch-I-30-4)
(Ch-I-30-5)
(Ch-I-30-6)

As the compounds represented by the general formulas (Ch-I-1) to (Ch-I-30), a compound in which at least one of $R^{100}$ and $R^{101}$ is represented by any one of the general formulas (Ra) to (Rk) is preferable, and a compound in which at least one of $R^{100}$ and $R^{101}$ is represented by any one of the general formulas (Ra-1) to (Ra-3) or the general formulas (Rf-1) to (Rf-3) is more preferable. As the compound in which one of $R^{100}$ and $R^{101}$ is only represented by any one of the general formulas (Ra) to (Rk), a compound in which the remaining $R^{100}$ or $R^{101}$ represents an achiral alkyl group having 1 to 30 carbon atoms (one methylene group in the alkyl group or at least two methylene groups therein which are not adjacent to each other each may be independently substituted by —O—, —S—, —NH—, —N(CH$_2$)—, —CO—, —COO—, —OCO—, —OCO—O—, —S—CO—, —CO—S—, —CH=CH—, —CF$_2$—, —CF=CH—, —CH=CF—, —CF=CF—, or —C≡C—, and at least one hydrogen atom in the alkyl group each may be independently substituted by a halogen atom or a cyano group) is preferable, and a compound in which the remaining $R^{100}$ or $R^{101}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms is more preferable.

As the liquid crystal-polymer composite material of the present invention, at least one type of compound represented by one of the general formulas (Ch-I-1) to (Ch-I-30) is preferably contained, and the compound represented by the general formula (Ch-I-30) is more preferably contained. As the compound represented by the general formula (Ch-I-30), in particular, compounds represented by the following general formulas (Ch-I-30-1) to (Ch-I-30-6) (in the formulas, $n^{13}$ represents 0 or 1, n represents an integer of 2 to 12, $R^{102}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, and $L^{100}$ to $L^{105}$ each independently represent a hydrogen atom or a fluorine atom) may be mentioned. In the general formulas (Ch-I-30-1) to (Ch-I-30-6), $R^{102}$ preferably represents an alkyl group having 1 to 6 carbon atoms, an alkoxy group having 1 to 6 carbon atoms, an alkenyl group having 2 to 6 carbon atoms, or an alkenyloxy group having 2 to 6 carbon atoms.

When $n^{11}$ represents 1, the compound represented by the general formula (Ch-I) has a structure having an asymmetric carbon in the ring structural portion. In this case, as the compound represented by the general formula (Ch-I), a compound in which D is represented by the above general formula (D2) or (D4) is preferable, and a compound in which D is represented by the formula (D4) is more preferable. As the compound in which D is represented by (D2), compounds represented by the following general formulas (K2-1) to (K2-8) are preferable, and as the compound in which D is represented by (D4), compounds represented by the following general formulas (K3-1) to (K3-6) are preferable. In the general formulas (K2-1) to (K2-8) and (K3-1) to (K3-6), the asterisk (*) represents a chiral carbon atom.

[Chem. 33]
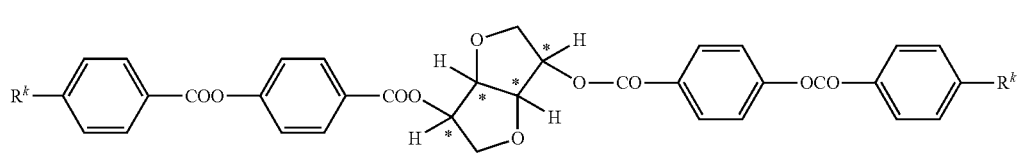 (K2-1)
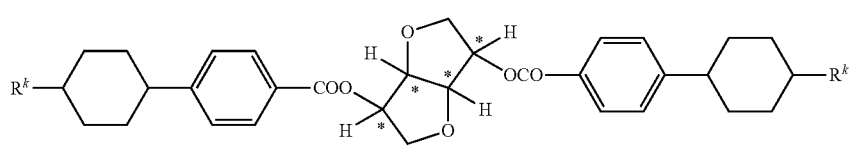 (K2-2)
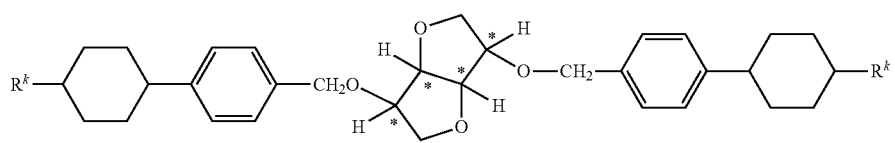 (K2-3)
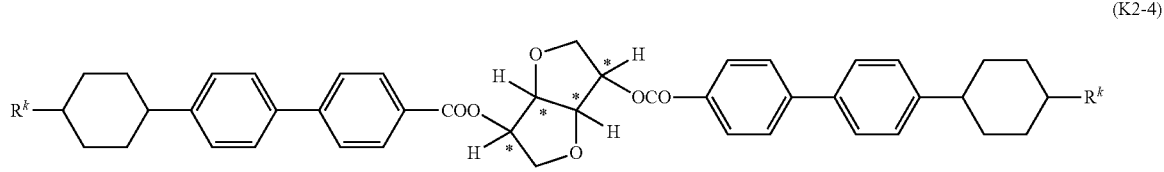 (K2-4)
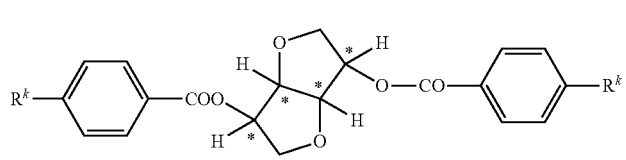 (K2-5)
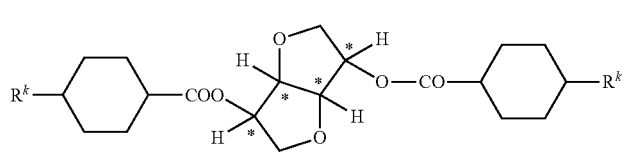 (K2-6)
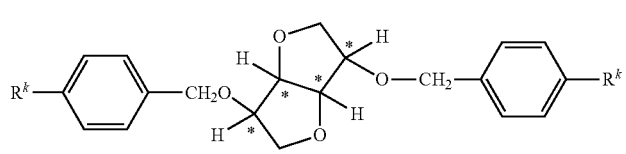 (K2-7)
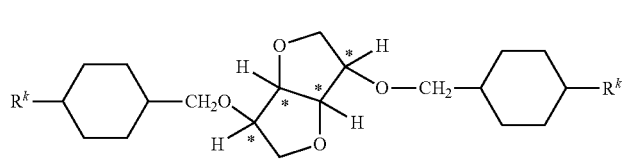 (K2-8)
[Chem. 34]
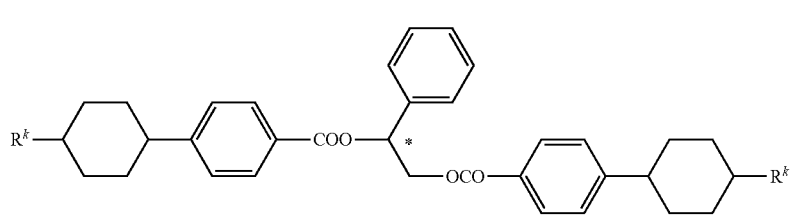 (K3-1)

-continued

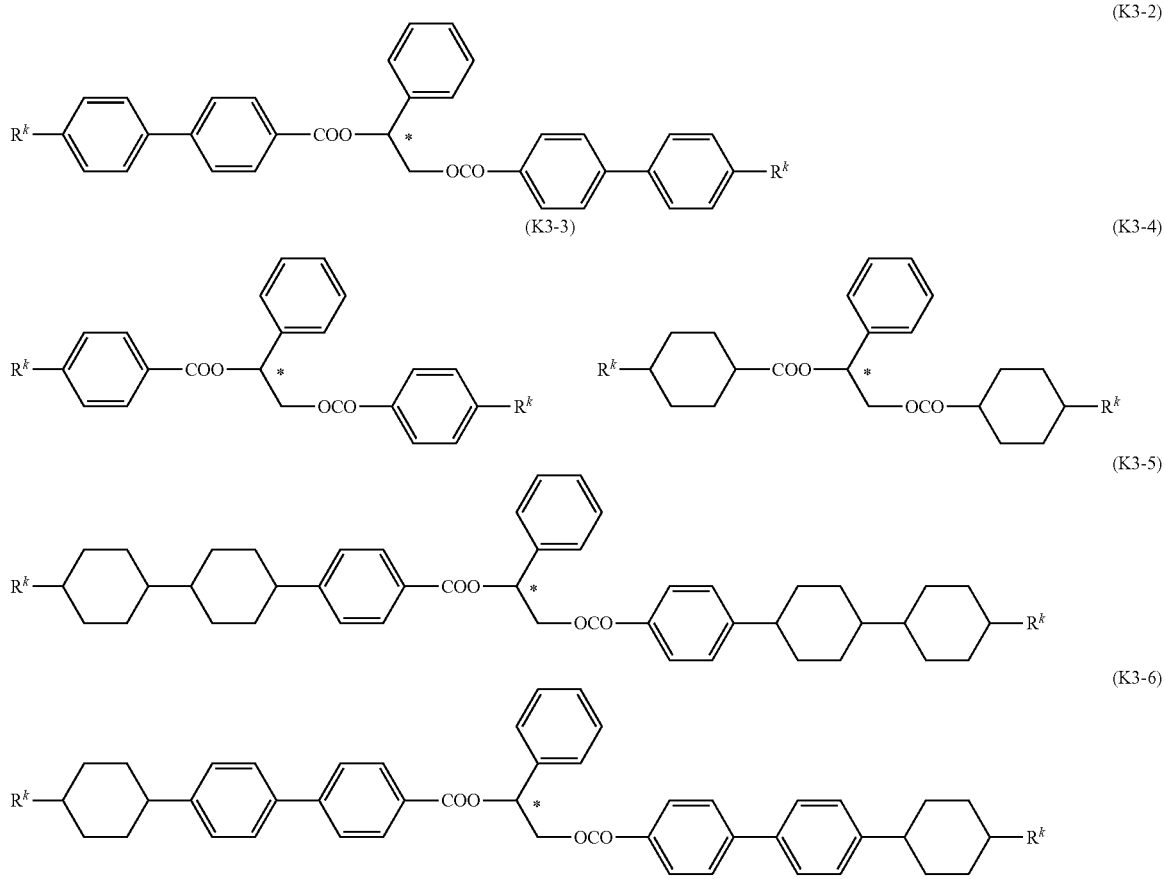

In the general formulas (K2-1) to (K2-8) and (K3-1) to (K3-6), $R^k$'s each independently represent the same meaning as that of $R^{100}$ and $R^{101}$ in the general formula (Ch-I). As the chiral compound used for the liquid crystal-polymer composite material of the present invention, among the compounds represented by the general formulas (K2-1) to (K2-8) and (K3-1) to (K3-6), a compound in which $R^k$'s each independently represent a chiral or an achiral alkyl group having 1 to 30 carbon atoms (one methylene group in the alkyl group or at least two methylene groups therein which are not adjacent to each other each may be independently substituted by —O—, —S—, —NH—, —N(CH$_3$)—, —CO—, —COO—, —OCO—, —OCO—O—, —S—CO—, —CO—S—, —CH=CH—, —CF$_2$—, —CF=CH—, —CH=CF—, —CF=CF—, or —C≡C—, and at least one hydrogen atom in the alkyl group each may be independently substituted by a halogen atom or a cyano group) is preferable; a compound in which $R^k$'s each independently represent an alkyl group having 1 to 16 carbon atoms, an alkoxy group having 1 to 16 carbon atoms, an alkenyl group having 2 to 16 carbon atoms, or an alkenyloxy group having 2 to 16 carbon atoms is more preferable; and a compound in which $R^k$'s each independently represent an alkyl group having 3 to 10 carbon atoms, an alkoxy group having 3 to 10 carbon atoms, an alkenyl group having 3 to 10 carbon atoms, or an alkenyloxy group having 3 to 10 carbon atoms is further preferable.

<Compound Having Axial Asymmetry>

As the axial asymmetric compound, in particular, a compound represented by the following general formulas (IV-1), (IV-2), (IV-3), or (IV-4) is preferable.

[Chem. 35]

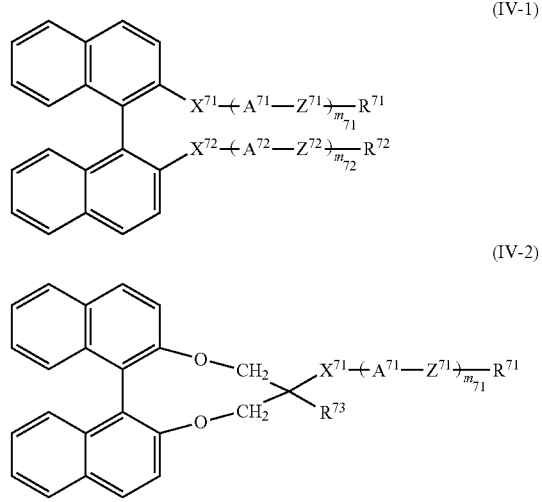

In the compound represented by the general formula (IV-1) or (IV-2), the bond connecting the α positions of the two naphthalene rings is the axis of the axial asymmetry.

In the general formulas (IV-1) and (IV-2), $R^{71}$ and $R^{72}$ each independently represent a hydrogen atom, a halogen atom, a cyano group, an isocyanate group, an isothiocyanate group, or an alkyl group having 1 to 20 carbon atoms. At least one arbitrary methylene group in the alkyl group each may be independently substituted by —O—, —S—, —COO—, —OCO—, —CH=CH—, —CF=CF—, or —C≡C— so that at least one oxygen atom and at least one sulfur atom are not directly bonded to each other. Furthermore, at least one arbitrary hydrogen atom in the above alkyl group may be substituted by a halogen atom. As the compound represented by the general formula (IV-1) or (IV-2), $R^{71}$ and $R^{72}$ each independently represent preferably an unsubstituted or a substituted alkyl group having 1 to 20 carbon atoms, more preferably an unsubstituted alkyl group having 1 to 20 carbon atoms, and further preferably an unsubstituted alkyl group having 1 to 6 carbon atoms.

In the general formulas (IV-1) and (IV-2), $A^{71}$ and $A^{72}$ each independently represent an aromatic or a non-aromatic 3-, 6-, or 8-membered ring or a condensed ring having at least 9 carbon atoms. At least one arbitrary hydrogen atom in each of those ring structures each may be independently substituted by a halogen atom, an alkyl group having 1 to 3 carbon atoms, or a haloalkyl group having 1 to 3 carbon atoms. In addition, one arbitrary methylene group in the ring structure or at least two arbitrary methylene groups therein which are not adjacent to each other each may be independently substituted by —O—, —S—, or —NH—, and one arbitrary —CH= in the ring structure or at least two arbitrary —CH='s therein which are not adjacent to each other each may be substituted by —Na=. When $m_{71}$ represents 2 or more, and a plurality of $A^{71}$'s are present in one molecule, they may be the same or different from each other. As in the case described above, when $m_{72}$ represents 2 or more, and a plurality of $A^{72}$'s are present in one molecule, they may be the same or different from each other.

As the compound represented by the general formula (IV-1) or (IV-2), $A^{71}$ and $A^{72}$ each preferably independently represent a 1,4-phenylene group, a trans-1,4-cyclohexylene group, a pyridine-2,5-diyl group, a pyrimidine-2,5-diyl group, or a naphthalene-2,6-diyl group. At least one hydrogen atom in each of those groups may be independently substituted by a halogen atom, an alkyl group having 1 to 3 carbon atoms, or a haloalkyl group having 1 to 3 carbon atoms. Among those mentioned above, a 1,4-phenylene group or a trans-1,4-cyclohexylene group, in each of which at least one hydrogen atom may be substituted by a fluorine atom, is more preferable, and an unsubstituted 1,4-phenylene group or an unsubstituted trans-1,4-cyclohexylene group is further preferable.

In the general formula (IV-1) and (IV-2), $Z^{71}$ and $Z^{72}$ each independently represent a single bond or an alkylene group having 1 to 8 carbon atoms. At least one arbitrary methylene group in this alkylene group each may be independently substituted by —O—, —S—, —COO—, —OCO—, —CSO—, —OCS—, —N=N—, —CH=N—, —N=CH—, —N(O)=N—, —N=N(O)—, —CH=CH—, —CF=CF—, or —C≡C— so that at least one oxygen atom and at least one sulfur atom are not directly bonded to each other. In addition, at least one arbitrary hydrogen atom in the alkylene group may be substituted by a halogen atom. When $m_{71}$ represents 2 or more, and a plurality of $Z^{71}$'s are present in one molecule, they may be the same or different from each other. As in the case described above, when $m_{72}$ represents 2 or more, and a plurality of $Z^{72}$'s are present in one molecule, they may be the same or different from each other.

As the compound represented by the general formula (IV-1) or (IV-2), $Z^{71}$ and $Z^{72}$ each independently represent preferably a single bond, an unsubstituted alkyl group having 1 to 4 carbon atoms, —COO—, —OCO—, —CH=CH—, or —C≡C—, more preferably a single bond, —CH$_2$—, —CH$_2$CH$_2$—, —COO—, —OCO—, —CH=CH—, or —C≡C—, and further preferably a single bond, —COO—, or —OCO—.

In the general formulas (IV-1) and (IV-2), $X^{71}$ and $X^{72}$ each independently represent a single bond, —COO—, —OCO—, —CH$_2$O—, —OCH$_2$—, —CF$_2$O—, —OCF$_2$—, or —CH$_2$CH$_2$—. As the compound represented by the general formula (IV-1) or (IV-2), $X^{71}$ and $X^{72}$ each independently represent preferably a single bond, —COO—, —OCO—, —CH$_2$O—, —OCH$_2$—, or —CH$_2$CH$_2$—, and more preferably a single bond, —COO—, or —OCO—.

In the general formula (IV-2), $R^{73}$ represents a hydrogen atom, a halogen atom, or —$X^{71}$-($A^{71}$-$Z^{71}$)$_{m_{71}}R^{71}$.

In the general formulas (IV-1) and (IV-2), $m_{71}$ and $m_{72}$ each independently represent an integer of 1 to 4. However, in the general formula (IV-2), when $R^{73}$ represents —$X^{71}$-($A^{71}$-$Z^{71}$)$_{m_{71}}$-$R^{71}$, one of two $m_{71}$'s may represent 0. As the compound represented by the general formula (IV-1) or (IV-2), $m_{71}$ and $m_{72}$ each independently represent preferably an integer of 2 or 3 and more preferably 2.

In the general formulas (IV-1) and (IV-2), a hydrogen atom in the naphthalene ring may be substituted by a substituent such as a phenyl group.

[Chem. 36]

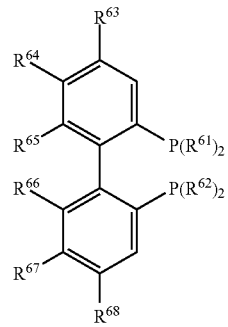

(IV-3)

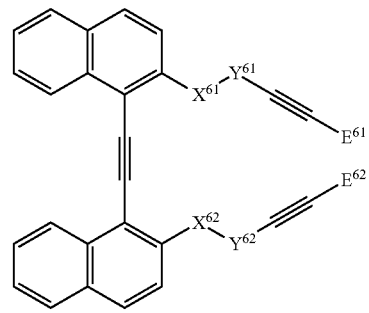

(IV-4)

In the compound represented by the general formula (IV-3), the single bond connecting the two benzene rings is the axis of the axial asymmetry, and in the compound represented by the general formula (IV-4), the bond connecting the α positions of the two naphthalene rings is the axis of the axial asymmetry.

In the general formula (IV-3), $R^{61}$ and $R^{62}$ each independently represent a phenyl group, a cyclopentyl group, or a cyclohexyl group, in each of which at least one arbitrary hydrogen atom each may be independently substituted by an alkyl group, an alkoxy group, or a halogen atom. The alkyl group or the alkoxy group, which substitutes for a hydrogen atom in the phenyl group, has preferably a linear chain or a branched chain, each of which has 1 to 6 carbon atoms, and more preferably a linear chain or a branched chain, each of which has 1 to 3 carbon atoms.

In the general formula (IV-3), $R^{63}$, $R^{64}$, $R^{65}$, $R^{66}$, $R^{67}$, and $R^{68}$ each independently represent a hydrogen atom, an alkyl group, an alkoxy group, an acyloxy group, a halogen atom, a haloalkyl group, or a dialkylamino group. Two out of $R^{63}$, $R^{64}$, and $R^{65}$ in the general formula (IV-3) may form a methylene group with or without at least one substituent or a mono- or a poly-methylenedioxy group with or without at least one substituent, and two out of $R^{66}$, $R^{67}$, and $R^{68}$ may form a methylene group with or without at least one substituent or a mono- or a poly-methylenedioxy group with or without at least one substituent. However, the case in which $R^{65}$ and $R^{66}$ each represent a hydrogen atom is excluded.

In the general formula (IV-4), at least one of $X^{61}$ and $Y^{61}$ and at least one of $X^{62}$ and $Y^{62}$ are present, and $X^{61}$, $X^{62}$, $Y^{61}$ and $Y^{62}$ each independently represent $CH_2$, $CO=O$, N, S, P, B, or Si. When $X^{61}$, $X^{62}$, $Y^{61}$, or $Y^{62}$ represents N, P, B, or Si, in order to satisfy a necessary atomic valence, $X^{61}$, $X^{62}$, $Y^{61}$, or $Y^{62}$ may be bonded to a substituent, such as an alkyl group, an alkoxy group, or an acyl group.

In the general formula (IV-4), $E^{61}$ and $E^{62}$ each independently represent a hydrogen atom, an alkyl group, an aryl group, an allyl group, a benzyl group, an alkenyl group, an alkynyl group, an alkyl ether group, an alkyl ester group, an alkyl ketone group, a hetero ring group, or a derivative thereof.

As the chiral compound contained in the liquid crystal-polymer composite material of the present invention, when a strong helical twisting power is particularly required, the compound represented by the general formula (IV-1) or (IV-2) is particularly preferable.

As the compound represented by the general formula (IV-1), in particular, compounds represented by the following general formulas (K4-1) to (K4-12) are preferable, the compounds represented by the general formulas (K4-1) to (K4-6) are more preferable, and the compounds represented by the general formulas (K4-3) to (K4-6) are further preferable. In the compounds represented by the general formulas (K4-1) to (K4-12), the bond connecting the α positions of the two naphthalene rings is the axis of the axial asymmetry.

[Chem. 37]

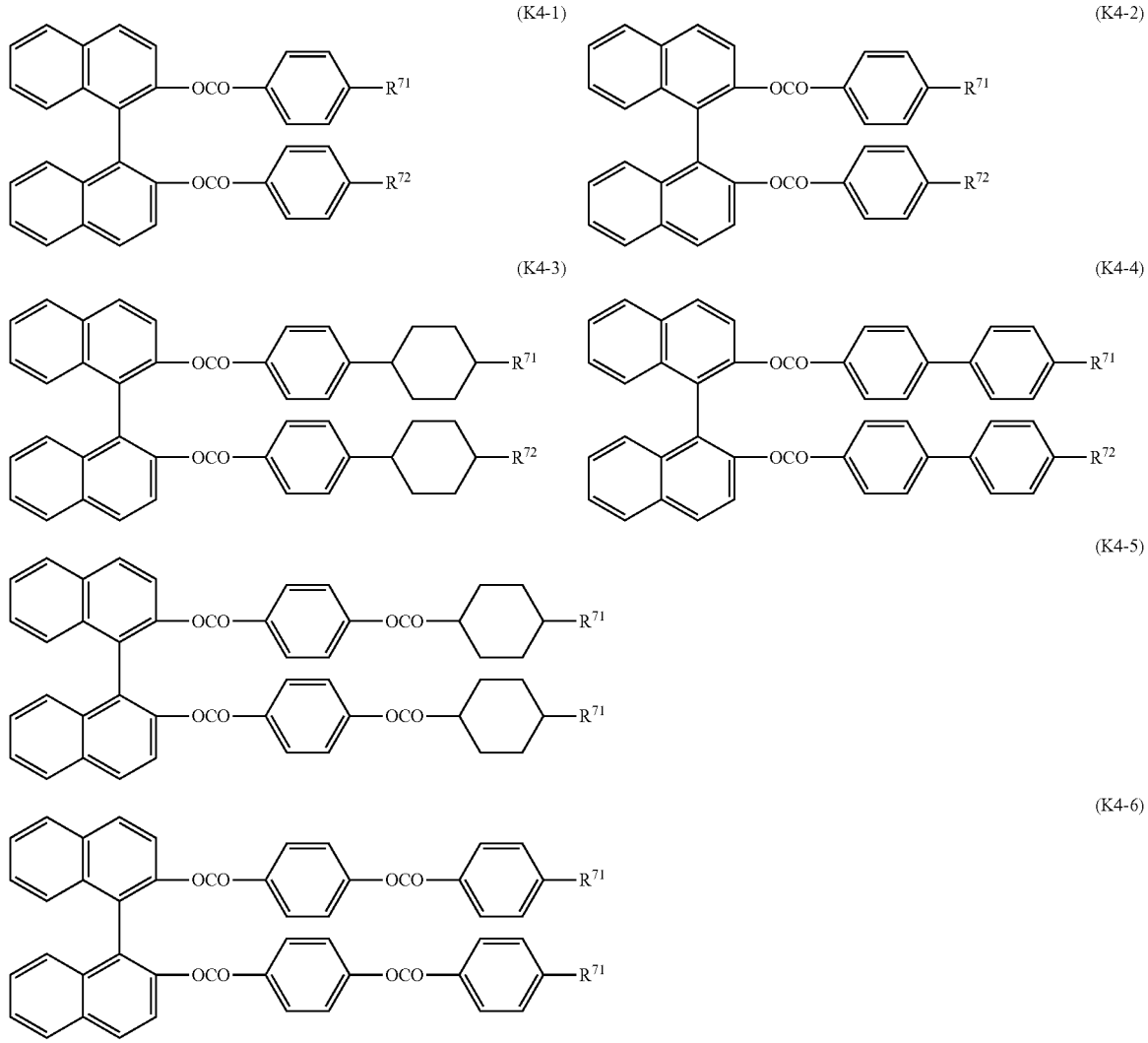

-continued
[Chem. 38]
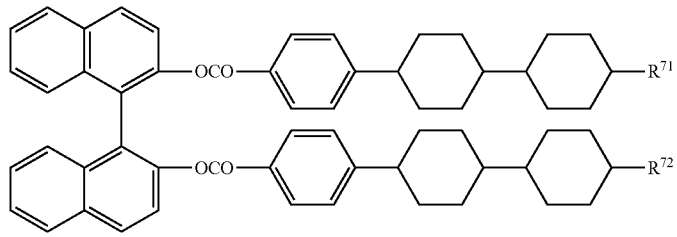
(K4-7)
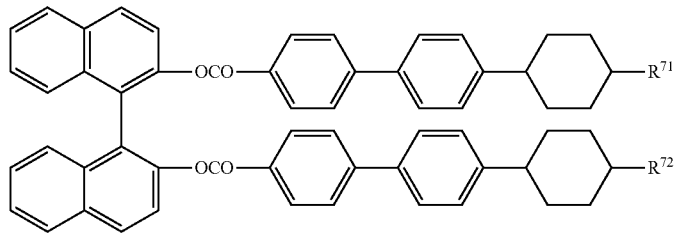
(K4-8)
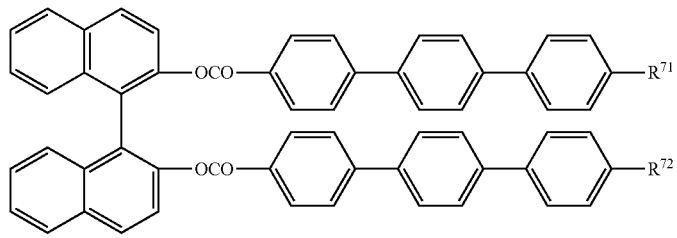
(K4-9)
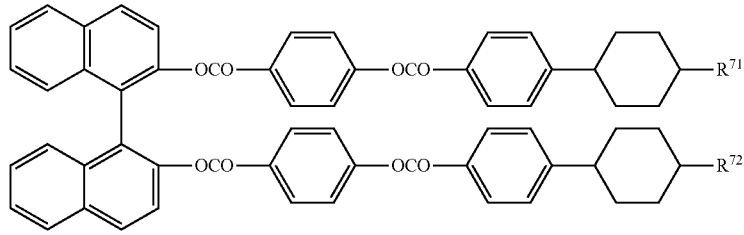
(K4-10)
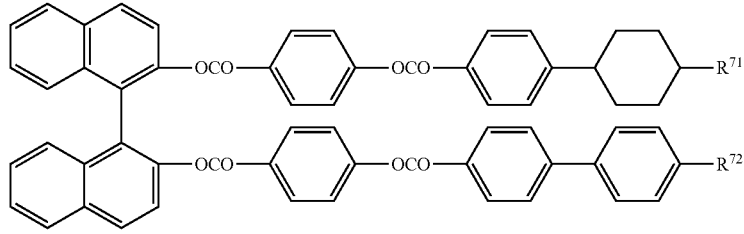
(K4-11)
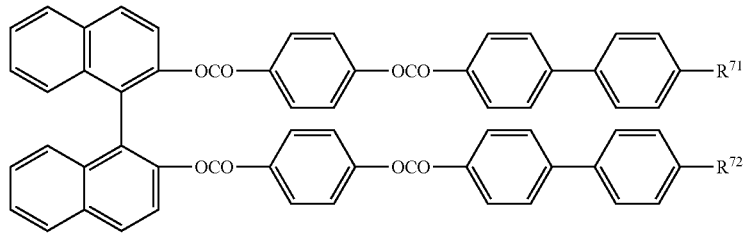
(K4-12)

In the general formulas (K4-1) to (K4-12), $R^{71}$ and $R^{72}$, represent the same meanings as those of $R^{71}$ and $R^{72}$ in the general formula (IV-1). As the chiral compound used for the liquid crystal-polymer composite material of the present invention, among the compounds represented by the general formulas (K4-1) to (K4-12), a compound is preferable in which $R^{71}$ and $R^{72}$ each may independently represent an unsubstituted or a substituted alkyl group having 1 to 20 carbon atoms, a compound is more preferable in which $R^{71}$ and $R^{72}$ each independently represent an unsubstituted alkyl group having 1 to 20 carbon atoms, and a compound is further preferable in which $R^{71}$ and $R^{72}$ each independently represent an unsubstituted alkyl group having 1 to 6 carbon atoms.

As the compound represented by the general formula (IV-2), in particular, compounds represented by the following general formulas (K5-1) to (K5-3) are preferable. In the compounds represented by the general formulas (K5-1) to (K5-3), the bond connecting the α positions of the two naphthalene rings is the axis of the axial asymmetry.

pounds represented by the general formulas (K5-1) to (K5-3), a compound is preferable in which $R^{71}$ represents an alkyl group having 1 to 20 carbon, at least one arbitrary hydrogen atom of which may be substituted by a halogen atom, an alkenyl group having 1 to 20 carbon atoms, at least one arbitrary hydrogen atom of which may be substituted by a halogen atom, or an alkoxy group having 1 to 19 carbon atoms, at least one arbitrary hydrogen atom of which may be substituted by a halogen atom, a compound is more preferable in which $R^{71}$ represents an unsubstituted alkyl group having 1 to 20 carbon atoms, and a compound is further preferable in which $R^{71}$ represents an unsubstituted alkyl group having 1 to 6 carbon atoms. In addition, as is the general formula (K5-3), a compound in which a hydrogen atom in the naphthalene ring is substituted by a substituent, such as a phenyl group, is also preferable.

<Compound Having Plane Asymmetry>

As the compound having plane asymmetry, for example, a helicene derivative represented by the following general for-

[Chem. 39]

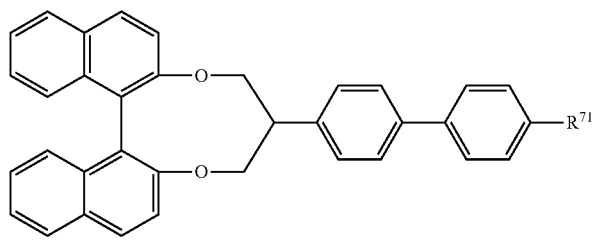

(K5-1)

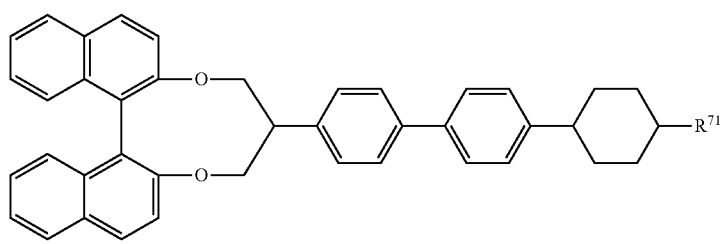

(K5-2)

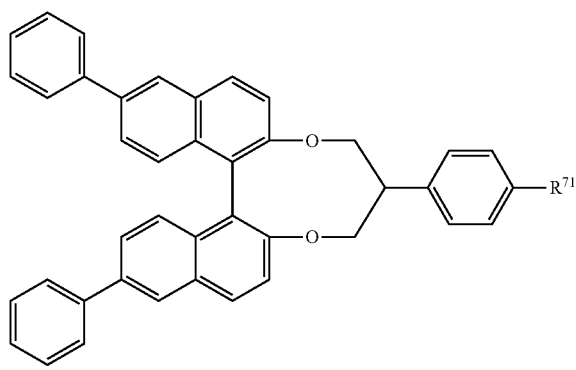

(K5-3)

In the general formulas (K5-1) to (K5-3), $R^{71}$ represents the same meaning as that of $R^{71}$ in the general formula (IV-2). As the chiral compound used for the liquid crystal-polymer composite material of the present invention, among the commula (IV-5) may be mentioned. In the helicene derivative as described above, since the positional relationship between the rings overlapped in a front-to-back direction cannot be changed, the case in which the rings form a right-directed helical structure can be discriminated from the case in which the rings form a left-directed helical structure, so that the chirality is expressed.

[Chem. 40]

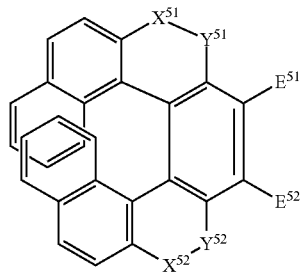

(IV-5)

In the general formula (IV-5), at least one of $X^{51}$ and $Y^{51}$ and at least one of $X^{52}$ and $Y^{52}$ are present, and $X^{51}$, $X^{52}$, $Y^{51}$, and $Y^{52}$ each independently represent $CH_2$, $CO=O$, N, S, P, B, or Si. When $X^{51}$, $X^{52}$, $Y^{51}$, and $Y^{52}$ represents N, P, B, or Si, in order to satisfy a necessary atomic valence, $X^{51}$, $X^{52}$, $Y^{51}$, and $Y^{52}$ each may be bonded to a substituent, such as an alkyl group, an alkoxy group, or an acyl group.

In the general formula (IV-5), $E^{51}$ and $E^{52}$ each independently represent a hydrogen atom, an alkyl group, an aryl group, an allyl group, a benzyl group, an alkenyl group, an alkynyl group, an alkyl ether group, an alkyl ester group, an alkyl ketone group, a hetero ring group, or a derivative thereof.

Although the liquid crystal-polymer composite material of the present invention may contain only one type of chiral compound, at least two types thereof are preferably used in combination. When at least two types of chiral compounds having different structures and physical properties are used in combination, a liquid crystal-polymer composite material having desired physical properties is likely to be obtained.

As the chiral compound used for the liquid crystal-polymer composite material of the present invention, a compound having a relatively large helical twisting power is preferable. When a compound having a large helical twisting power is used, the amount thereof to be added to a nematic liquid crystal composition so as to enable the helix structure thereof to have a desired pitch (such as a pitch of 0.01 to 1 μm at 25° C., preferably 0.05 to 0.5 μm, and more preferably 0.1 to 0.4 μm) can be decreased.

Since the liquid crystal-polymer composite material of the present invention is more likely to exhibit an optically isotropic phase, such as a blue phase, at least one type of chiral compound is preferably used which has a negative temperature dependence of the helical twisting power (that is, the helical twisting power is increased as the temperature is increased) when added to a liquid crystal composition. In particular, in order to manufacture a liquid crystal-polymer composite material capable of exhibiting a blue phase III in a very wide temperature range (such as a temperature range of 2° C. or more) unlike that in the past so as to coexist with neither a blue phase I, a blue phase II, nor a liquid phase, at least one type of chiral compound having a positive temperature dependence of the helical twisting power and at least one type of chiral compound having a negative temperature dependence of the helical twisting power are more preferably used in combination.

The liquid crystal-polymer composite material of the present invention contains as the chiral compound, preferably at least one type selected from the group consisting of the compounds represented by the general formulas (Ch-I-1) to (Ch-I-30), the compounds represented by the general formulas (K2-1) to (K2-8), the compounds represented by the general formulas (K3-1) to (K3-6), the compounds represented by the general formulas (K4-1) to (K4-12), and the compounds represented by the general formulas (K5-1) to (K5-3), more preferably at least two types of compounds described above in combination, and further preferably at least one type of chiral compound having a positive temperature dependence of the helical twisting power and a chiral compound having a negative temperature dependence of the helical twisting power in combination. Among those mentioned above, at least two types selected from the group consisting of the compound represented by the general formula (CH-I-30), the compounds represented by the general formulas (K3-1) to (K3-6), and the compounds represented by the general formulas (K4-1) to (K4-12) are preferably contained, and at least the compound represented by one of the general formulas (CH-I-30-1) to (CH-I-30-6) and the compound represented by one of the general formulas (K4-3) to (K4-6) are more preferably contained.

The content of the chiral compound in the liquid crystal-polymer composite material of the present invention is not particularly limited as long as enough to set the pitch of a nematic liquid crystal composition to be used in a desired range and is appropriately adjusted in consideration of the type of nematic liquid crystal composition, the type of chiral compound (in particular, polarization characteristic), the combination therebetween, and the like. The content of the chiral compound in the liquid crystal-polymer composite material of the present invention may be set, for example, to 1 to 45 parts by mass and preferably 3 to 30 parts by mass with respect to 100 parts by mass of the nematic liquid crystal composition.

[Polymerizable Compound]

Besides the nematic liquid crystal composition and the chiral compound, the liquid crystal-polymer composite material of the present invention further contains a polymer formed by polymerization of at least one type of polymerizable compound. When the chiral compound is contained in the nematic liquid crystal composition, a liquid crystal composition which exhibits an optically isotropic phase is obtained, and when the liquid crystal composition is stabilized by further addition of the polymer thereto, an optically isotropic phase, in particular a blue phase, can be exhibited in a wider temperature range.

Although the liquid crystal-polymer composite material of the present invention may be prepared by mixing the nematic liquid crystal composition, the chiral compound, and the polymer, as described below, after a polymerizable compound-containing liquid crystal composition is prepared by mixing the nematic liquid crystal composition, the chiral compound, and a polymerizable compound, the compound having a polymerizable group in the polymerizable compound-containing liquid crystal composition is preferably polymerized for manufacturing.

As a polymerizable compound used for the formation of the polymer, either one type or at least two types may be used. Incidentally, the polymerizable compound is a compound having at least one polymerizable group in its molecule. As the polymerizable group, groups having the structures represented by the above general formulas (R-1) to (R-16) are preferable. In addition, the polymerizable compound used for the formation of the polymer may be either a photopolymerizable compound or a thermally polymerizable compound. Since a polymerization reaction can be relatively easily performed, a polymerizable compound which can be polymerized by a photopolymerization reaction is preferable.

In accordance with the structure, the polymerizable compound can be classified into a polymerizable compound (mesogenic (liquid crystal) polymerizable compound) having a ring structure (mesogenic group) such as a cyclohexane skeleton or a benzene skeleton and a polymerizable compound (non-mesogenic (non-liquid crystal) polymerizable compound) having no mesogenic group.

<Mesogenic Polymerizable Compound>

As the mesogenic polymerizable compound, a compound represented by the following general formula (PC1) is preferable.

[Chem. 41]

(PC1)

In the general formula (PC1), $P_1$ represents a polymerizable group. As $P_1$, groups having the structures represented by the general formulas (R-1) to (R-16) are preferable.

In the general formula (PC1), $Sp_1$ represents a spacer group having 0 to 20 carbon atoms. As the spacer group, any divalent group having 0 to 20 carbon atoms may be used without any particular restriction, and a group containing an atom other than a carbon atom may also be used. In addition, the spacer group may have a linear chain, a branched chain, or a ring structure. As the spacer group described above, for example, a single bond, an alkylene group having 1 to 20 carbon atoms, an alkenylene group having 1 to 20 carbon atoms, or a arylene group having 1 to 20 carbon atoms may be mentioned. One methylene group in the alkylene group or the alkenylene group or at least two methylene groups therein which are not adjacent to each other each may be independently substituted by —O—, —S—, —NH—, —N(CH$_3$)—, —CO—, —COO—, —OCO—, —OCOO—, —SCO—, —COS—, or —C≡C— so that at least one oxygen atom and at least one sulfur atom are not directly bonded to each other. In addition, at least one methylene group in the alkylene group or the alkenylene group each may be independently substituted by a halogen atom or a cyano group. As the compound represented by the general formula (PC1), $SP_1$ represents preferably a single bond, an unsubstituted or substituted alkylene group having 1 to 16 carbon atoms, or an unsubstituted or substituted alkenylene group having 1 to 16 carbon atoms, and more preferably a single bond, an unsubstituted alkylene group, or a substituted alkenylene group.

In the general formula (PC1), $Q_1$ represents a single bond, —O—, —OCH$_2$—, —CH$_2$O—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—COO—, —COO—CH=CH—, —CH=CCH$_3$—OCO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—. In the compound represented by the general formula (PC1), as $Q_1$, a single bond, —O—, —OCH$_2$—, —CH$_2$O—, —C$_2$H$_4$—, —COO—, —OCO—, —CH=CH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —COOC$_2$H$_4$—, OCOC$_2$H$_4$—, —C$_2$H$_4$OCO—, —C$_2$H$_4$COO—, —C≡C—, —CF$_2$O—, and —OCF$_2$— are preferable, —O—, —OCH$_2$—, —CH$_2$O—, —COO—, —OCO—, —C$_2$H$_4$—, —C≡C—, and a single bond are more preferable in view of easy manufacturing and liquid crystal alignment, and —OCH$_2$—, —CH$_2$O—, —COO—, —OCO—, and a single bond are particularly preferable.

In the general formula (PC1), $R_3$ represents a hydrogen atom, a halogen atom, a cyano group, an alkyl group having 1 to 25 carbon atoms (at least one methylene group in the alkyl group each may be independently substituted by —O—, —S—, —NH—, —N(CH$_3$)—, —CO—, —COO—, —OCO—, —OCOO—, —SCO—, —COS—, or —C≡C— so that oxygen atoms are not directly bonded to each other), or $P_2$—$Sp_2$-$Q_2$- (in the formula, $P_2$, $Sp_2$, and $Q_2$ represents the same meanings as those of $P_1$, $Sp_1$, and $Q_1$, respectively). However, when $R_3$ represents $P_2$—$Sp_2$-$Q_2$-, in each set of $P_1$ and $P_2$, $Sp_1$ and $Sp_2$, and $Q_1$ and $Q_2$ in one molecule, they may be the same or different from each other.

In the general formula (PC1), $n_1$ and $n_2$ each independently represent 1, 2, or 3. When $n_1$ represents 1, and $R_3$ has no polymerizable group, the compound represented by the general formula (PC1) is a mono-functional polymerizable compound. On the other hand, when $n_1$ represents 2 or 3, or when $R_3$ has a polymerizable group, the compound represented by the general formula (PC1) is a polyfunctional polymerizable compound having at least two polymerizable groups.

In the general formula (PC1), MG represents a mesogenic group. The mesogenic group is a functional group having rigidity to express liquid crystallinity and, in general, has a ring structure, such as a cyclohexane skeleton or a benzene skeleton. As the mesogenic group, although any group forming a mesogenic portion of a known liquid crystal molecule may be used, a group represented by the following general formula (MG-1) is preferable.

[Chem. 42]

(MG-1)

In the general formula (MG-1), $C^1$ or $C^3$ each independently represent a 1,4-phenylene group, a 1,3,4-benzenetriyl group, a 1,2,4-benzenetriyl group, a benzene-1,2,4,5-tetrayl group, a benzene-1,2,3,4-tetrayl group, a 1,4-cyclohexylene group, a 1,3,4-cyclohexanetriyl group, a 1,2,4-cyclohexanetriyl group, a cyclohexane-1,2,3,4-tetrayl group, a 1,4-cyclohexenyl group, a tetrahydropyrane-2,5-diyl group, a 1,3-dioxane-2,5-diyl group, a tetrahydrothiopyrane-2,5-diyl group, a 1,4-bicyclo(2,2,2)octylene group, a 2,6-naphthylene group, a naphthalene-2,5,6-triyl group, a naphthalene-2,3,6-triyl group, a naphthalene-2,6,7-triyl group, a naphthalene-2,5,6,7-tetrayl group, a naphthalene-1,2,5,6-tetrayl group, a naphthalene-2,3,6,7-tetrayl group, a 1,2,3,4-tetrahydronaphthalene-2,6-diyl group, a 1,2,3,4-tetrahydronaphthalene-2,5,6-triyl group, a 1,2,3,4-tetrahydronaphthalene-2,6,7-triyl group, a 1,2,3,4-tetrahydronaphthalene-2,5,6-triyl group, a decahydronaphthalene-2,6-diyl group, a decahydronaphthalene-2,5,6-triyl group, a pyridine-2,5-diyl group, a pyrimidine-2,5-diyl group, a pyradine-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group. At least one arbitrary hydrogen atom in one of those groups each may be independently substituted by a phenyl group, a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms.

In the general formula (MG-1), $C^2$ represents a 1,4-phenylene group, a 1,4-cyclohexylene group, a 1,4-cyclohexyenyl group, a tetrahydropyrane-2,5-diyl group, a 1,3-dioxane-2,5-diyl group, a tetrahydrothiopyrane-2,5-diyl group, a 1,4-bicyclo(2,2,2)octylene group, a decahydronaphthalene-2,6-diyl group, a pyridine-2,5-diyl group, a pyrimidine-2,5-diyl group, a pyradine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group. At least one arbitrary hydrogen atom in one of those groups each may be independently substituted by a phenyl group, a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms. When a plurality of $C^2$'s are present in one molecule, they may be the same or different from each other.

In the general formula (MG-1), $Y^1$ and $Y^2$ each independently represent a single bond, —O—, —OCH$_2$—, —OCH$_2$—, —C$_2$H$_4$—, —COO—, —OCO—, —CH═CH—, —CO—, —OCOO—, —NH—, —NHCOO—, —OCONH—, —OCOCH$_2$—, —CH$_2$OCO—, —COOCH$_2$—, —CH$_2$COO—, —CH═CH—COO—, —OCO—CH═CH—, —CH═CH—OCO—, —COO—CH═CH—, —CH═CCH$_3$—COO—, —COO—CCH$_3$═CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—. When a plurality of $Y^2$'s are present in one molecule, they may be the same or different from each other.

In the general formula (MG-1), $n_5$ represents an integer of 0 to 5. As the compound represented by the general formula (PC1), $n_5$ represents preferably an integer of 0 to 3, more preferably an integer of 0 to 2, and further preferably 0 or 1.

Among the compounds represented by the general formula (PC1), as the mono-functional polymerizable compound, a compound represented by the following general formula (V-a) is preferable.

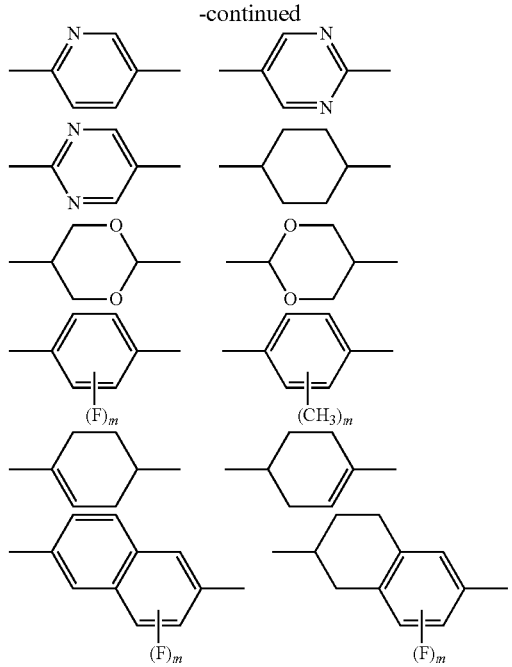

In the general formula (V-a), $Y^3$, $Y^4$, and $Y^5$ each independently represent a single bond, —O—, —OCH$_2$—, —OCH$_2$—, —C$_2$H$_4$—, —COO—, —OCO—, —CH═CH—, —CO—, —OCOO—, —NH—, —NHCOO—, —OCONH—, —OCOCH$_2$—, —CH$_2$OCO—, —COOCH$_2$—, —CH$_2$COO—, —CH═CH—COO—, —OCO—CH═CH—, —CH═CH—OCO—, —COO—CH═CH—, —CH═CCH$_3$—COO—, —COO—CCH$_3$═CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—.

In the general formula (V-a), $Y^6$ represents a single bond, —O—, —COO—, or —OCO—.

In the general formula (V-a), $R^{32}$ represents a hydrogen atom, a halogen atom, a cyano group, an alkoxy group having

[Chem. 43]

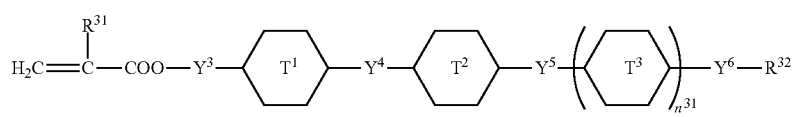

(V-a)

In the general formula (V-a), $R^{31}$ represents a hydrogen atom or a methyl group.

In the general formula (V-a), $n^{31}$ represents an integer of 0 or 1.

In the general formula (V-a), $T^1$, $T^2$, and $T^3$ each independently represent one of divalent groups (where m represents an integer of 1 to 4) having the following 14 types of ring structures.

[Chem. 44]

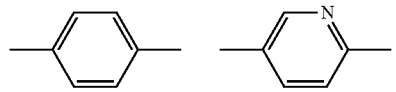

1 to 20 carbon atoms, or a hydrocarbon group having 1 to 20 carbon atoms. As this hydrocarbon group, any monovalent group formed from carbon atoms and hydrogen atoms and having 1 to 20 carbon atoms may be used without any particular restriction, and for example, an alkyl group having 1 to 20 carbon atoms, an alkenyl group having 1 to 20 carbon atoms, and an alkynyl group having 1 to 20 carbon atoms may be mentioned.

Among the compounds represented by the general formula (PC1), as the polyfunctional polymerizable compound, a compound represented by the following general formula (PC1-1) (in the formula, $P_1$, $P_2$, $SP_1$, $Sp_2$, $Q_1$, $Q_2$, MG, $n_1$, and $n_2$ have the same meanings of those of the general formula (PC1)) may be mentioned. As the compound represented by the general formula (PC1-1), in more particular, compounds represented by the following general formulas (PC1-1) to (PC1-13) may be mentioned.

[Chem. 45]
(PC1-1)
[Chem. 46]
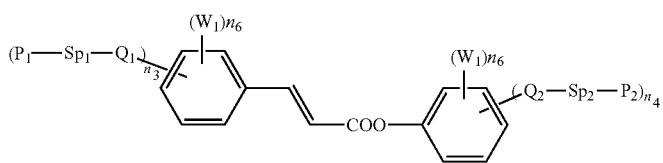
(PC1-1)
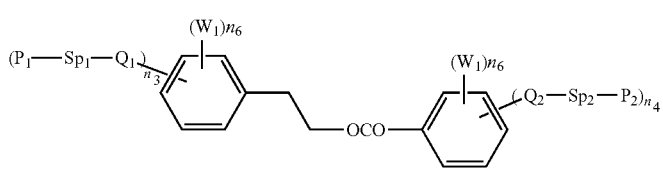
(PC1-2)
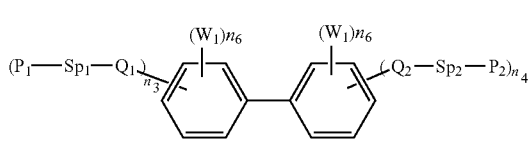
(PC1-3)
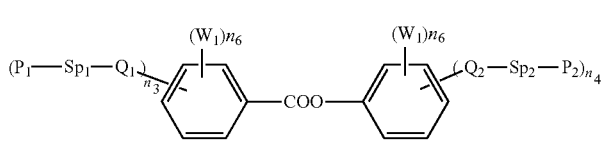
(PC1-4)
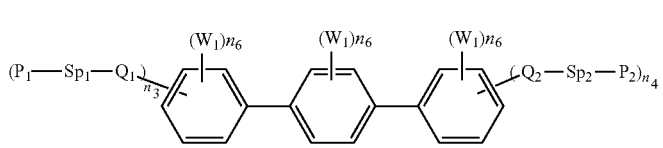
(PC1-5)
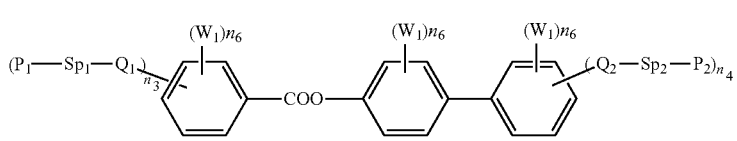
(PC1-6)
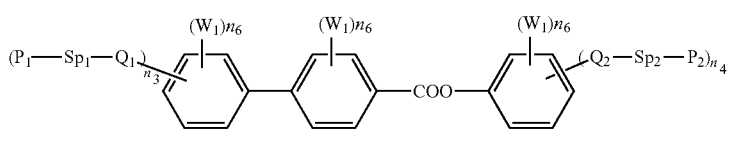
(PC1-7)
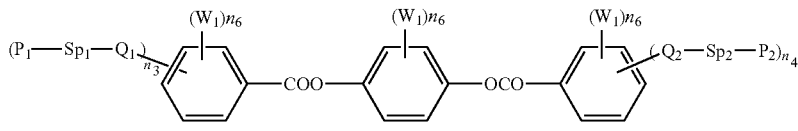
(PC1-8)
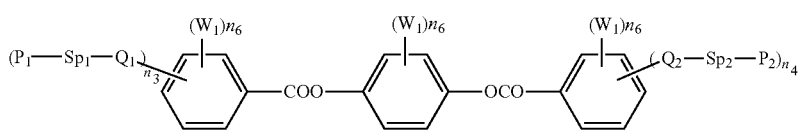
(PC1-9)
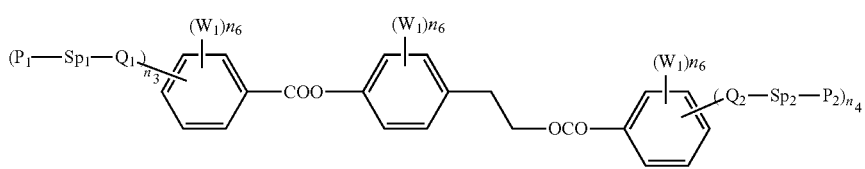
(PC1-10)

-continued

[Chem. 47]

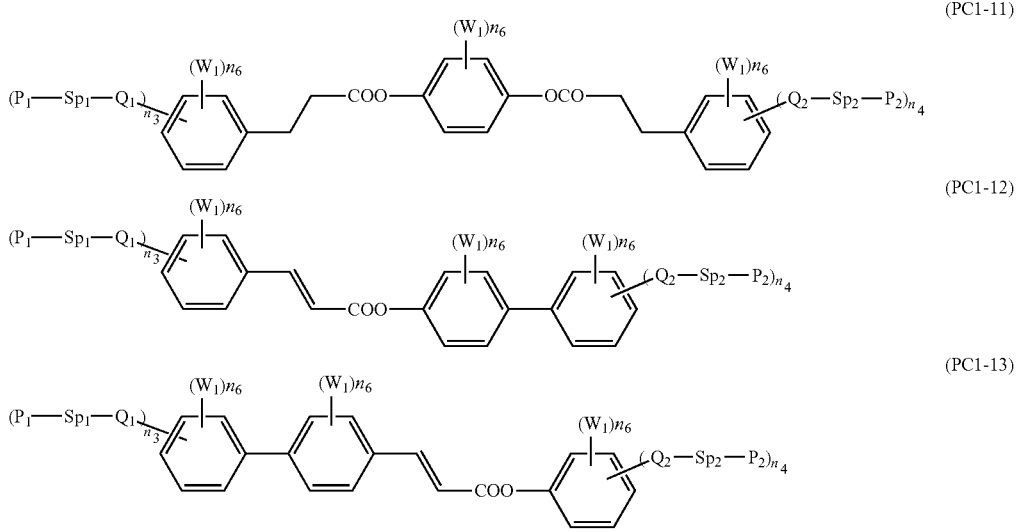

(PC1-11)

(PC1-12)

(PC1-13)

In the general formulas (PC1-1) to (PC1-13), $P_1$, $P_2$, $Sp_1$, $Sp_2$, $Q_1$, and $Q_2$ have the same meanings as those of the general formula (PC1). In the present invention, $Sp_1$, $Sp_2$, $Q_1$, and $Q_2$ each preferably represent a single bond. In addition, $P_1$ and $P_2$ are each preferably independently represented by the above formula (R-1) or (R-2).

In the general formulas (PC1-1) to (PC1-13), $W_1$'s each independently represent a fluorine atom, a trifluoromethyl group, a trifluoromethoxy group, an alkyl group having 1 to 5 carbon atoms, an alkoxy group having 1 to 5 carbon atoms, an alkenyl group having 2 to 5 carbon atoms, a phenyl group, —COOW$_2$, —OCOW$_2$, or —OCOOW$_2$. $W_2$'s in —COOW$_2$, —OCOW$_2$, and —OCOOW$_2$ each independently represent a linear or a branched alkyl group having 1 to 10 carbon atoms or a linear or a branched alkenyl group having 2 to 5 carbon atoms. When a plurality of $W_1$'s are present in one molecule, they may be the same or different from each other.

In the present invention, $W_1$'s each independently represent preferably a fluorine atom, a trifluoromethyl group, a trifluoromethoxy group, an alkyl group having 1 to 5 carbon atoms, an alkoxy group having 1 to 5 carbon atoms, or a phenyl group, and more preferably a fluorine atom, a trifluoromethyl group, a trifluoromethoxy group, a methyl group, or a methoxy group.

In the general formulas (PC1-1) to (PC1-13), $n_3$'s each independently represent 1, 2, or 3, $n_4$'s each independently represent 1, 2, or 3, $n_6$'s each independently represent 0, 1, 2, 3, or 4, and $n_3+n_6$ and $n_4+n_6$ on the same ring each represent 5 or less. In the present invention, $n_3+n_4$ represents preferably 2 to 4 and more preferably 2 or 3.

As the polymerizable compound used in the present invention, among the compounds represented by the general formulas (PC1-1) to (PC1-13), compounds are particularly preferable in which $Sp_1$, $Sp_2$, $Q_1$, and $Q_2$ each represent a single bond, $P_1$ and $P_2$ are each independently represented by the general formulas (R-1) or (R-2), $W_1$'s each independently represent a fluorine atom, a trifluoromethyl group, a trifluoromethoxy group, a methyl group, or a methoxy group, and $n_3+n_4$ represents 2 or 3.

As the compound represented by the general formula (PC1-3), in more particular, compounds represented by the following formulas (PC1-3a) to (PC1-3h) may be mentioned.

A compound may also be mentioned in which at least one hydrogen atom on the benzene ring in each of the formulas (PC1-3a) to (PC1-3h) is substituted by a fluorine atom. As the polymer contained in the liquid crystal-polymer composite material of the present invention, a polymer is preferable which is formed by polymerization of at least one type of those compounds as a polymerizable raw material together with, if needed, another polymerizable compound.

[Chem. 48]

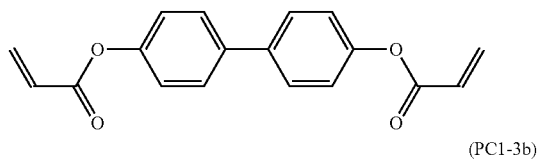

(PC1-3a)

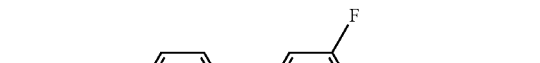

(PC1-3b)

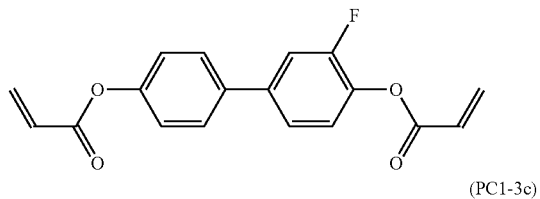

(PC1-3c)

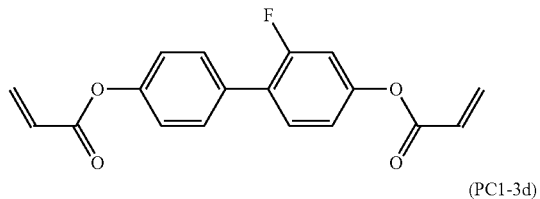

(PC1-3d)

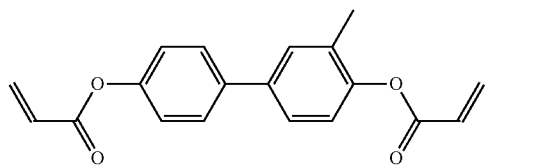

-continued

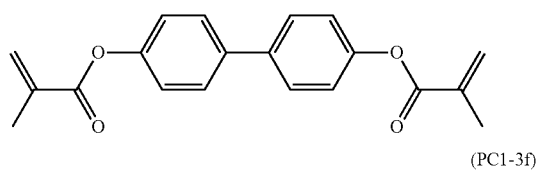
(PC1-3e)

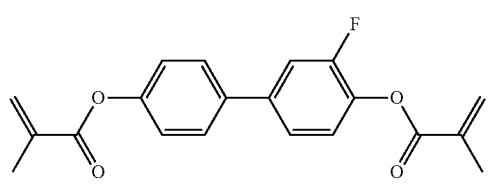
(PC1-3f)

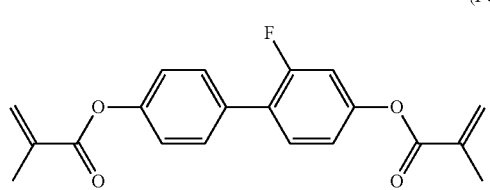
(PC1-3g)

[Chem. 49]

-continued

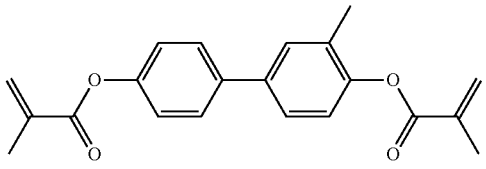
(PC1-3h)

(PC1-3i)

As the compounds represented by the general formulas (PC1-1) to (PC1-13), a compound represented by the following general formula (V-b) is also preferable. By the use of the compound represented by the general formula (V-b) as the polymerizable raw material for the polymer contained in the liquid crystal-polymer composite material of the present invention, a liquid crystal-polymer composite material having excellent mechanical strengths and heat resistance can be obtained.

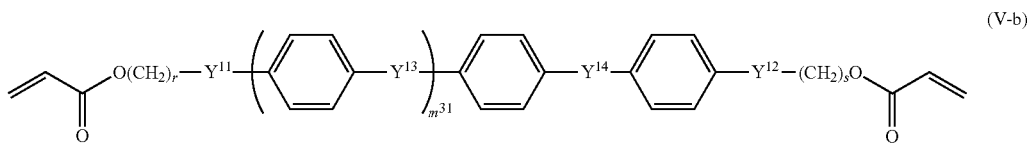
(V-b)

In the general formula (V-b), $m^{31}$ represents 0 or 1, $Y^{11}$ and $Y^{12}$ each independently represent a single bond, —O—, —COO—, or —OCO—, $Y^{13}$ and $Y^{14}$ each independently represent a single bond, —COO—, —OCO—, —CH=CH—COO—, —OCO—CH=CH—, —CH=CH—OCO—, —COO—CH=H—, —COOC$_2$H$_4$—, —OCOC$_2$H$_4$—, —C$_2$H$_4$OCO—, or —C$_2$H$_4$COO—, and r and s each independently represent an integer of 2 to 14.

The 1,4-phenylene groups present in the general formula (V-b) each may be unsubstituted, or at least one hydrogen atom thereof each may be independently substituted by a fluorine atom, a chlorine atom, a methyl group, a trifluoromethyl group, a trifluoromethoxy group, or a phenyl group.

As the compound represented by the general formula (V-b), compounds represented by the following general formulas (V-b1) to (V-b20) are particularly preferable. In the general formulas (V-b1) to (V-b20), t and u each independently represent an integer of 2 to 14. As the polymer contained in the liquid crystal-polymer composite material of the present invention, a polymer is preferable which is formed by polymerization of at least one type of those compounds as the polymerizable raw material together with, if needed, another polymerizable compound.

[Chem. 50]

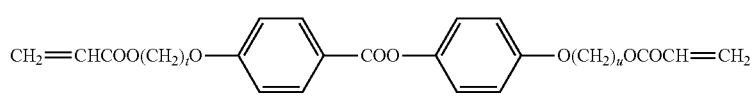
(V-b1)

-continued
(V-b2)
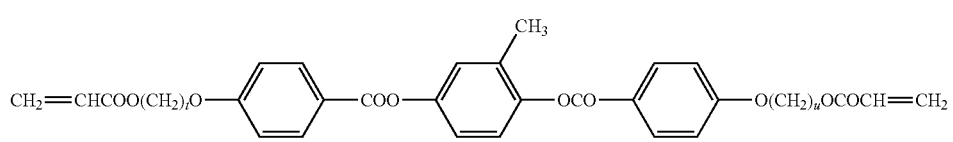
(V-b3)
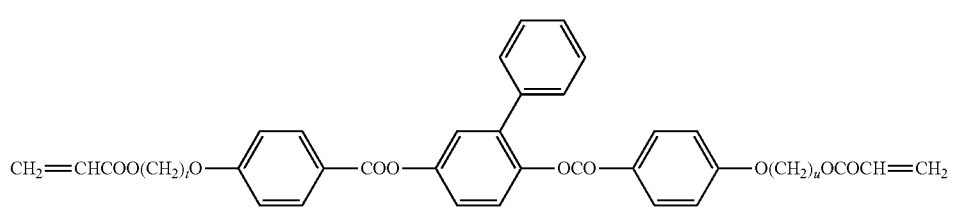
(V-b4)
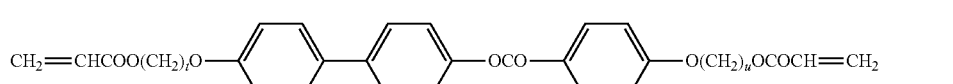
(V-b5)
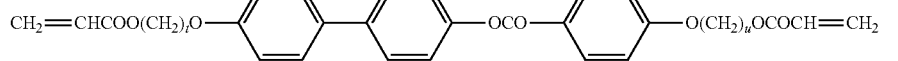
(V-b6)
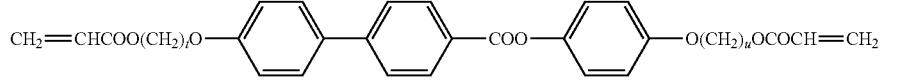
(V-b7)
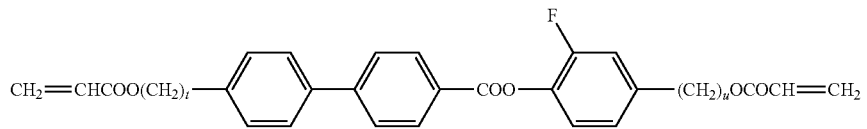
(V-b8)
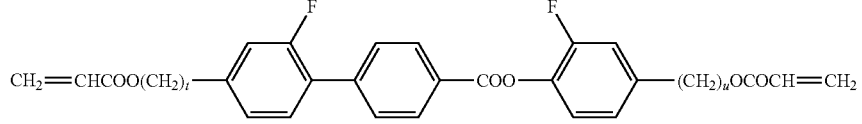
(V-b9)
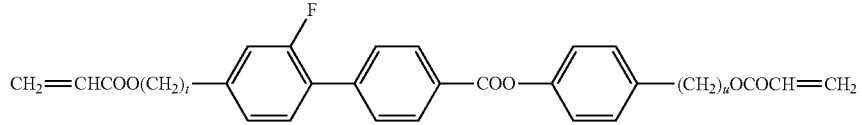
(V-b10)
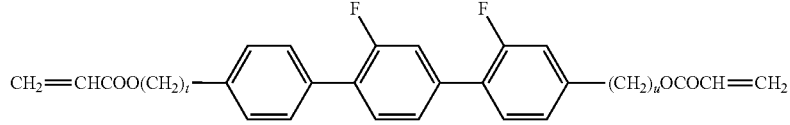
[Chem. 51]
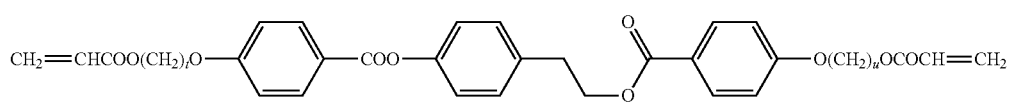
(V-b11)
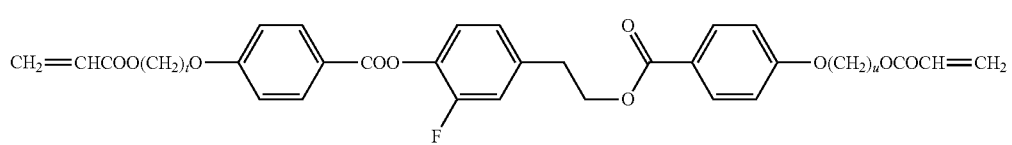
(V-b12)

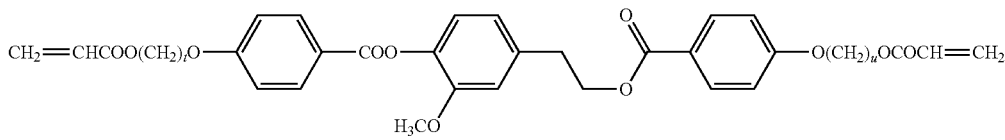 (V-b13)

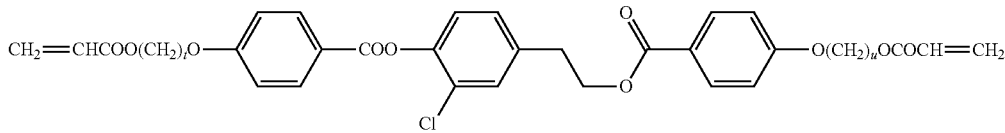 (V-b14)

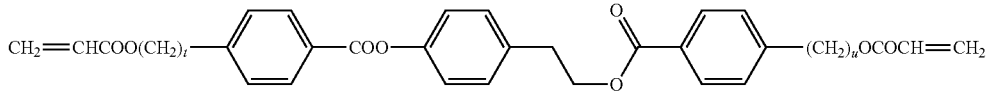 (V-b15)

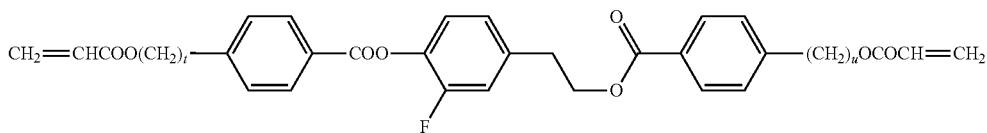 (V-b16)

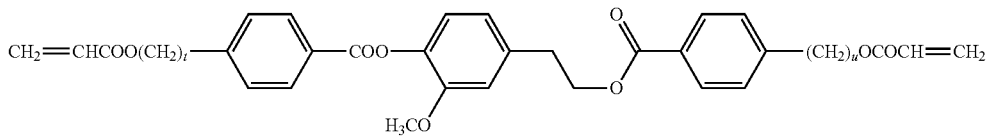 (V-b17)

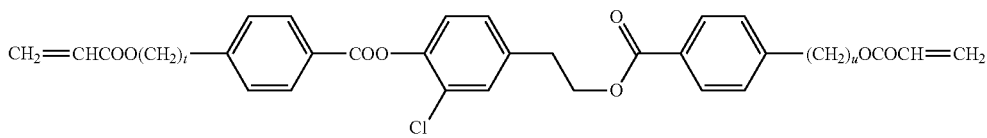 (V-b18)

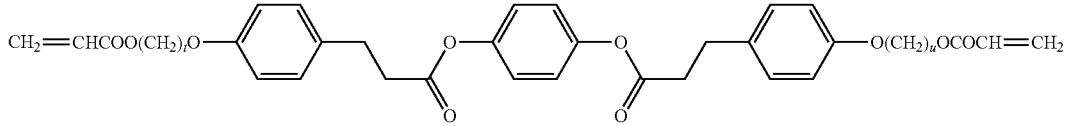 (V-b19)

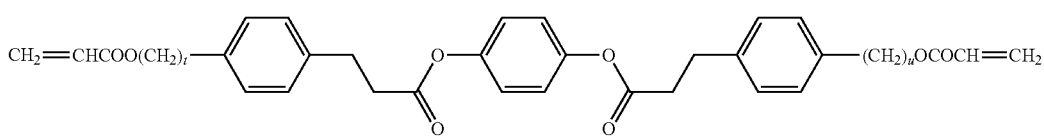 (V-b20)

<Non-Mesogenic Polymerizable Compound>

As the non-mesogenic polymerizable compound, a compound represented by the following general formula (PC2) is preferable.

[Chem. 52]

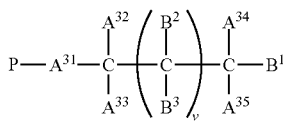 (PC2)

In the general formula (PC2), P represents a polymerizable group. As P, the groups having the structures represented by the above general formulas (R-1) to (R-16) are preferable. As the compound represented by the general formula (PC2), P represents preferably the group represented by the general formula (R-1), (R-2), (R-4), (R-5), (R-7), (R-11), (R-13), (R-15), or (R-16), more preferably the group represented by the general formula (R-1), (R-2), (R-7), (R-11), (R-13), or (R-16), and further preferably the group represented by the general formula (R-1), (R-2), or (R-16).

In the general formula (PC2), $A^{31}$ represents a single bond or an alkylene group having 1 to 15 carbon atoms. At least one methylene group present in the alkylene group each may be independently substituted by —O—, —CO—, —COO—, or —OCO— so that oxygen atoms are not directly bonded to each other. In addition, at least one hydrogen atom present in the alkylene group each may be independently substituted by a fluorine atom, a methyl group, or an ethyl group.

In the general formula (PC2), $A^{32}$ and $A^{34}$ each independently represent a hydrogen atom or an alkyl group having 1 to 18 carbon atoms. At least one methylene group present in the alkyl group each may be independently substituted by —O—, —CO—, —COO—, or —OCO— so that oxygen atoms are not directly bonded to each other. In addition, at least one hydrogen atom present in the alkyl group each may be independently substituted by a halogen atom or an alkyl group having 1 to 17 carbon atoms.

In the general formula (PC2), $A^{33}$ and $A^{35}$ each independently represent a hydrogen atom or an alkyl group having 1 to 10 carbon atoms. At least one methylene group present in the alkyl group each may be independently substituted by —O—, —CO—, —COO—, or —OCO— so that oxygen atoms are not directly bonded to each other. In addition, at least one hydrogen atom present in the alkyl group each may be independently substituted by a halogen atom or an alkyl group having 1 to 9 carbon atoms.

In the general formula (PC2), v represents an integer of 1 to 40.

In the general formula (PC2), $B^1$, $B^2$, and $B^3$ each independently represent a hydrogen atom, a linear or a branched alkyl group having 1 to 10 carbon atoms, or -$A^{36}$-P (in the formula, $A^{36}$ represents a single bond or an alkylene group having 1 to 15 carbon atoms, and P represents a polymerizable group). When $B^1$, $B^2$, or $B^3$ represents an alkyl group, at least one methylene group present in the alkyl group each may be independently substituted by —O—, —CO—, —COO—, or —OCO— so that oxygen atoms are not directly bonded to each other. When $B^1$, $B^2$, or $B^3$ represents a group represented by -$A^{36}$-P, and the $A^{36}$ represents an alkylene group having 1 to 15 carbon atoms, at least one methylene group present in the alkylene group each may be independently substituted by —O—, —CO—, —COO—, or —OCO— so that oxygen atoms are not directly bonded to each other. In addition, at least one hydrogen atom present in the alkylene group each may be independently substituted by a fluorine atom, a methyl group, or an ethyl group. However, among $B^1$, $B^2$, and $B^3$, the total number of which is 2v+1 in one molecule, the number of the groups each represented by -$A^{36}$-P is 0 to 3. When a plurality of P's are present in one molecule, they may be the same or different from each other.

As a polymerizable compound used as the raw material for the polymer contained in the liquid crystal-polymer composite material of the present invention, at least one type of compound represented by the general formula (PC2) is preferably used, and among the compounds represented by the general formula (PC2), compounds having different main chain lengths and/or alkyl side chain lengths may also be used.

As the compound represented by the general formula (PC2), in particular, compounds represented by the following general formulas (PC2-a) to (PC2-h) are preferably mentioned. As the polymerizable compound used as the raw material for the polymer contained n the liquid crystal-polymer composite material of the present invention, at least one type selected from the group consisting of the compounds represented by the general formulas (PC2-a) to (PC2-h) is preferably used, and at least one type of compound selected from the group consisting of the compounds represented by the general formulas (PC2-a) to (PC2-d) is more preferably used.

[Chem. 53]

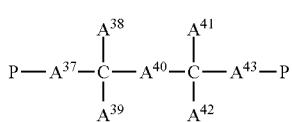
(PC2-a)

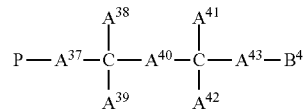
(PC2-b)

(PC2-c)

(PC2-d)

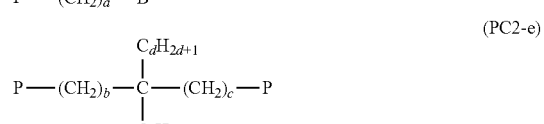
(PC2-e)

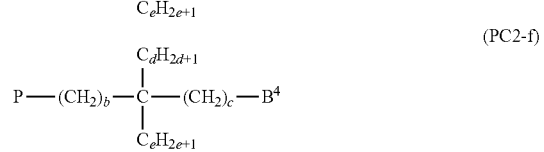
(PC2-f)

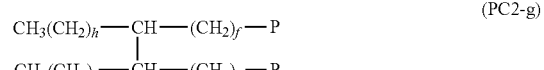
(PC2-g)

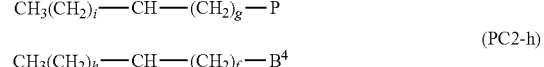
(PC2-h)

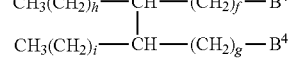
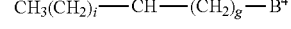

In the general formulas (PC2-a) to (PC2-h), P represents a polymerizable group, $B^4$ represents a hydrogen atom or a methyl group. As P, the groups having the structures represented by the formulas (R-1) to (R-16) are preferable, the group represented by the formula (R-1), (R-2), or (R-16) is more preferable, and the group represented by the formula (R-1) is further preferable in view of high polymerization rate. In the compound represented by each of the general formulas (PC2-a), (PC2-c), (PC2-e), and (PC2-g), two P's contained in one molecule may be the same or different from each other.

In the general formula (PC2-a) or (PC2-b), $A^{37}$ and $A^{43}$ each independently represent a single bond or an alkylene group having 1 to 15 carbon atoms. At least one methylene group present in the alkylene group each may be independently substituted by —O—, —CO—, —COO—, or —OCO— so that oxygen atoms are not directly bonded to each other. In addition, at least one hydrogen atom present in the alkyl group each may be independently substituted by a fluorine atom, a methyl group, or an ethyl group.

In the general formula (PC2-a) or (PC2-b), $A^{38}$ and $A^{41}$ each independently represent an alkyl group having 2 to 20 carbon atoms. At least one methylene group present in the alkyl group each may be independently substituted by —O—, —CO—, —COO—, or —OCO— so that oxygen atoms are not directly bonded to each other.

In the general formula (PC2-a) or (PC2-b), $A^{39}$ and $A^{42}$ each independently represent a hydrogen atom or an alkyl group having 1 to 10 carbon atoms. At least one methylene group present in the alkyl group each may be independently substituted by —O—, —CO—, —COO—, or —OCO— so that oxygen atoms are not directly bonded to each other. In addition, at least one hydrogen atom present in the alkyl group each may be independently substituted by a halogen atom or an alkyl group having 1 to 9 carbon atoms.

In the general formula (PC2-a) or (PC2-b), $A^{40}$ represents an alkylene group having 9 to 16 carbon atoms. Among at least one to five methylene groups present in the alkylene group, one arbitrary hydrogen atom present in the methylene group is substituted by a linear or a branched alkyl group having 1 to 10 carbon atoms. In addition, at least one methylene group present in the alkylene group each may be independently substituted by —O—, —CO—, —COO—, or —OCO— so that oxygen atoms are not directly bonded to each other.

In the compound represented by the general formula (PC2-a), the distance between the two polymerizable groups (distance between cross-linking points) can be adjusted by independently changing the lengths of the number of the carbon atoms of $A^{37}$, $A^{40}$ and $A^{43}$. One feature of the compound represented by the general formula (PC2-a) is a long distance between the polymerizable groups. However, when the distance is excessively long, since the polymerization rate is remarkably decreased, an adverse influence on the phase separation may occur in some cases, so that the distance between the polymerizable groups has an upper limit. In addition, the distance between the two side chains $A^{38}$ and $A^{41}$ also influences the mobility of the main chain. That is, when the distance between $A^{38}$ and $A^{41}$ is short, the side chains $A^{38}$ and $A^{41}$ interfere with each other, and as a result, the mobility of the entire compound is decreased. Hence, between two compounds having similar distances between polymerizable groups, a compound in which $A^{40}$ has a long number of carbon atoms is preferable as compared to a compound in which each of $A^{38}$ and $A^{41}$ has a long number of carbon atoms.

In the general formula (PC2-a) or (PC2-b), in order to adjust the distance between the side chains (distance between $A^{38}$ and $A^{41}$, and the distance between $A^{39}$ and $A^{42}$), and in order to decrease the glass transition temperature by increasing the distance between the cross-linking points, $A^{40}$ is preferably long. However, when $A^{40}$ is excessively long, for example, the molecular weight of the compound represented by the general formula (PC2-a) or (PC2-b) is excessively increased, the compatibility with the liquid crystal composition tends to be degraded, and the phase separation is adversely influenced due to an excessive decrease in polymerization rate. Hence, by the reasons as described above, the length of $A^{40}$ is naturally set to have an upper limit.

Accordingly, in the compound represented by the general formula (PC2-a) or (PC2-b), $A^{40}$ preferably represents an alkylene group having 9 to 16 carbon atoms (among at least one to five methylene groups present in the alkylene group, one arbitrary hydrogen atom in the methylene group is substituted by a linear or a branched alkyl group having 1 to 10 carbon atoms. At least one methylene group present in the alkylene group each may be independently substituted by —O—, —CO—, —COO—, or —OCO— so that oxygen atoms are not directly bonded to each other).

As a structural feature of $A^{40}$, $A^{40}$ has the structure in which at least one hydrogen atom in the alkylene group is substituted by an alkyl group having 1 to 10 carbon atoms. Although the number of hydrogen atoms in one alkylene group to be substituted by an alkyl group is 1 to 5, 1 to 3 hydrogen atoms are preferable, and 2 or 3 hydrogen atoms are more preferable. The number of carbon atoms of the alkyl group functioning as a substituent is preferably 1 to 5 and more preferably 1 to 3.

In contrast, as for the side chains $A^{38}$, $A^{39}$, $A^{41}$, and $A^{42}$, the lengths of those side chains are preferably configured as described below. Incidentally, in the general formula (PC2-a) or (PC2-b), although $A^{38}$ and $A^{39}$ are bonded to the same carbon atom of the main chain, when the lengths thereof are different from each other, a longer side chain is called $A^{38}$ (when the length of $A^{38}$ is the same as that of $A^{39}$, one of the side chains is called $A^{38}$). As in the case described above, when the length of $A^{41}$ is different from that of $A^{42}$, a longer side chain is called $A^{41}$ (when the length of $A^{41}$ is the same as that of $A^{42}$, one of the side chains is called $A^{41}$).

The side chain has a higher mobility than that of the main chain. Hence, although the presence of the side chain generally contributes to improvement in mobility of a polymer chain at a low temperature, in the case in which spatial interference occurs between side chains, the mobility is conversely degraded. In order to prevent the spatial interference between side chains as described above, a decrease of side chain length into a required range is effective.

Hence, in the general formula (PC2-a) or (PC2-b), $A^{38}$ and $A^{41}$ each independently represent preferably a linear alkyl group having 2 to 18 carbon atoms (at least one methylene group present in the alkyl group each may be independently substituted by —O—, —CO—, —COO—, or —OCO— so that oxygen atoms are not directly bonded to each other) and more preferably a linear alkyl group having 3 to 15 carbon atoms (at least one methylene group present in the alkyl group each may be independently substituted by —O—, —CO—, —COO—, or —OCO— so that oxygen atoms are not directly bonded to each other).

In addition, as for $A^{39}$ and $A^{42}$, when the lengths thereof are excessively long, it is not preferable since spatial interference between the side chains is induced. On the other hand, it is believed that a side chain having a small length has, besides a high mobility, a function to improve the mobility of a main chain by inhibiting adjacent main chains from coming close to each other and preventing the interference between polymer main chains. Hence, in the compound represented by the general formula (PC2-a) or (PC2-b), when the lengths of $A^{39}$ and $A^{42}$ are decreased, an increase in anchoring energy at a low temperature can be suppressed, and the characteristics of a liquid crystal optical element using an obtained liquid crystal-polymer composite material may be effectively improved.

Accordingly, in the general formula (PC2-a) or (PC2-b), $A^{39}$ and $A^{42}$ each independently represent preferably a hydrogen atom or an alkyl group having 1 to 7 carbon atoms (at least one methylene group present in the alkyl group each may be independently substituted by —O—, —CO—, —COO—, or —OCO— so that oxygen atoms are not directly bonded to each other), more preferably a hydrogen atom or an alkyl group having 1 to 5 carbon atoms (at least one methylene group present in the alkyl group each may be independently substituted by —O—, —CO—, —COO—, or —OCO— so that oxygen atoms are not directly bonded to each other), and further preferably a hydrogen atom or an alkyl group having 1 to 3 carbon atoms (at least one methylene group present in the alkyl group each may be independently substituted by —O—, —CO—, —COO—, or —OCO— so that oxygen atoms are not directly bonded to each other).

In the general formula (PC2-c) or (PC2-d), a represents an integer of 6 to 22. Among the compounds represented by the general formula (PC2-d), as a compound in which $B^4$ represents a hydrogen atom, for example, an alkyl acrylate, such as dodecyl acrylate, may be mentioned.

In the general formula (PC2-e) or (PC2-f), b and c each independently represent an integer of 1 to 10, d represents an integer of 1 to 10, and e represents an integer of 0 to 6. In order to suppress the spatial interference between the side chains, at least one of d and e represents preferably an integer of 1 to 5 and more preferably an integer of 1 to 3.

In the general formula (PC2-g) or (PC2-h), f, g, h, and i each independently represent an integer of 1 to 10. In order to suppress the spatial interference between the side chains, at least one of h and i represents preferably an integer of 1 to 5 and more preferably an integer of 1 to 3.

The compound represented by the general formula (PC2), such as the compound represented by each of the general formulas (PC2-a) to (PC2-h), may be synthesized by an appropriate combination between known organic synthetic reactions with known compounds as starting raw materials.

For example, in the general formula (PC2-a), a compound in which $A^{39}$ and $A^{42}$ each represent a hydrogen atom may be obtained in such a way that after a compound having a plurality of epoxy groups is allowed to react with a polymerizable compound, such as an acrylic acid or a methacrylic acid, having an active hydrogen capable of reacting with an epoxy group, a polymerizable compound having a hydroxyl group synthesized thereby is then allowed to react with a saturated fatty acid.

Alternatively, the compound described above may also be obtained in such a way that after a compound having a plurality of epoxy groups is allowed to reach with a saturated fatty acid, a compound having a hydroxyl group synthesized thereby is then allowed to react with a polymerizable compound, such as an acrylic acid chloride, having a group capable of reacting with a hydroxyl group.

In addition, a compound represented by the general formula (PC2-a) in which $A^{39}$ and $A^{42}$ each represent an alkyl group, and $A^{37}$ and $A^{43}$ each represent a methylene group may be obtained, for example, by a method in which a compound having a plurality of oxetane groups is allowed to react with a fatty acid chloride or a fatty acid capable of reacting with an oxetane group and is then further allowed to react with a polymerizable compound, such as an acrylic acid, having an active hydrogen or a method in which a compound having one oxetane group is allowed to react with a polyvalent fatty acid chloride or fatty acid capable of reacting with an oxetane group and is then further allowed to react with a polymerizable compound, such as an acrylic acid, having an active hydrogen.

In addition, a compound represented by the general formula (PC2-a) in which $A^{37}$ and $A^{43}$ each represent an alkylene group (propylene group; —CH$_2$CH$_2$CH$_2$—) having 3 carbon atoms may be obtained in a manner similar to that described above, for example, by using a compound having a plurality of furan groups instead of oxetane groups.

Furthermore, a compound represented by the general formula (PC2-a) in which $A^{37}$ and $A^{43}$ each represent an alkylene group (butylene group; —CH$_2$CH$_2$CH$_2$CH$_2$—) having 4 carbon atoms may be obtained, for example, by using a compound having a plurality of pyran groups instead of oxetane groups.

<Polymerizable Compound Having Chirality>

As the polymerizable compound used as the raw material for the polymer contained in the liquid crystal-polymer composite material of the present invention, although an achiral compound or substantially a racemic body is preferable, a chiral polymerizable compound may also be used. As the chiral polymerizable compound, for example, a polymerizable compound represented by the following general formula (VI-a) or (VI-b) may be used.

[Chem. 54]

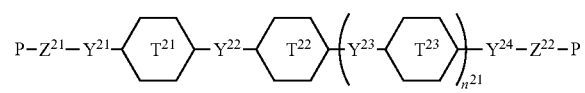

(VI-a)

-continued

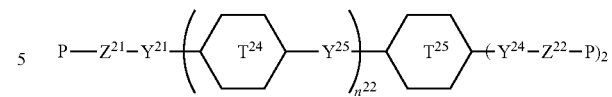

(VI-b)

In the general formulas (VI-a) and (VI-b), P represents a polymerizable group. As P, the groups having the structures represented by the formulas (R-1) to (R-16) are preferable, the group represented by the formula (R-1), (R-2), or (R-16) is more preferable, the group represented by the formula (R-1) or (R-2) is further preferable, and the group represented by the general formula (R-1) is even further preferable in view of high polymerization rate.

In the general formula (VI-a), $n^{21}$ represent an integer of 0 or 1. In addition, in the general formula (VI-b), $n^{22}$ represents an integer of 0, 1, or 2. When $n^{22}$ represents 2, and a plurality of $T^{24}$'s and a plurality of $Y^{25}$'s are present in one molecule, they may be the same or different from each other.

In the general formulas (VI-a) and (VI-b), $T^{21}$, $T^{22}$, $T^{23}$, and $T^{24}$ each independently represent a divalent group (divalent 6-membered ring group) having a 6-membered ring structure. As this divalent 6-membered ring group, the following 12 types of divalent 6-membered ring groups may be mentioned. In addition, in the following general formulas, m represents an integer of 1 to 4. As the compound represented by the general formula (VI-a) or (VI-b), $T^{21}$, $T^{22}$, $T^{23}$, and $T^{24}$ each independently represent preferably one of the 12 types of divalent 6-membered ring groups and more preferably a 1.4-phenylene group or a trans-1,4-cyclohexylene group.

[Chem. 55]

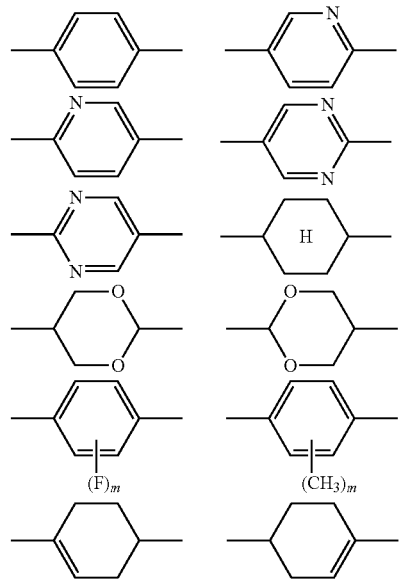

In the general formula (VI-b), $T^{25}$ represents a trivalent group (trivalent 6-membered ring group) having a 6-membered ring structure. As this trivalent 6-membered ring group, for example, there may be mentioned a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group.

In the general formulas (VI-a) and (VI-b), $Y^{22}$, $Y^{23}$, and $Y^{25}$ each independently represent a single bond or a linear or a branched alkylene group having 1 to 10 carbon atoms. At least one methylene group present in the alkylene group each may be independently substituted by —O—, —S—, —CO—O—, or —O—CO— so that at least one oxygen atom and at least one sulfur atom are not directly bonded to each other. In addition, at least one hydrogen atom present in the alkylene group each may be independently substituted by a fluorine atom or a chlorine atom. Furthermore, the alkylene group may or may not contain an asymmetric atom. As the alkylene group, for example, —CH$_2$CH$_2$—, —CH$_2$O—, —OCH$_2$—, —COO—, —OCO—, —C≡C—, —CH═CH—, —CF═CF—, —(CH$_2$)$_4$—, —CH$_2$CH$_2$CH$_2$O—, —OCH$_2$CH$_2$CH$_2$—, —CH═CHCH$_2$CH$_2$—, or —CH$_2$CH$_2$CH═CH— may be mentioned.

In the general formulas (VI-a) and (VI-b), $Y^{21}$ and $Y^{24}$ each independently represent a single bond, —O—, —OCO—, or —COO—.

In the general formulas (VI-a) and (VI-b), $Z^{21}$ has an asymmetric atom and also represents a branched alkylene group having 3 to 20 carbon atoms.

In the general formulas (VI-a) and (VI-b), $Z^{22}$ represents an alkylene group having 1 to 20 carbon atoms. The alkylene group may or may not contain an asymmetric atom.

As the raw material for the polymer contained in the liquid crystal-polymer composite material of the present invention, although at least one type of polymerizable compound may be used, a plurality of types of polymerizable compounds are preferably used in combination so as to set the physical properties of a polymerized material (polymer) obtained after a polymerization reaction in a desired range. When a plurality of types of polymerizable compounds are used, at least one type of mono-functional polymerizable compound and at least one type of polyfunctional polymerizable compound are preferably used. When a polyfunctional polymerizable compound is used as the raw material, by the polymerization reaction, a liquid crystal-polymer composite material containing a polymer having a cross-linked structure can be obtained.

In addition, the glass transition temperature of the polymer contained in the liquid crystal-polymer composite material of the present invention is preferably −100° C. to 25° C. Accordingly, in order to put the glass transition temperature of the polymer obtained after the polymerization reaction into the range described above, the type of polymerizable compound used as the raw material and the composition thereof are preferably appropriately adjusted.

Furthermore, as the raw material for the polymer contained in the liquid crystal-polymer composite material of the present invention, at least one type of non-mesogenic polymerizable compound is more preferably used, and at least one type of mesogenic polymerizable compound and at least one type of non-mesogenic polymerizable compound are more preferably used. As the raw material for the polymer, when a mesogenic polymerizable compound and a non-mesogenic polymerizable compound are both used, a temperature range in which a liquid crystal-polymer composite material obtained by the polymerization reaction exhibits an optically isotropic phase can be further increased.

In order to increase an exhibition temperature range of blue phase III, as the raw material for the polymer contained in the liquid crystal-polymer composite material of the present invention, at least one type of polyfunctional mesogenic polymerizable compound and at least one type of mono-functional or polyfunctional non-mesogenic polymerizable compound are preferably contained; at least one type of compound selected from the group consisting of the compounds represented by the formulas (PC1-3a) to (PC1-3i) and the compounds represented by the general formulas (V-b1) to (V-b20) and at least one type of compound selected from the group consisting of the compounds represented by the general formulas (PC2-a) to (PC2-h) are more preferably contained; and at least one type of compound selected from the group consisting of the compounds represented by the formulas (PC1-3a) to (PC1-3i) and the compounds represented by the general formulas (V-b1) to (V-b20) and at least one type of compound selected from the group consisting of the compounds represented by the general formulas (PC2-a) to (PC2-d) are further preferably contained.

[Method for Manufacturing Liquid Crystal-Polymer Composite Material]

The liquid crystal-polymer composite material of the present invention may be formed, for example, in such a way that after a polymerizable compound-containing liquid crystal composition is prepared by mixing a nematic liquid crystal composition, all chiral compounds, and all polymerizable compounds used as the raw material for the polymer, the compounds having polymerizable groups in the polymerizable compound-containing liquid crystal composition are polymerized.

The order of mixing the nematic liquid crystal composition, the chiral compounds, and the polymerizable compounds is not particularly limited, all the raw materials may be substantially simultaneously mixed together, or a liquid crystal composition prepared in advance by mixing the nematic liquid crystal composition and the chiral compounds may be mixed with all the polymerizable compounds used as the raw material for the polymer. Although the total volume of all the polymerizable compounds in the polymerizable compound-containing liquid crystal composition may be appropriately determined in consideration of the types of polymerizable compounds to be used, the type of nematic liquid crystal composition, the types of chiral compounds, and the like, the total volume is preferably 0.1 to 40 percent by mass, more preferably 1 to 40 percent by mass, and further preferably 1 to 25 percent by mass. In addition, the content of the mixture of the nematic liquid crystal composition and the chiral compounds in the polymerizable compound-containing liquid crystal composition is preferably 60 to 95 percent by mass, more preferably 60 to 90 percent by mass, and further preferably 60 to 80 percent by mass.

The polymerizable compound-containing liquid crystal composition may also contain a polymerization initiator, if needed.

For example, when polymerization is performed by radical polymerization of the polymerizable compounds in the polymerizable compound-containing liquid crystal composition, as a radical polymerization initiator, a thermal polymerization initiator or a photopolymerization initiator may be added. In particular, the following compounds may be preferably used.

For example, there may be mentioned an acetophenone-based compound, such as diethoxy acetophenone, 2-hydroxy-2-methyl-1-phenylpropane-1-on, benzyl dimethyl ketal, 1-(4-isopropylphenyl)-2-hydroxy-2-methylpropane-1-on, 4-(2-hydroxyethoxy)phenyl-(2-hydroxy-2-propyl)ketone, 1-hydroxycyclohexyl-phenylketone, 2-methyl-2-morpholino(4-thiomethylphenyl)propane-1-on, or 2-benzyl-2-dimethylamino-1-(4-morpholinophenyl)-butanone;

a benzoin-based compound, such as benzoin, benzoin isopropyl ether, or benzoin isobutyl ether;

an acylphosphine oxide-based compound, such as 2,4,6-trimethylbenzoyl diphenylphosphine oxide;

a benzyl or a methylphenyl glyoxy ester-based compound;
a benzophenone-based compound, such as benzophenone, o-benzoyl methyl benzoate, 4-phenylbenzophenone, 4,4-dichlorobenzophenone, hydroxybenzophenone, 4-benzoyl-4'-methyl-diphenyl sulfide, acrylated benzophenone, 3,3',4,4'-tetra(t-butyl peroxycarbonyl)benzophenone, or 3,3'-dimethyl-4-methoxybenzophenone;
a thioxanthone-based compound, such as 2-isopropyl thioxanthone, 2,4-dimethyl thioxanthone, 2,4-diethyl thioxanthone, or 2,4-dichloro thioxanthone;
an aminobenzophenone-based compound, such as Michler's ketone, or 4,4'-diethyl aminobenzophenone; 10-butyl-2-chloroacridone, 2-ethylanthraquinone, 9,10-phenanthrenequinone, or camphor quinone.

As the radical polymerization initiator to be contained in the polymerizable compound-containing liquid crystal composition, among those compounds mentioned above, benzyl dimethyl ketal is preferable.

As long as the advantages of the present invention are not impaired, the polymerizable compound-containing liquid crystal composition may contain various types of additives which have been generally used for liquid crystal compositions. For example, in order to improve the storage stability of the liquid crystal composition, stabilizers, such as an antioxidant and an UV absorber, may be added thereto. As usable stabilizers, for example, a hydroquinone, a hydroquinone monoalkyl ether, a tertiary butylcatechol, a pyrogallol, a thiophenol, a nitro compound, a β-naphthylamine, a β-naphthol, and a nitroso compound may be mentioned. When the additive is used, the addition amount thereof is with respect to the liquid crystal composition, preferably in a range of 0.005 to 1 percent by mass, more preferably 0.02 to 0.5 percent by mass, and particularly preferable 0.03 to 0.1 percent by mass.

As the polymerizable compound-containing liquid crystal composition before the polymerization reaction, a composition capable of exhibiting an optically isotropic phase is preferable, a composition capable of exhibiting a blue phase is more preferable, and a composition capable of exhibiting a blue phase III is further preferable. By the polymer formed by the polymerization reaction, the optically isotropic phase is stabilized. That is, the liquid crystal-polymer composite material obtained by the polymerization reaction can exhibit an optically isotropic phase in a temperature range wider than that in which a liquid crystal composition before the polymerization reaction exhibits an optically isotropic phase.

The polymerization reaction of the polymerizable compound-containing liquid crystal composition is appropriately selected in accordance with the type of polymerizable compound to be used, from known methods including a method which irradiates active energy rays, such as UV rays or electron rays and a thermal polymerization method. In the present invention, since heating is not required, and the reaction proceeds at room temperature, methods which irradiate active energy rays are preferable, and among the methods described above, a method which irradiates light, such as UV rays, is preferable since operation may be easily carried out. When UV rays are used, either a polarized light source or a non-polarized light source may be used.

The polymerization reaction is preferably performed while the polymerizable compound-containing liquid crystal composition maintains an optically isotropic phase, in particular a blue phase. For example, in the case in which the polymerizable compound-containing liquid crystal composition exhibits a blue phase III, if the polymerization reaction is started in a temperature range in which the polymerizable compound-containing liquid crystal composition exhibits a blue phase III, is continued while the blue phase III is maintained, and is finished in a temperature range in which the liquid crystal-polymer composite material manufactured by the polymerization reaction exhibits a blue phase III, a liquid crystal-polymer composite material having a wider temperature range which exhibits a blue phase III than that of the polymerizable compound-containing liquid crystal composition before the polymerization reaction can be obtained.

In order to manufacture a liquid crystal-polymer composite material having a wider temperature range which exhibits a blue phase III, as raw materials, a chiral compound having a negative temperature dependence of the helical twisting power and a nematic liquid crystal composition in which the content of a liquid crystal compound containing a larger number of benzene skeletons than that of cyclohexane skeletons in the molecule is 50 percent by mass or more of the total liquid crystal compounds in the nematic liquid crystal composition are preferably used, and a chiral compound having a negative temperature dependence of the helical twisting power and a nematic liquid crystal composition in which with respect to the total nematic liquid crystal composition, the content of a liquid crystal compound containing a larger number of benzene skeletons than that of a cyclohexane skeletons in the molecule is 50 percent by mass or more, and the content of a liquid crystal compound containing a larger number of cyclohexane skeletons than that of benzene skeletons in the molecule is 1 to 50 percent by mass are more preferably used. In particular, in order to manufacture a liquid crystal-polymer composite material which exhibits a blue phase III at least in a temperature range of −20° C. to 60° C., there are preferably used a chiral compound having a negative temperature dependence of the helical twisting power and a nematic liquid crystal composition which contains 10 to 50 percent by mass of the compound represented by the general formula (II) and 50 to 90 percent by mass of the compound represented by the general formula (III) and in which with respect to the total liquid crystal compounds in the composition, the content of a liquid crystal compound containing a larger number of benzene skeletons than that of cyclohexane skeletons in the molecule is 50 percent by mass or more and the content of a liquid crystal compound containing a larger number of cyclohexane skeletons than that of benzene skeletons in the molecule is 1 to 50 percent by mass.

In addition, when at least two types of chiral compounds are used as the raw materials, compared to the case in which one type of chiral compound is only used, an exhibition temperature range of a blue phase III which coexists with no other phases can be increased. In particular, when a chiral compound having a negative temperature dependence of the helical twisting power and a chiral compound having a positive temperature dependence of the helical twisting power are used in combination, there can be obtained a liquid crystal-polymer composite material capable of exhibiting a blue phase III which coexists with neither a blue phase I, a blue phase II, nor a liquid crystal phase in a very wide temperature range (such as a temperature range of 2° C. or more) unlike that in the past.

Since the exhibition temperature range of the liquid crystal-polymer composite material of the present invention obtained by polymerization of the polymerizable compound-containing liquid crystal composition which exhibits a blue phase, in particular a blue phase III, is increased unlike that in the past without losing high speed response of a blue phase, the liquid crystal-polymer composite material of the present invention can be preferably used as a raw material for a liquid crystal optical element driven using an optically isotropic phase.

A liquid crystal optical element using the liquid crystal-polymer composite material of the present invention can be manufactured by a general method. For example, as described below, the liquid crystal optical element can be manufactured. First, the polymerizable compound-containing liquid crystal composition is charged in a cell provided with at least one electrode. The above cell may be formed such that two substrates are closely brought into contact with each other with an adhesive provided therebetween to form a frame shape. On a surface of one of the substrates, electrodes, in particular IPS electrodes (comb electrode), may be provided, and on the electrodes, as an insulating film, a polyimide film or an inorganic film, such as SiO, may be obtained. As in the case described above, a counter electrode may be provided on a surface of the other substrate, and on this electrode, a counter substrate provided with an insulating film may be obtained. For this substrate, a transparent material, such as glass or plastic, having flexibility may be used, and for the other substrate, an opaque material, such as silicon, may be used. As a method for sandwiching the polymerizable compound-containing liquid crystal composition between the two substrates of the cell, a general vacuum injection method, an ODF method, or the like may be used. Next, by heating the cell, the polymerization reaction is started at a temperature at which the polymerizable compound-containing liquid crystal composition exhibits a blue phase (such as a blue phase III) and is progressed while the blue phase is maintained. When the polymerization reaction is performed by irradiation of active energy rays, the substrate located at an irradiation side is required to have at least appropriate transparency with respect to the active energy rays. Since a liquid crystal optical element manufactured from a liquid crystal-polymer composite material which stably exhibits a blue phase has optically isotropic characteristics when no electric field is applied, the control of the alignment is not required.

Since having high speed response, a liquid crystal optical member which uses the liquid crystal-polymer composite material of the present invention can be preferably used for a display using a field sequential color method which is required to have high speed response in principle. When a liquid crystal optical element which uses the liquid crystal-polymer composite material of the present invention and a field sequential color method are used in combination, since no color filters are used, a highly efficient display in which the loss of light caused by color filters is reduced can be formed, and as a result, a highly bright and low-power consumption display can be obtained. In addition, when a liquid crystal optical element which uses the liquid crystal-polymer composite material of the present invention and a field sequential color method are used in combination, unlike the case of a color filter method, pixels are each not required to be divided into three portions, and hence, a high-definition display can be obtained.

EXAMPLES

Hereinafter, although the present invention will be described in more detail with reference to examples and the like, the present invention is not limited to the following examples and the like. In addition, "%" of the composition in the following examples indicates "percent by mass" unless otherwise particularly stated.

Example 1

Formation of Nematic Liquid Crystal Composition

Components were mixed together in accordance with the composition shown in Table 1 to form a nematic liquid crystal composition (N1). The nematic liquid crystal composition (N1) exhibited a nematic phase in a wide temperature range of −29° C. to 101.3° C. In addition, the birefringence (Δn) was 0.239, and the dielectric anisotropy (Δ∈) was +27.75.

[Chem. 56]

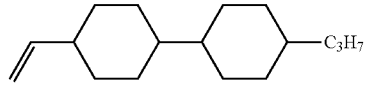
(LCC1)

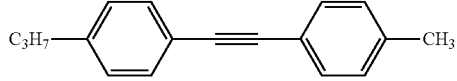
(LCC2)

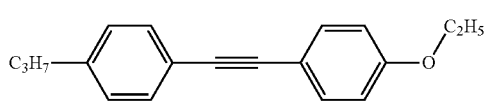
(LCC3)

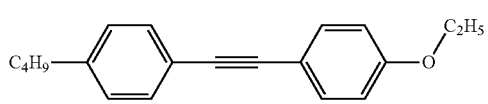
(LCC4)

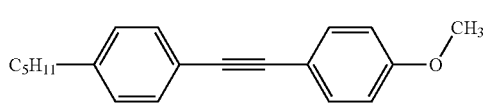
(LCC5)

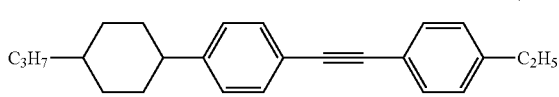
(LCC6)

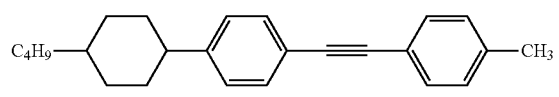
(LCC7)

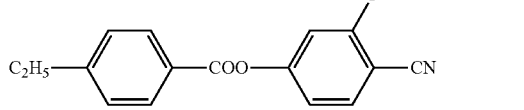
(LCC8)

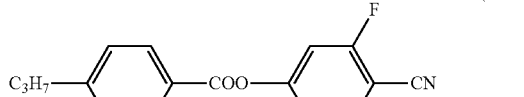
(LCC9)

(LCC10)

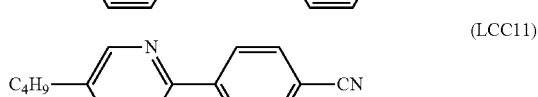
(LCC11)

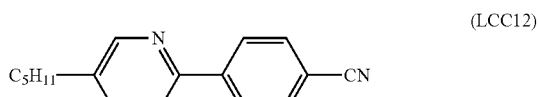
(LCC12)

-continued (LCC13)

(LCC14)

(LCC15)

(LCC16)

(LCC17)

(LCC18)

(LCC19)

TABLE 1

| Nematic liquid crystal composition (N1) | | (percent by mass) |
|---|---|---|
| Compound represented by general formula (Ia-1) | LCC1 | 9.4 |
| Compound represented by general formula (Id-1) | LCC2 | 6.2 |
| | LCC3 | 0.7 |
| | LCC4 | 1.1 |
| | LCC5 | 1.1 |
| Compound represented by general formula (Ie-1) | LCC6 | 5.9 |
| | LCC7 | 5.9 |
| Compound represented by general formula (IIa-2e) | LCC8 | 7.6 |
| | LCC9 | 5.8 |
| | LCC10 | 1.6 |
| Compound represented by general formula (IIa-2v) | LCC11 | 5.8 |
| | LCC12 | 5.8 |
| | LCC13 | 10.0 |

TABLE 1-continued

| Nematic liquid crystal composition (N1) | | (percent by mass) |
|---|---|---|
| Compound represented general formula (IIa-3m) | LCC14 | 3.0 |
| | LCC15 | 3.0 |
| Compound represented by general formula (IIa-3'f) | LCC16 | 12.6 |
| Compound represented by general formula (IIa-3'o) | LCC17 | 14.3 |
| Other compounds | LCC18 | 0.1 |
| | LCC19 | 0.3 |
| Total | | 100.0 |

<Formation of Nematic Liquid Crystal Composition Containing Chiral Compound>

The nematic liquid crystal composition (N1) and chiral compounds (C1), (C2), and (C3) were mixed together to have the composition shown in Table 2 to form a nematic liquid crystal composition (CLC1) containing a chiral compound. In the chiral compound (C1), the asterisk (*) represents a chiral carbon atom. In the chiral compounds (C2) and (C3), the bond connecting the α positions of the two naphthalene rings is the axis of the axial asymmetry.

[Chem. 57]

(C1)

(C2)

(C3)

TABLE 2

| Nematic liquid crystal composition (CLC1) containing chiral compound | (percent by mass) |
|---|---|
| Nematic liquid crystal composition (N1) | 80.0 |
| Chiral compound (C1) | 10.0 |
| Chiral compound (C2) | 5.0 |
| Chiral compound (C3) | 5.0 |
| Total | 100.0 |

As the results obtained by polarization microscope observation, it was found that the nematic liquid crystal composition (CLC1) containing a chiral compound exhibits a cubic ordered blue phase (a blue phase I (BPI) or a blue phase II (BPII)) and a blue phase III (BPIII), a chiral nematic phase is transferred to the cubic ordered blue phase at 61.3° C., the cubic ordered blue phase is transferred to the BPIII at 64.9° C., and the BPIII is transferred to an isotropic liquid phase at 69.6° C.

<Formation of Polymerizable Compound-Containing Liquid Crystal Composition>

The nematic liquid crystal composition (CLC1) containing a chiral compound, a mono-functional non-mesogenic polymerizable compound (M1: dodecyl acrylate), a polyfunctional mesogenic polymerizable compound (M2), and a radical polymerization initiator (S1: benzyl dimethyl ketal) were mixed together to have the composition shown in Table 3, thereby forming a polymerizable compound-containing liquid crystal composition (MLC1).

[Chem. 58]

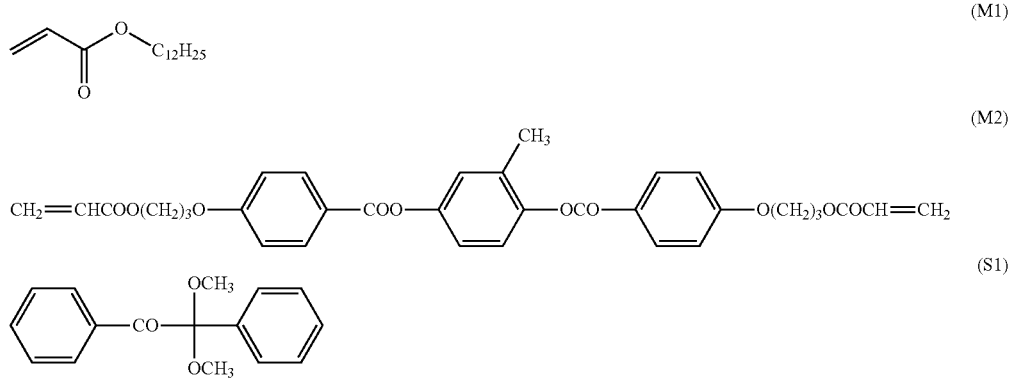

TABLE 3

| Polymerizable compound-containing liquid crystal composition (MLC1) | (percent by mass) |
|---|---|
| Nematic liquid crystal composition (CLC1) containing chiral compound | 89.1 |
| Mono-functional non-mesogenic polymerizable compound (M1) | 5.1 |
| Polyfunctional mesogenic polymerizable compound (M2) | 5.4 |
| Radical polymerization initiator (S1) | 0.4 |
| Total | 100.0 |

As the results obtained by polarization microscope observation, it was found that the polymerizable compound-containing liquid crystal composition (MLC1) exhibits a blue phase III (BPIII), a chiral nematic phase and the BPIII coexist with each other at 42.2° C. to 42.7° C., the BPIII coexists with no other phases at 42.7° C. to 51.8° C., and the BPIII coexists with an isotropic liquid phase at 51.8° C. to 56.8° C.

<Formation of Liquid Crystal-Polymer Composite Material>

The polymerizable compound-containing liquid crystal composition (MLC1) was sandwiched between two glass plates (gap: 50 μm) and was then irradiated by an UV LED (central wavelength: 365 nm, intensity of illumination: 10 mW/cm$^2$) with an irradiation does of 2 J/cm$^2$ at 45° C. at which a BPIII was exhibited, thereby forming a liquid crystal-polymer composite material. The liquid crystal-polymer composite material thus obtained exhibited a BPIII at room temperature. As the results obtained by polarization microscope observation, it was found that the liquid crystal-polymer composite material exhibits a BPIII which coexists with no other phases at −25° C. to 63° C.

<Formation Liquid Crystal Optical Element>

The polymerizable compound-containing liquid crystal composition (MLC1) was charged into a cell provided with IPS electrodes (electrode width: 5 μm, distance between electrodes: 5 μm) and having a thickness of 4 μm and was then irradiated by an UV LED (central wavelength: 365 nm, intensity of illumination: 10 mW/cm$^2$) with an irradiation does of 2 J/cm$^2$ at 45° C. at which a BPIII was exhibited, thereby forming a cell which was provided with the IPS electrodes and which contained a liquid crystal-polymer composite material. This cell was disposed between two linear polarization plates having absorption axes orthogonal to each other. The polarization plates and the cell were disposed in parallel to each other. An electric field applied to the IPS electrodes was in a direction to form an angle of 45° with the absorption axis of each of the linear polarization plates. Although the cell described above was in a dark state when no voltage was applied between the IPS electrodes, when an alternating-current voltage (64 Vrms, 100 Hz) was applied between the IPS electrodes, a portion of the cell to which the voltage was applied was placed in a bright state, so that it was confirmed that the cell functions as a liquid crystal optical element.

INDUSTRIAL APPLICABILITY

The liquid crystal-polymer composite material of the present invention is useful as a liquid crystal material for liquid crystal optical elements.

The invention claimed is:

1. A liquid crystal-polymer composite material comprising: a nematic liquid crystal composition containing at least two types of achiral liquid crystal compounds; at least one type of chiral compound; and a polymer formed by polymerization of at least one type of polymerizable compound wherein the liquid crystal-polymer composite material exhibits a blue phase that includes a blue phase III, wherein the liquid crystal-polymer composite material exhibits a blue phase III which coexists with neither a blue phase I, a blue phase II, nor a liquid phase in a temperature range of 2° C. or more, and wherein the nematic liquid crystal composition containing at least two types of achiral liquid crystal compounds is represented by general formula (I)

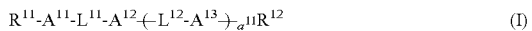

wherein R$^{11}$ and R$^{12}$ each independently represent an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, wherein one methylene group in $R^{11}$ or $R^{12}$ or at least two methylene groups therein which are not adjacent to each other each may be independently substituted by —O—, —S—, —CO—, —COO—, or —OCO— so that oxygen atoms or sulfur atoms are not directly bonded to each other, and at least one hydrogen atom in $R^{11}$ or $R^{12}$ may be substituted by a fluorine atom; $A^{11}$, $A^{12}$, and $A^{13}$ each independently represent (a) a trans-1,4-cyclohexylene group wherein one methylene group present in this group or at least two methylene groups therein which are not adjacent to each other each may be independently substituted by an oxygen atom or a sulfur atom, and at least one hydrogen atom present in this group each may be independently substituted by a cyano group, a fluorine atom, or a chlorine atom, (b) a 1,4-phenylene group wherein one —CH═ present in this group or at least two —CH═ therein which are not adjacent to each other may be substituted by at least one nitrogen atom, and at least one hydrogen atom present in this group each may be independently substituted by a cyano group, a fluorine atom, or a chlorine atom, or (c) a group selected from the group consisting of a 1,4-cyclohexenylene group, a 1,4-bicyclo(2,2,2)octylene group, a naphthalene-2,6-diyl group, a decahydronaphthalene-2,6-diyl group, and a 1,2,3,4-tetrahydronaphthalene-2,6-diyl group wherein one —CH═ present in each of those groups or at least two —CH═ therein which are not adjacent to each other may be substituted by at least one nitrogen atom, and at least one hydrogen atom present in each of those groups each may be independently substituted by a cyano group, a fluorine atom or a chlorine atom);

$a^{11}$ represents 0, 1, or 2; and $L^{11}$ and $L^{12}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH═N—N═CH—, —CH═CH—, —CF═CF—, —C≡C—, —N═N—, —CH═N—, —SCH$_2$—, —CH$_2$S—, —CSO—, —OCS—, —CF$_2$S—, or —SCF$_2$—.

2. The liquid crystal-polymer composite material according to claim 1, wherein the liquid crystal-polymer composite material exhibits a blue phase III in a temperature range of −20° C. to 60° C.

3. The liquid crystal-polymer composite material according claim 1, wherein as the at least one chiral compound, at least two types of chiral compounds are contained.

4. The liquid crystal-polymer composite material according claim 1, wherein as the polymerizable compound, at least one type of non-liquid crystal polymerizable compound is contained.

5. The liquid crystal-polymer composite material according claim 1, wherein as the polymerizable compound, at least one type of mono-functional polymerizable compound and at least one type of polyfunctional polymerizable compound are contained.

6. The liquid crystal-polymer composite material according to claim 1, wherein the nematic liquid crystal composition exhibits a nematic liquid crystal phase at least in a temperature range of −10° C. to 50° C.

7. The liquid crystal-polymer composite material according to claim 1, wherein the nematic liquid crystal composition has a positive dielectric constant.

8. A method for manufacturing a liquid crystal-polymer composite material, the method comprising;

starting polymerization of a polymerizable compound-containing liquid crystal composition for curing thereof in a temperature range in which the polymerizable compound-containing liquid crystal composition exhibits a blue phase III, the polymerizable compound-containing liquid crystal composition including a nematic liquid crystal composition containing at least two types of achiral liquid crystal compounds, at least one type of chiral compound, and at least one type of polymerizable compound, wherein the manufactured liquid crystal-polymer composite material exhibits a blue phase III which coexist with neither a blue phase I, a blue phase II, nor a liquid phase in a temperature range of 2° C. or more, and wherein the nematic liquid crystal composition containing at least two types of achiral liquid crystal compounds is represented by general formula (I)

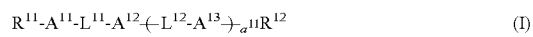   (I)

wherein $R^{11}$ and $R^{12}$ each independently represent an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, wherein one methylene group in $R^{11}$ or $R^{12}$ or at least two methylene groups therein which are not adjacent to each other each may be independently substituted by —O—, —S—, —CO—, —COO—, or —OCO— so that oxygen atoms or sulfur atoms are not directly bonded to each other, and at least one hydrogen atom in $R^{11}$ or $R^{12}$ may be substituted by a fluorine atom; $A^{11}$, $A^{12}$, and $A^{13}$ each independently represent (a) a trans-1,4-cyclohexylene group wherein one methylene group present in this group or at least two methylene groups therein which are not adjacent to each other each may be independently substituted by an oxygen atom or a sulfur atom, and at least one hydrogen atom present in this group each may be independently substituted by a cyano group, a fluorine atom, or a chlorine atom, (b) a 1,4-phenylene group wherein one —CH═ present in this group or at least two —CH═'s therein which are not adjacent to each other may be substituted by at least one nitrogen atom, and at least one hydrogen atom present in this group each may be independently substituted by a cyano group, a fluorine atom, or a chlorine atom, or (c) a group selected from the group consisting of a 1,4-cyclohexenylene group, a 1,4-bicyclo(2,2,2)octylene group, a naphthalene-2,6-diyl group, a decahydronaphthalene-2,6-diyl group, and a 1,2,3,4-tetrahydronaphthalene-2,6-diyl group wherein one —CH═ present in each of those groups or at least two —CH═ therein which are not adjacent to each other may be substituted by at least one nitrogen atom, and at least one hydrogen atom present in each of those groups each may be independently substituted by a cyano group, a fluorine atom, or a chlorine atom;

$a^{11}$ represents 0, 1, or 2; and $L^{11}$ and $L^{12}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CH$_2$O—, —CH═N—N═CH—, —CH═CH—, —CF═CF—, —C≡C—, —N═N—, —CH═N—, —SCH$_2$—, —CH$_2$S—, —CSO—, —OCS—, —CF$_2$S—, or —SCF$_2$—.

9. The method for manufacturing a liquid crystal-polymer composite material according to claim 8, wherein the polymerization is finished in a temperature range in which a manufactured liquid crystal-polymer composite material exhibits a blue phase III.

10. The method for manufacturing a liquid crystal-polymer composite material according to claim 8, wherein the polymerizable compound-containing liquid crystal composition contains at least two types of chiral compounds as the at least one chiral compound.

11. A liquid crystal optical element which uses the liquid crystal-polymer composite material according to claim 1.

12. The liquid crystal-polymer composite material according to claim 1, further comprising at least one type of compound represented by general formula (II)

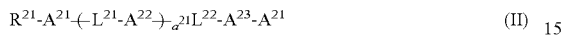 (II)

wherein $A^{21}$ is the same as $A^{11}$ in the general formula (I), $A^{22}$ is the same as $A^{12}$ in the general formula (I), $A^{23}$ is the same as $A^{13}$ in the general formula (I), and $a^{21}$ is the same $a^{11}$ in the general formula (I), $R^{21}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, wherein one methylene group present in $R^{21}$ or at least two methylene groups therein which are not adjacent to each other each may be independently substituted by —O—, —S—, —CO—, —COO—, or —OCO—, and at least one hydrogen atom present in $R^{21}$ each may be independently substituted by a fluorine atom or a chlorine atom;

$L^{21}$ and $L^{22}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH═N—N═CH—, —CH═CH—, —CF═CF—, —C≡C—, —N═N—, —CH═N—, —SCH$_2$—, —CH$_2$S—, —CSO—, —OCS—, —CF$_2$S—, or —SCF$_2$—, wherein when two $L^{21}$ are present, they may be the same or different from each other; and $X^{11}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.

13. The liquid crystal-polymer composite material according to claim 1, wherein the at least one type of chiral compound is represented by the general formula Ch-I;

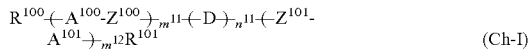 (Ch-I)

wherein $R^{100}$ and $R^{101}$ independently represent a hydrogen atom, a cyano group, —NO$_2$, a halogen atom, —OCN, —SCN, —SF$_5$, a chiral or an achiral alkyl group having 1 to 30 carbon atoms, wherein one methylene group in the alkyl group or at least two methylene groups therein which are not adjacent to each other each may be independently substituted by —O—, —S—, —NH—, —N(CH$_3$)—, —CO—, —COO—, —OCO—, —OCO—O—, —S—CO—, —CO—S—, —CH═CH—, —CF$_2$—, —CF═CH—, —CH═CF—, —CF═CF—, or —C≡C— so that oxygen atoms or sulfur atoms are not directly bonded to each other, and at least one hydrogen atom present in the alkyl group each may be independently substituted by a halogen atom or a cyano group, a polymerizable group, or a chiral group including a ring structure, and when $n^{11}$ represents 0, at least one of $R^{100}$ and $R^{101}$ represents a chiral alkyl group; $Z^{100}$ and $Z^{101}$ each independently represent —O—, —S—, —CO—, —COO—, —OCO—, —O—OCO—, —CO—N(R$^{105}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═CH—, —CF═CH—, —CH═CF—, —CF═CF—, —C≡C—, —CH═CH—COO—, —OCO—CH═CH—, or a single bond;

$A^{100}$ and $A^{101}$ each independently represent (a') a trans-1,4-cyclohexylene group wherein one methylene group present in the group or at least two methylene groups therein which are not adjacent to each other each may be independently substituted by an oxygen atom or a sulfur atom;

(b') a 1,4-phenylene group wherein one —CH═ present in this group or at least two —CH═ therein which are not adjacent to each other may be substituted by at least one nitrogen atom, or (c') a 1,4-cyclohexenylene group, a 1,4-bicyclo[2,2,2]octylene group, indane-2,5-diyl, a naphthalene-2,6-diyl group, a decahydronaphthalene-2,6-diyl group, and a 1,2,3,4-tetrahydronaphthalene-2,6-diyl group wherein one methylene group present in each of those groups or at least two methylene groups therein which are not adjacent to each other each may be independently substituted by an oxygen atom or a sulfur atom, and one —CH═ present in each of those groups or at least two —CH═ therein which are not adjacent to each other may be substituted by at least one nitrogen atom;

wherein when the number of $A^{100}$ or $A^{101}$ is more than two, they may be the same or different from each other;

wherein $n^{11}$ represents 0 or 1, when $n^{11}$ represents 0, represents 0, and $m^{11}$ represents 0, 1, 2, 3, 4, or 5, and when $n^{11}$ represents 1, $m^{11}$ and $m^{12}$ each independently represent 0, 1, 2, 3, 4, or 5; and D represents a divalent group represented by one of the formulas (D1), (D2), (D3) and (D4) wherein * represents a chiral carbon atom, and . are each bonded to $Z^{100}$ or $R^{100}$ or $Z^{101}$ or $R^{101}$;

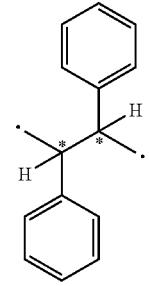

(D1)

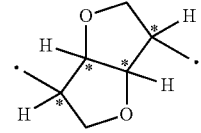

(D2)

-continued (D3)

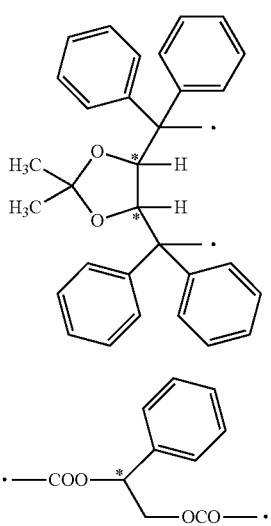

(D4)

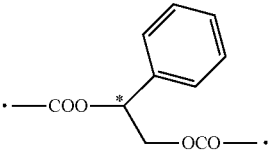

14. The liquid crystal-polymer composite material according to claim 1, wherein the at least one type of polymerizable compound is represented by the general formula (V-a);

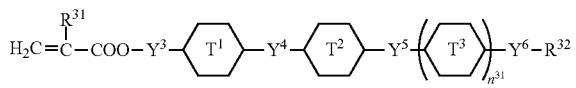
(V-a)

wherein $R^{31}$ represents a hydrogen atom or a methyl group, $n^{31}$ represents an integer of 0 or 1, $T^1$, $T^2$, and $T^3$ each independently represent one of divalent groups having the following ring structures, wherein m represents an integer of 1 to 4;

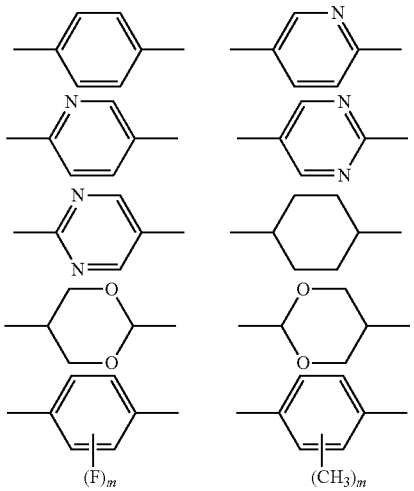

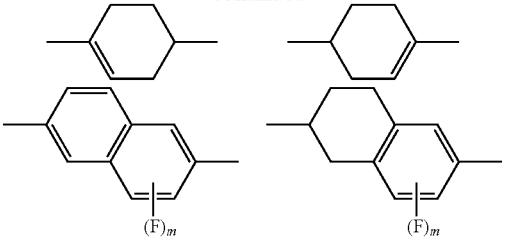

$Y^3$, $Y^4$, and $Y^5$ each independently represent a single bond, —O—, —OCH$_2$—, —OCH$_2$—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—, $Y^6$ represents a single bond, —O—, —COO—, or —OCO—, and $R^{32}$ represents a hydrogen atom, a halogen atom, a cyano group, an alkoxy group having 1 to 20 carbon atoms, or a hydrocarbon group having 1 to 20 carbon atoms.

15. The method for manufacturing a liquid crystal-polymer composite material according to claim 8, further comprising at least one type of compound represented by general formula (II)

$$R^{21}\text{-}A^{21}\text{-}(L^{21}\text{-}A^{22})_{a^{21}}L^{22}\text{-}A^{23}\text{-}A^{21} \quad \text{(II)}$$

wherein $A^{21}$ is the same as $A^{11}$ in the general formula (I), $A^{22}$ is the same as $A^{12}$ in the general formula (I), $A^{23}$ is the same as $A^{13}$ in the general formula (I), and $a^{21}$ is the same $a^{11\prime}$ in the general formula (I), $R^{21}$ represents an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, wherein one methylene group present in $R^{21}$ or at least two methylene groups therein which are not adjacent to each other each may be independently substituted by —O—, —S—, —CO—, —COO—, or —OCO—, and at least one hydrogen atom present in $R^{21}$ each may be independently substituted by a fluorine atom or a chlorine atom;

$L^{21}$ and $L^{22}$ each independently represent a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—, wherein when two $L^{21}$ are present, they may be the same or different from each other; and $X^{11}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.

* * * * *